United States Patent
Yang et al.

(10) Patent No.: US 9,844,028 B2
(45) Date of Patent: Dec. 12, 2017

(54) SYSTEMS AND METHODS FOR IMPROVED COMMUNICATION EFFICIENCY IN WIRELESS NETWORKS

(71) Applicant: QUALCOMM Incorporated, San Diego, CA (US)

(72) Inventors: Lin Yang, San Diego, CA (US); Jialing Li Chen, San Diego, CA (US); Sameer Vermani, San Diego, CA (US); Bin Tian, San Diego, CA (US); Rahul Tandra, San Diego, CA (US); Youhan Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 14/825,944

(22) Filed: Aug. 13, 2015

(65) Prior Publication Data

US 2016/0050666 A1 Feb. 18, 2016

Related U.S. Application Data

(60) Provisional application No. 62/038,103, filed on Aug. 15, 2014, provisional application No. 62/189,165, (Continued)

(51) Int. Cl.
*H04W 72/04* (2009.01)
*H04W 72/02* (2009.01)

(52) U.S. Cl.
CPC ............ *H04W 72/02* (2013.01); *H04W 72/04* (2013.01)

(58) Field of Classification Search
None
See application file for complete search history.

(56) References Cited

U.S. PATENT DOCUMENTS

2011/0255620 A1\* 10/2011 Jones, IV .............. H04L 5/0046
375/260
2014/0071996 A1\* 3/2014 Tetzlaff ................. H04L 1/0061
370/474

(Continued)

OTHER PUBLICATIONS

IEEE Standards Association: "Part 11: Wireless LAN Medium Access Control (MAC) and Physical Layer (PHY) Specifications, Amendment 4: Enhancements for Very High Throughput for Operation in Bands below 6 GHz" Dec. 11, 2013 (Dec. 11, 2013), 150 pages; XP002745074, Retrieved from the Internet: URL:http://ieeexplore.ieee.org/stamp/stamp.jsp?tp=&arnumber=6687187.

(Continued)

*Primary Examiner* — Bunjob Jaroenchonwanit
(74) *Attorney, Agent, or Firm* — Knobbe, Martens, Olson & Bear LLP

(57) ABSTRACT

Methods and apparatus for providing wireless messages according to various tone plans can include, for example, a method of wireless communication. The method includes selecting at least one of a 242-tone resource unit (RU), associated with a 256-tone plan including 234 data tones, 8 pilot tones, 3 direct current tones, and 11 edge tones, for transmission over a 20 MHz bandwidth, or a 484-tone RU, associated with a 512-tone plan including 468 data tones, 16 pilot tones, 5 direct current tones, and 23 edge tones, for transmission over a 40 MHz bandwidth. The method further includes providing a message for transmission according to the 256-tone plan or 512-tone plan.

11 Claims, 24 Drawing Sheets

Related U.S. Application Data filed on Jul. 6, 2015, provisional application No. 62/069,792, filed on Oct. 28, 2014.

(56) References Cited

U.S. PATENT DOCUMENTS

| | | | |
|---|---|---|---|
| 2015/0195112 A1* | 7/2015 | Jones, IV | H04L 5/0046 375/308 |
| 2015/0229441 A1* | 8/2015 | Jiang | H04L 27/26 375/295 |
| 2015/0327166 A1* | 11/2015 | Kenney | H04L 27/2613 370/311 |
| 2015/0349995 A1* | 12/2015 | Zhang | H04L 5/0048 375/295 |
| 2016/0211944 A1* | 7/2016 | Kenney | H04L 5/003 |
| 2016/0218844 A1* | 7/2016 | Suh | H04L 5/0007 |
| 2016/0226638 A1* | 8/2016 | Azizi | H04L 5/0048 |
| 2016/0233998 A1* | 8/2016 | Sun | H04L 5/0051 |
| 2016/0241366 A1* | 8/2016 | Azizi | H04L 5/003 |
| 2016/0285600 A1* | 9/2016 | Sun | H04L 5/0007 |
| 2016/0302213 A1* | 10/2016 | Kang | H03M 13/6527 |
| 2017/0005846 A1* | 1/2017 | Mohamed | H04L 27/2627 |

OTHER PUBLICATIONS

International Search Report and Written Opinion—PCT/US2015/045246—ISA/EPO—dated Nov. 4, 2015.

Lew M, "Introduction to 802.11ac WLAN Technology and Testing", Jan. 1, 2012 (Jan. 1, 2012), 46 pages; XP055223594, Retrieved from the Internet: URL:http://www.keysight.com/upload/cmc_upload/All/Introduction80211acTechnologyandTesting.pdf?&cc=NL&lc=dut [retrieved on Oct. 26, 2015].

Sun W., et al., "IEEE 802.11ah: A Long Range 802. 11 WLAN at Sub 1 GHz", Jul. 1, 2013 (Jul. 1, 2013), 25 Pages, XP055155803, DOI: 10.13052/jicts2245-800X .125 Retrieved from the Internet: URL: http://riverpublishers.com/journaldownload.php?file=RP_Journal_2245-800X_115.pdf [retrieved on Nov. 28, 2014].

Zheng, J., "LDPC for 11 ac", IEEE Standards, Nov. 8, 2010, pp. Slide 1-Slide 39, XP002694969, Piscataway, NJ, USA.

\* cited by examiner

| BW mode (MHz) | FFT tones | Number of data tones | Number of pilot tones | Number of DC tones | Number of guard tone (edge) | Number of leftover tones | Interleaver params Ncol | Interleaver params Nrot Nss<=4 | Interleaver params Nrot Nss>4 | LDPC tone mapping distance |
|---|---|---|---|---|---|---|---|---|---|---|
| 5 | 64 | 52 | 4 | — | — | 0 | 13 | 11 | 6 | 4 |
| 10 | 128 | 108 | 6 | — | — | 0 | 18 | 29 | 13 | 6 |
| 20* | 256 | 234 | 8 | 3 | 11 | 0 | 26 | 58 | 28 | 9 |
| 20 | 256 | 228 | 8 | 7 | 11 | 2 | 19/38 | 58 | 28 | 12/19 |
| 40* | 512 | 468 | 16 | 11 | 11 | 6 | 26 | 58 | 28 | 9 |
| 80 | 1024 | 996 | 12 | 5 | 11 | 0 | 83 | 248 | 120 | 12 |
| 80 | 1024 | 972 | 32 | 5 | 11 | 4 | 54 | 243 | 120 | 18/36 |
| 80* | 1024 | 990 | 16 | 7 | 11 | 0 | 55 | 248 | 120 | 18/30/33 |
| 80 | 1024 | 972 | 32 | 7 | 13 | 0 | 54 | 243 | 120 | 18/36 |

FIG. 4

| Number of allocations | SUB-BW scheduling | Tone plans (DL/UL) Ndata/Npilot/Ndc | Number of guard tones between UL users (example) | Number of guard tones at the edge | Number of leftover tones (example) |
|---|---|---|---|---|---|
| 1 | 1 20MHz | 234/8/3* | — | 11 | — |
| 2 | 2 10MHz | 108/6/— | 7 or 11 (actually get 7 or 11 DC tones, 11 DC = 2 physical 10 MHz bands) | 11 | 10 or 6 |
|   |   | 108/6/— |   |   |   |
| 3 | 2 5MHz + 1 10MHz | 52/4/— | 3/3 or 7/9 (3/3 follows natural DCs of whole band, 7/11 gets transmission on each physical subband w/sub-DC) | 11 or 9 | 13 or 5 |
|   |   | 52/4/— |   |   |   |
|   |   | 108/6/— |   |   |   |
| 4 | 4 5MHz | 52/4/— | 3/3/3 or 7/7/7 (3/3/3 follows natural DC of whole band, 7/7/7 gets transmission on each physical subband w/sub-DC) | 11 or 7 | 12 or 4 |
|   |   | 52/4/— |   |   |   |
|   |   | 52/4/— |   |   |   |
|   |   | 52/4/— |   |   |   |

FIG. 5

| Number of allocations | SUB-BW scheduling | Tone plans (UL/DL) Ndata/Npilot/Ndc | Number of guard tones between UL users (example) | Number of guard tones at the edge | Number of leftover tones (example) |
|---|---|---|---|---|---|
| 1 | 1 40MHz | 468/16/11 | — | 11 | 6 |
| 2 | 2 20MHz | 2  234/8/— | 7 or 11 (actually get 7 or 11 DC tones, 11 DC = 2 physical 20 MHz bands) | 11 | 10 or 6 |
| 3 | 2 10MHz 1 20MHz | 2  108/6/— 1  234/8/— | 3/11 or 11/11 (3/11 follows natural DCs of whole band, 11/11 gets transmission on each physical subband w/sub-DC) | 11 | 14 or 6 |
| 4 | 4 10MHz | 4  108/6/— | 3/11/3 or 11/11/11 | 11 | 28 or 12 |
| 4 | 2 5 MHz 1 10MHz 1 20MHz | 2  52/4/— 1  108/6/— 1  234/8/— | 3/3/11 or 7/9/11 | 11 or 9 | 16 or 8 |
| 5 | 4 5MHz 1 20MHz | 4  52/4/— 1  234/8/— | 3/3/3/11 or 7/7/7/9 | 11 or 9 | 15 or 7 |

FIG. 6

| Number of allocations | SUB-BW scheduling | Tone plans (UL/DL) Ndata/Npilot/Ndc | | Number of guard tones between UL users (example) | Number of guard tones at the edge | Number of leftover tones (example) |
|---|---|---|---|---|---|---|
| 5 | 2 5MHz<br>3 10MHz | 2<br>3 | 52/4/—<br>108/6/— | 3/3/11/3 or 7/9/11/11 | 11 or 9 | 27 or 11 |
| 6 | 4 5MHz<br>2 10MHz | 4<br>2 | 52/4/—<br>108/6/— | 3/3/3/11/3 or 7/7/7/9/11 | 11 or 9 | 26 or 10 |
| 7 | 6 5MHz<br>1 10MHz | 6<br>1 | 52/4/—<br>108/6/— | 3/3/3/11/3/3 or 7/7/7/7/7/9 | 11 or 9 | 25 or 9 |
| 8 | 8 5MHz | 8 | 52/4/— | 3/3/3/11/3/3/3 or 7/7/7/7/7/7/7 | 11 or 7 | 24 or 8 |

FIG. 7

| Number of allocations | SUB-BW scheduling | Tone plans (UL/DL) Ndata/Npilot/Ndc | Number of guard tones between UL users (example) | Number of guard tones at the edge | Number of leftover tones (example) |
|---|---|---|---|---|---|
| 1 | 1 80MHz | 1  990/16/7 | — | 11 | 0 |
| 2 | 2 40MHz | 2  468/16/— | 7 or 11 (actually get 7 or 11 DC tones, 11 DC = 2 physical 40 MHz bands) | 11 | 38 or 34 |
| 3 | 2 20MHz + 1 40MHz | 2  234/8/— <br> 1  468/16/— | 11/7 or 11/11 (11/7 follows natural DCs of whole band, 11/11 gets transmission on each physical subband w/sub-DC) | 11 | 27 or 23 |
| 4 | 4 20MHz | 4  234/8/— | 11/7/11 or 11/11/11 | 11 | 16 or 12 |
| 4 | 2 10MHz <br> 1 20MHz <br> 1 40MHz | 2  108/6/— <br> 1  234/8/— <br> 1  468/16/— | 3/11/7 or 11/11/11 | 11 | 38 or 26 |
| 5 | 4 10MHz <br> 1 40MHz | 4  108/6/— <br> 1  468/16/— | 3/11/3/7 or 11/11/11/11 | 11 | 49 or 29 |
| 5 | 2 5MHz <br> 1 10MHz <br> 1 20MHz <br> 1 40MHz | 2  52/4/— <br> 1  108/6/— <br> 1  234/8/— <br> 1  468/16/— | 3/3/11/7 or 7/9/11/11 | 11 or 9 | 37 or 25 |

FIG. 8

| Number of allocations | SUB-BW scheduling | Tone plans (UL/DL) Ndata/Npilot/Ndc | | Number of guard tones between UL users (example) | Number of guard tones at the edge | Number of leftover tones (example) |
|---|---|---|---|---|---|---|
| 5 | 2 10MHz<br>3 20MHz | 2<br>3 | 108/6/—<br>234/8/— | 3/11/7/11 or<br>11/11/11/11 | 11 | 27 or 15 |
| 6 | 2 5MHz<br>3 10MHz<br>1 40 MHz | 2<br>3<br>1 | 52/4/—<br>108/6/—<br>468/16/— | 3/3/11/3/7 or<br>7/9/11/11/11 | 11 or 9 | 48 or 28 |
| 6 | 4 5MHz<br>1 20MHz<br>1 40MHz | 4<br>1<br>1 | 52/4/—<br>234/8/—<br>468/16/— | 3/3/11/3/7 or<br>7/7/7/9/11 | 11 or 9 | 36 or 24 |
| 6 | 4 10MHz<br>2 20MHz | 4<br>2 | 108/6/—<br>234/8/— | 3/11/3/7/11 or<br>11/11/11/11/11 | 11 | 38 or 18 |
| 7 | 4 5MHz<br>2 10MHz<br>1 40MHz | 4<br>2<br>1 | 52/4/—<br>108/6/—<br>468/16/— | 3/3/3/11/3/7 or<br>7/7/7/9/11 | 11 or 9 | 47 or 27 |
| 7 | 6 10MHz<br>1 20MHz | 6<br>1 | 108/6/—<br>234/8/— | 3/11/3/7/3/11 or<br>11/11/11/11/11/11 | 11 | 49 or 21 |

FIG. 9

| Number of allocations | SUB-BW scheduling | Tone plans (UL/DL) Ndata/Npilot/Ndc | | Number of guard tones between UL users (example) | Number of guard tones at the edge | Number of leftover tones (example) |
|---|---|---|---|---|---|---|
| 7 | 2 5MHz<br>3 10MHz<br>2 20MHz | 2<br>3<br>2 | 52/4/—<br>108/6/—<br>234/8/— | 3/3/11/3/7/11 or<br>7/9/11/11/11/11 | 11 or 9 | 37 or 17 |
| 7 | 4 5MHz<br>3 20MHz | 4<br>3 | 52/4/—<br>234/8/— | 3/3/3/11/7/11 or<br>7/7/7/9/11/11 | 11 or 9 | 25 or 13 |
| 8 | 8 10MHz | 8 | 108/6/— | 3/11/3/11/3/11/3 or<br>11/11/11/11/11/11/11 | 11 | 60 or 24 |
| 8 | 6 5MHz<br>1 10MHz<br>1 40MHz | 6<br>1<br>1 | 52/4/—<br>108/6/—<br>468/16/— | 3/3/3/11/3/3/7 or<br>7/7/7/7/7/9/11 | 11 or 9 | 46 or 26 |
| 8 | 4 5MHz<br>2 10MHZ<br>2 20MHz | 4<br>2<br>2 | 52/4/—<br>108/6/—<br>234/8/— | 3/3/3/11/3/7/11 or<br>7/7/7/9/11/11/11 | 11 or 9 | 36 or 16 |

FIG. 10

| Number of allocations | SUB-BW scheduling | Tone plans (UL/DL) Ndata/Npilot/Ndc | | Number of guard tones between UL users (example) | Number of guard tones at the edge | Number of leftover tones (example) |
|---|---|---|---|---|---|---|
| 8 | 2 5MHz<br>5 10MHz<br>1 20MHz | 2<br>5<br>1 | 52/4/—<br>108/6/—<br>234/8/— | 3/3/11/3/7/3/11 or<br>7/9/11/11/11/11/11 | 11 or 9 | 48 or 16 |
| 9 | 8 5MHz<br>1 40MHz | 8<br>1 | 52/4/—<br>468/16/— | 3/3/3/11/3/3/3/7 or<br>7/7/7/7/7/7/7/9 | 11 or 9 | 45 or 25 |
| 9 | 4 5MHz<br>4 10MHz<br>1 20MHz | 4<br>4<br>1 | 52/4/—<br>108/6/—<br>234/8/— | 3/3/3/11/3/7/3/11 or<br>7/7/7/9/11/11/11/11 | 11 or 9 | 47 or 19 |
| 9 | 6 5MHz<br>1 10MHz<br>2 20MHz | 6<br>1<br>2 | 52/4/—<br>108/6/—<br>234/8/— | 3/3/3/11/3/3/7/11 or<br>7/7/7/7/7/9/11/11 | 11 or 9 | 35 or 15 |
| 9 | 2 5MHz<br>7 10MHz | 2<br>7 | 52/4/—<br>108/6/— | 3/3/11/3/7/3/11/3 or<br>7/9/11/11/11/11/11/11 | 11 or 9 | 59 or 23 |
| 10 | 8 5MHz<br>2 20MHz | 8<br>1 | 52/4/—<br>234/8/— | 3/3/3/11/3/3/3/7/11 or<br>7/7/7/7/7/7/7/9/11 | 11 or 9 | 34 or 14 |

FIG. 11

| Number of allocations | SUB-BW scheduling | Tone plans (UL/DL) Ndata/Npilot/Ndc | | Number of guard tones between UL users (example) | Number of guard tones at the edge | Number of leftover tones (example) |
|---|---|---|---|---|---|---|
| 10 | 6 5MHz<br>3 10MHz<br>1 20MHz | 6<br>3<br>1 | 52/4/—<br>108/6/—<br>234/8/— | 3/3/3/11/3/3/7/3/11 or<br>7/7/7/7/9/11/11/11 | 11 or 9 | 46 or 18 |
| 10 | 4 5MHz<br>6 10MHz | 4<br>6 | 52/4/—<br>108/6/— | 3/3/3/11/3/7/3/11/3 or<br>7/7/7/9/11/11/11/11/11 | 11 or 9 | 58 or 22 |
| 11 | 8 5MHz<br>2 10MHz<br>1 20MHz | 8<br>2<br>1 | 52/4/—<br>108/6/—<br>234/8/— | 3/3/3/11/3/3/3/7/3/11 or<br>7/7/7/7/7/7/7/9/11 | 11 or 9 | 45 or 17 |
| 11 | 6 5MHz<br>5 10MHz | 6<br>5 | 52/4/—<br>108/6/— | 3/3/3/11/3/3/7/3/11/3 or<br>7/7/7/7/9/11/11/11/11 | 11 or 9 | 57 or 21 |
| 12 | 10 5MHz<br>1 10MHz<br>1 20MHz | 10<br>1<br>1 | 52/4/—<br>108/6/—<br>234/8/— | 3/3/3/11/3/3/3/7/3/3/11 or<br>7/7/7/7/7/7/7/7/9/11 | 11 or 9 | 44 or 16 |
| 12 | 8 5MHz<br>4 10MHz | 8<br>4 | 52/4/—<br>108/6/— | 3/3/3/11/3/3/3/7/3/11/3 or<br>7/7/7/7/7/7/9/11/11/11 | 11 or 9 | 56 or 20 |

FIG. 12

| Number of allocations | SUB-BW scheduling | Tone plans (UL/DL) Ndata/Npilot/Ndc | | Number of guard tones between UL users (example) | Number of guard tones at the edge | Number of leftover tones (example) |
|---|---|---|---|---|---|---|
| 13 | 10 5MHz | 10 | 52/4/— | 3/3/3/11/3/3/7/3/7/3/3/11/3 or 7/7/7/7/7/7/7/7/7/7/9/11/11 | 11 or 9 | 55 or 19 |
|  | 3 10MHz | 3 | 108/6/— |  |  |  |
| 13 | 12 5MHz | 12 | 52/4/— | 3/3/3/11/3/3/3/7/3/3/3/3/11 or 7/7/7/7/7/7/7/7/7/7/7/7/9 | 11 or 9 | 43 or 15 |
|  | 1 20MHz | 1 | 234/8/— |  |  |  |
| 14 | 12 5MHz | 12 | 52/4/— | 3/3/3/11/3/3/3/7/3/3/3/11/3 or 7/7/7/7/7/7/7/7/7/7/7/9/11 | 11 or 9 | 54 or 18 |
|  | 2 10MHz | 2 | 108/6/— |  |  |  |
| 15 | 14 5MHz | 14 | 52/4/— | 3/3/3/11/3/3/3/7/3/3/3/11/3/3 or 7/7/7/7/7/7/7/7/7/7/7/7/7/9 | 11 or 9 | 53 or 17 |
|  | 1 10MHz | 1 | 108/6/— |  |  |  |
| 16 | 16 5MHz | 16 | 52/4/— | 3/3/3/11/3/3/3/7/3/3/3/11/3/3/3 or 7/7/7/7/7/7/7/7/7/7/7/7/7/7/7 | 11 or 9 | 52 or 14 |

FIG. 13

| BW | 5 | 10 | 15 | 20 | 30 | 40 | 60 | 80 | 100 | 120 | 140 | 160 |
|---|---|---|---|---|---|---|---|---|---|---|---|---|
| FFT size for 1x sym duration | 16 | 32 | 48 | 64 | 96 | 128 | 192 | 256 | 320 | 384 | 448 | 512 |
| FFT size for 4x sym duration | 64 | 128 | 192 | 256 | 384 | 512 | 768 | 1024 | 1280 | 1536 | 1792 | 2048 |

1810

Select from a number of 40 MHz tone allocations, wherein a first tone allocation comprising one 40 MHz band, a second tone allocation comprising two 20 MHz sub-bands, a third tone allocation comprising two 10 MHz sub-bands and one 20 MHz sub-band, a fourth tone allocation comprising four 10 MHz sub-bands, a fifth tone allocation comprising two 5 MHz sub-bands, one 10 MHz sub-band and one 20 MHz sub-band, a sixth tone allocation comprising four 5 MHz sub-bands and one 20 MHz sub-band, a seventh tone allocation comprising two 5 MHz sub-bands and three 10 MHz sub-bands, an eighth tone allocation comprising four 5 MHz sub-bands and two 10 MHz sub-bands, a ninth tone allocation comprising six 5 MHz sub-bands and one 10 MHz sub-band and a tenth tone allocation comprising eight 5 MHz sub-bands

1820

Upon selecting a tone allocation, provide the message for transmission over a 40 MHz bandwidth, wherein each 5 MHz sub-band comprises 52 data tones and 4 pilot tones, each 10 MHz sub-band comprises 108 data tones and 6 pilot tones, each 20 MHz sub-band comprises one of 234 or 228 data tones, 8 pilot tones, and wherein the 40 MHz band comprises 468 data tones, 16 pilot tones, and 11 direct current tones

Select from a number of 80 MHz tone allocations, wherein a first tone allocation comprising one 80 MHz band, a second tone allocation comprising two 40 MHz sub-bands, a third tone allocation comprising two 20 MHz sub-bands and one 40 MHz sub-band, a fourth tone allocation comprising four 20 MHz sub-bands, a fifth tone allocation comprising two 10 MHz sub-bands, one 20 MHz sub-band and one 40 MHz sub-band, a sixth tone allocation comprising four 10 MHz sub-bands and one 40 MHz sub-band, a seventh tone allocation comprising two 5 MHz sub-bands, one 10 MHz sub-band, one 20 MHz sub-band, and one 40 MHz sub-band, an eighth tone allocation comprising two 10 MHz sub-bands and three 20 MHz sub-bands, a ninth tone allocation comprising two 5 MHz sub-bands, three 10 MHz sub-bands, and one 40 MHz sub-bands, a tenth tone allocation comprising four 5 MHz sub-bands, one 20 MHz sub-band, and one 40 MHz sub-band, a eleventh tone allocation comprising four 10 MHz sub-bands and two 20 MHz sub-bands, a twelfth tone allocation comprising four 5 MHz sub-bands, two 10 MHz sub-bands, and one 40 MHz sub-band, a thirteenth tone allocation comprising six 10 MHz sub-bands and one 20 MHz sub-band, a fourteenth tone allocation comprising two 5 MHz sub-bands, three 10 MHz sub-bands and two 20 MHz sub-bands, a fifteenth tone allocation comprising four 5 MHz sub-bands and three 20 MHz sub-bands, a sixteenth tone allocation comprising eight 10 MHz sub-bands, a seventeenth tone allocation comprising six 5 MHz sub-bands, one 10 MHz sub-band, and one 40 MHz sub-band, an eighteenth tone allocation comprising four 5 MHz sub-bands, two 10 MHz sub-bands and two 20 MHz sub-bands, a nineteenth tone allocation comprising two 5 MHz sub-bands, five 10 MHz sub-bands, and one 20 MHz sub-band, a twentieth tone allocation comprising eight 5 MHz sub-bands and one 40 MHz sub-band, a twenty-first tone allocation comprising four 5 MHz sub-bands, four 10 MHz sub-bands, and one 20 MHz sub-band, a twenty-second tone allocation comprising six 5 MHz sub-bands, one 10 MHz sub-band, and two 20 MHz sub-bands, a twenty-third tone allocation comprising two 5 MHz sub-bands and seven 10 MHz sub-bands, a twenty-fourth tone allocation comprising eight 5 MHz sub-bands and two 20 MHz sub-bands, a twenty-fifth tone allocation comprising six 5 MHz sub-bands, three 10 MHz sub-bands, and one 20 MHz sub-band, a twenty-sixth tone allocation comprising four 5 MHz sub-bands and six 10 MHz sub-bands, a twenty-seventh tone allocation comprising eight 5 MHz sub-bands, two 10 MHz sub-bands, and one 20 MHz sub-band, a twenty-eighth tone allocation comprising six 5 MHz sub-bands and five 10 MHz sub-bands, a twenty-ninth tone allocation comprising ten 5 MHz sub-bands, one 10 MHz sub-band, and one 20 MHz sub-bands, a thirtieth tone allocation comprising eight 5 MHz sub-bands and four 10 MHz sub-bands, a thirty-first tone allocation comprising ten 5 MHz sub-bands and three 10 MHz sub-bands, a thirty-second tone allocation comprising twelve 5 MHz sub-bands and one 20 MHz sub-band, a thirty-third tone allocation comprising twelve 5 MHz sub-bands and two 10 MHz sub-bands, a thirty-fourth tone allocation comprising fourteen 5 MHz sub-bands and one 10 MHz sub-band, a thirty-fifth tone allocation comprising sixteen 5 MHz sub-bands

1920

Upon selecting a tone allocation, provide the message for transmission over a 80 MHz bandwidth, wherein each 5 MHz sub-band comprises 52 data tones and 4 pilot tones, each 10 MHz sub-band comprises 108 data tones and 6 pilot tones, each 20 MHz sub-band comprises one of 234 or 228 data tones, 8 pilot tones, each 40 MHz sub-band comprises 468 data tones, 16 pilot tones, and wherein the 80 MHz band comprises 990 data tones, 16 pilot tones, and 7 direct current tones

FIG. 19

| RU Size | $N_{SD}$ | BCC | | | LDPC |
|---|---|---|---|---|---|
| | | $N_{COL}$ | $N_{ROT}$ $N_{SS} \leq 4$ | $N_{SS} > 4$ | $D_{TM}$ |
| 26 | 24 | 8 | 2 | 1 | 1 |
| 52 | 48 | 16 | 11 | 6 | 3 |
| 106 | 102 | 17 | 29 | 13 | 6 |
| 242 | 234 | 26 | 58 | 28 | 9 |
| 484 | 468 | No BCC | | | 12 {First Embodiment} |
| | | 26 | 58 | N/A | 9 {Second Embodiment} |
| | | 39 | 116 | 56 | 12 {Third Embodiment} |
| 996 | 980 | No BCC | | | 20 |
| 996x2 | 980x2 | No BCC | | | 20 |

FIG. 20

SYSTEMS AND METHODS FOR IMPROVED COMMUNICATION EFFICIENCY IN WIRELESS NETWORKS

PRIORITY CLAIM

This application claims priority under 35 U.S.C. §119(e) to U.S. Provisional App. No. 62/038,103, filed Aug. 15, 2014, and U.S. Provisional App. No. 62/189,165, filed Jul. 6, 2015, each of which is incorporated by reference herein in its entirety

FIELD

Certain aspects of the present disclosure generally relate to wireless communications, and more particularly, to methods and apparatus for providing messages according to various tone allocations.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks can be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks advantageously facilitate user mobility and rapid field deployment when compared to fixed wired networks.

The devices in a wireless network can transmit/receive information between each other. Device transmissions can interfere with each other, and certain transmissions can selectively block other transmissions. Where many devices share a communication network, congestion and inefficient link usage can result. As such, systems, methods, and non-transitory computer-readable media are needed for improving communication efficiency in wireless networks.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In some aspects, the present disclosure provides an apparatus for wireless communication, which includes a processing system configured to select from a number of 20 MHz tone allocations, wherein a first tone allocation comprising one 20 MHz band, a second tone allocation comprising two 10 MHz sub-bands, a third tone allocation comprising two 5 MHz sub-bands and one 10 MHz sub-band, and a fourth tone allocation comprising four 5 MHz sub-bands. The apparatus, upon selecting a tone allocation, provides the message for transmission over a 20 MHz bandwidth, wherein each 5 MHz sub-band comprises at most 52 data tones and 4 pilot tones, each 10 MHz sub-band comprises at most 108 data tones and 6 pilot tones, and wherein the 20 MHz band comprises at most one of 234 or 228 data tones, 8 pilot tones, and at most one of 3 or 7 direct current tones. In some aspects, the second tone allocation may comprise 7 or 11 guard tones between the sub-bands, 11 edge guard tones, and 10 or 6 leftover tones, the third tone allocation may comprise 3/3 or 7/9 guard tones between the sub-bands, 11 or 9 edge guard tones, and 13 or 5 leftover tones, and the fourth tone allocation may comprise 3/3/3 or 7/17/7 guard tones between the sub-bands, 11 or 7 edge guard tones, and 12 or 4 leftover tones.

In some aspects, the present disclosure provides an apparatus for wireless communication, including a processing system configured to select from a number of 40 MHz tone allocations, wherein a first tone allocation comprising one 40 MHz band, a second tone allocation comprising two 20 MHz sub-bands, a third tone allocation comprising two 10 MHz sub-bands and one 20 MHz sub-band, a fourth tone allocation comprising four 10 MHz sub-bands, a fifth tone allocation comprising two 5 MHz sub-bands, one 10 MHz sub-band and one 20 MHz sub-band, a sixth tone allocation comprising four 5 MHz sub-bands and one 20 MHz sub-band, a seventh tone allocation comprising two 5 MHz sub-bands and three 10 MHz sub-bands, an eighth tone allocation comprising four 5 MHz sub-bands and two 10 MHz sub-bands, a ninth tone allocation comprising six 5 MHz sub-bands and one 10 MHz sub-band, a tenth tone allocation comprising eight 5 MHz sub-bands. Upon selecting a tone allocation, the apparatus provides the message for transmission over a 40 MHz bandwidth, wherein each 5 MHz sub-band comprises 52 data tones and 4 pilot tones, each 10 MHz sub-band comprises 108 data tones and 6 pilot tones, each 20 MHz sub-band comprises one of 234 or 228 data tones, 8 pilot tones, and wherein the 40 MHz band comprises 468 data tones, 16 pilot tones, and 11 direct current tones. In some aspects, the first tone allocation may comprise 11 edge guard tones and 6 leftover tones, the second tone allocation may comprise 7 or 11 guard tones between the sub-bands, 11 edge guard tones, and 10 or 6 leftover tones, the third tone allocation may comprise 3/11 or 11/11 guard tones between the sub-bands, 11 edge guard tones, and 14 or 6 leftover tones, the fourth tone allocation may comprise 3/11/3 or 11/11/11 guard tones between the sub-bands, 11 edge guard tones, and 28 or 12 leftover tones, the fifth tone allocation may comprise 3/3/11 or 7/9/11 guard tones between the sub-bands, 11 or 9 edge guard tones, and 16 or 8 leftover tones, the sixth tone allocation may comprise 3/3/3/11 or 7/7/7/9 guard tones between the sub-bands, 11 or 9 edge guard tones, and 15 or 7 leftover tones, the seventh tone allocation may comprise 3/3/11/3 or 7/9/11/11 guard tones between the sub-bands, 11 or 9 edge guard tones, and 27 or 11 leftover tones, the eighth tone allocation may comprise 3/3/3/11/3 or 7/7/7/9/11 guard tones between the sub-bands, 11 or 9 edge guard tones, and 26 or 10 leftover tones, the ninth tone allocation may comprise 3/3/3/11/3/3 or 7/7/7/7/7/9 guard tones between the sub-bands, 11 or 9 edge guard tones, and 25 or 9 leftover tones, and wherein the tenth tone allocation may comprise 3/3/3/11/3/3/3 or 7/7/7/7/7/7/7 guard tones between the sub-bands, 11 or 7 edge guard tones, and 24 or 8 leftover tones.

In some aspects, an apparatus for wireless communication is described. The apparatus includes a processing system configured to select from a number of 80 MHz tone allocations, wherein a first tone allocation comprising one 80 MHz band, a second tone allocation comprising two 40 MHz sub-bands, a third tone allocation comprising two 20 MHz sub-bands and one 40 MHz sub-band, a fourth tone allocation comprising four 20 MHz sub-bands, a fifth tone allocation comprising two 10 MHz sub-bands, one 20 MHz sub-band and one 40 MHz sub-band, a sixth tone allocation comprising four 10 MHz sub-bands and one 40 MHz sub-band, a seventh tone allocation comprising two 5 MHz sub-bands, one 10 MHz sub-band, one 20 MHz sub-band, and one 40 MHz sub-band, an eighth tone allocation comprising two 10 MHz sub-bands and three 20 MHz sub-bands, a ninth tone allocation comprising two 5 MHz sub-bands, three 10 MHz sub-bands, and one 40 MHz sub-bands, a tenth tone allocation comprising four 5 MHz sub-bands, one 20 MHz sub-band, and one 40 MHz sub-band, an eleventh tone allocation comprising four 10 MHz sub-bands and two 20 MHz sub-bands, a twelfth tone allocation comprising four 5 MHz sub-bands, two 10 MHz sub-bands, and one 40 MHz sub-band, a thirteenth tone allocation comprising six 10 MHz sub-bands and one 20 MHz sub-band, a fourteenth tone allocation comprising two 5 MHz sub-bands, three 10 MHz sub-bands and two 20 MHz sub-bands, a fifteenth tone allocation comprising four 5 MHz sub-bands and three 20 MHz sub-bands, a sixteenth tone allocation comprising eight 10 MHz sub-bands, a seventeenth tone allocation comprising six 5 MHz sub-bands, one 10 MHz sub-band, and one 40 MHz sub-band, an eighteenth tone allocation comprising four 5 MHz sub-bands, two 10 MHz sub-bands and two 20 MHz sub-bands, a nineteenth tone allocation comprising two 5 MHz sub-bands, five 10 MHz sub-bands, and one 20 MHz sub-band, a twentieth tone allocation comprising eight 5 MHz sub-bands and one 40 MHz sub-band, a twenty-first tone allocation comprising four 5 MHz sub-bands, four 10 MHz sub-bands, and one 20 MHz sub-band, a twenty-second tone allocation comprising six 5 MHz sub-bands, one 10 MHz sub-band, and two 20 MHz sub-bands, a twenty-third tone allocation comprising two 5 MHz sub-bands and seven 10 MHz sub-bands, a twenty-fourth tone allocation comprising eight 5 MHz sub-bands and two 20 MHz sub-bands, a twenty-fifth tone allocation comprising six 5 MHz sub-bands, three 10 MHz sub-bands, and one 20 MHz sub-band, a twenty-sixth tone allocation comprising four 5 MHz sub-bands and six 10 MHz sub-bands, a twenty-seventh tone allocation comprising eight 5 MHz sub-bands, two 10 MHz sub-bands, and one 20 MHz sub-band, a twenty-eighth tone allocation comprising six 5 MHz sub-bands and five 10 MHz sub-bands, a twenty-ninth tone allocation comprising ten 5 MHz sub-bands, one 10 MHz sub-band, and one 20 MHz sub-bands, a thirtieth tone allocation comprising eight 5 MHz sub-bands and four 10 MHz sub-bands, a thirty-first tone allocation comprising ten 5 MHz sub-bands and three 10 MHz sub-bands, a thirty-second tone allocation comprising twelve 5 MHz sub-bands and one 20 MHz sub-band, a thirty-third tone allocation comprising twelve 5 MHz sub-bands and two 10 MHz sub-bands, a thirty-fourth tone allocation comprising fourteen 5 MHz sub-bands and one 10 MHz sub-band, and a thirty-fifth tone allocation comprising sixteen 5 MHz sub-bands. The apparatus, upon selecting a tone allocation, provides the message for transmission over a 80 MHz bandwidth, wherein each 5 MHz sub-band comprises 52 data tones and 4 pilot tones, each 10 MHz sub-band comprises 108 data tones and 6 pilot tones, each 20 MHz sub-band comprises one of 234 or 228 data tones, 8 pilot tones, each 40 MHz sub-band comprises 468 data tones, 16 pilot tones, and wherein the 80 MHz band comprises 990 data tones, 16 pilot tones, and 7 direct current tones. In some aspects, the first tone allocation may comprise 11 edge guard tones and no leftover tones, the second tone allocation may comprise 7 or 11 guard tones between the sub-bands, 11 edge guard tones, and 38 or 34 leftover tones, the third tone allocation may comprise 11/7 or 11/11 guard tones between the sub-bands, 11 edge guard tones, and 27 or 23 leftover tones, the fourth tone allocation may comprise 11/7/11 or 11/11/11 guard tones between the sub-bands, 11 edge guard tones, and 16 or 12 leftover tones, the fifth tone allocation may comprise 3/11/7 or 11/11/11 guard tones between the sub-bands, 11 edge guard tones, and 38 or 26 leftover tones, the sixth tone allocation may comprise 3/11/3/7 or 11/11/11/11 guard tones between the sub-bands, 11 edge guard tones, and 49 or 29 leftover tones, the seventh tone allocation may comprise 3/3/11/7 or 7/9/11/11 guard tones between the sub-bands, 11 or 9 edge guard tones, and 37 or 25 leftover tones, the eighth tone allocation may comprise 3/11/7/11 or 11/11/11/11 guard tones between the sub-bands, 11 edge guard tones, and 27 or 15 leftover tones, the ninth tone allocation may comprise 3/3/11/3/7 or 7/9/11/11/11 guard tones between the sub-bands, 11 or 9 edge guard tones, and 48 or 28 leftover tones, the tenth tone allocation may comprise 3/3/3/11/7 or 7/7/7/9/11 guard tones between the sub-bands, 11 or 9 edge guard tones, and 36 or 24 leftover tones, the eleventh tone allocation may comprise 3/11/3/7/11 or 11/11/11/11/11 guard tones between the sub-bands, 11 edge guard tones, and 38 or 18 leftover tones, the twelfth tone allocation may comprise 3/3/3/11/3/7 or 7/7/7/9/11/11 guard tones between the sub-bands, 11 or 9 edge guard tones, and 47 or 27 leftover tones, the thirteenth tone allocation may comprise 3/11/3/7/3/11 or 11/11/11/11/11/11 guard tones between the sub-bands, 11 edge guard tones, and 49 or 21 leftover tones, the fourteenth tone allocation may comprise 3/3/11/3/7/11 or 7/9/11/11/11/11 guard tones between the sub-bands, 11 or 9 edge guard tones, and 37 or 17 leftover tones, the fifteenth tone allocation may comprise 3/3/3/11/7/11 or 7/7/7/9/11/11 guard tones between the sub-bands, 11 or 9 edge guard tones, and 25 or 13 leftover tones, the sixteenth tone allocation may comprise 3/11/3/7/7/11/3 or 11/11/11/11/11/11/11 guard tones between the sub-bands, 11 edge guard tones, and 60 or 24 leftover tones, the seventeenth tone allocation may comprise 3/3/3/11/3/3/7 or 7/7/7/7/7/9/11 guard tones between the sub-bands, 11 or 9 edge guard tones, and 46 or 26 leftover tones, the eighteenth tone allocation may comprise 3/3/3/11/3/7/11 or 7/7/7/9/11/11/11 guard tones between the sub-bands, 11 or 9 edge guard tones, and 36 or 16 leftover tones, the nineteenth tone allocation may comprise 3/3/11/3/7/3/11 or 7/9/11/11/11/11/11 guard tones between the sub-bands, 11 or 9 edge guard tones, and 48 or 16 leftover tones, the twentieth tone allocation may comprise 3/3/3/11/3/3/3/7 or 7/7/7/7/7/7/7/9 guard tones between the sub-bands, 11 or 9 edge guard tones, and 45 or 25 leftover tones, the twenty-first tone allocation may comprise 3/3/3/11/3/7/3/11 or 7/7/7/9/11/11/11/11 guard tones between the sub-bands, 11 or 9 edge guard tones, and 47 or 19 leftover tones, the twenty-second tone allocation may comprise 3/3/3/11/3/3/7/11 or 7/7/7/7/7/9/11/11 guard tones between the sub-bands, 11 or 9 edge guard tones, and 35 or 15 leftover tones, the twenty-third tone allocation may comprise 3/3/11/3/7/3/11/3 or 7/9/11/11/11/11/11/11 guard tones between the sub-bands, 11 or 9 edge guard tones, and 59 or 23 leftover tones, the twenty-fourth tone allocation may comprise 3/3/3/11/3/3/3/7/11 or 7/7/7/7/7/7/9/11 guard tones between the sub-bands, 11 or 9 edge guard tones, and 34 or 14 leftover tones, the twenty-fifth tone allocation may comprise 3/3/3/11/3/3/7/3/11 or 7/7/7/7/7/9/11/11/11 guard tones between the sub-bands, 11 or 9 edge guard tones, and 46 or 18 leftover tones, the twenty-sixth tone allocation may comprise 3/3/3/11/3/7/3/11/3 or 7/7/7/9/11/11/11/11/11 guard tones between the sub-bands, 11 or 9 edge guard tones, and 58 or 22 leftover tones, the twenty-seventh tone allocation may comprise 3/3/3/11/3/3/3/7/3/11 or 7/7/7/7/7/7/7/9/11/11 guard tones between the sub-bands, 11 or 9 edge guard tones, and 45 or 17 leftover tones, the twenty-eighth tone allocation may comprise 3/3/3/11/3/3/7/3/11/3 or 7/7/7/7/7/9/11/11/11/11 guard tones between the sub-bands, 11 or 9 edge guard tones, and 57 or 21 leftover tones, the twenty-ninth tone allocation may comprise 3/3/3/11/3/3/3/7/3/3/11 or 7/7/7/7/7/7/7/7/9/11 guard tones between the sub-bands, 11 or 9 edge guard tones, and 44 or 16 leftover tones, the thirtieth tone allocation may comprise 3/3/3/11/3/3/3/7/3/11/3 or 7/7/7/7/7/7/7/9/11/11/11 guard tones between the sub-bands, 11 or 9 edge guard tones, and 56 or 20 leftover tones, the thirty-first tone allocation may comprise 3/3/3/11/3/3/3/7/3/3/11/3 or 7/7/7/7/7/7/7/7/9/11/11 guard tones between the sub-bands, 11 or 9 edge guard tones, and or 19 leftover tones, the thirty-second tone allocation may comprise 3/3/3/11/3/3/3/7/3/3/3/11 or 7/7/7/7/7/7/7/7/7/7/9 guard tones between the sub-bands, 11 or 9 edge guard tones, and 43 or 15 leftover tones, the thirty-third tone allocation may comprise 3/3/3/11/3/3/3/7/3/3/3/11/3 or 7/7/7/7/7/7/7/7/7/7/9/11 guard tones between the sub-bands, 11 or 9 edge guard tones, and 54 or 18 leftover tones, the thirty-fourth tone allocation may comprise 3/3/3/11/3/3/3/7/3/3/3/11/3 or 7/7/7/7/7/7/7/7/7/7/7/9 guard tones between the sub-bands, 11 or 9 edge guard tones, and 53 or 17 leftover tones, and the thirty-fifth tone allocation may comprise 3/3/3/11/3/3/3/7/3/3/3/11/3/3/3 or 7/7/7/7/7/7/7/7/7/7/7/7/7 guard tones between the sub-bands, 11 or 9 edge guard tones, and 52 or 14 leftover tones.

In some aspects, a method of wireless communication is disclosed, including selecting from a number of 20 MHz tone allocations, wherein a first tone allocation comprising one 20 MHz band, a second tone allocation comprising two 10 MHz sub-bands, a third tone allocation comprising two 5 MHz sub-bands and one 10 MHz sub-band, and a fourth tone allocation comprising four 5 MHz sub-bands, and upon selecting a tone allocation, providing the message for transmission over a 20 MHz bandwidth, wherein each 5 MHz sub-band comprises at most 52 data tones and 4 pilot tones, each 10 MHz sub-band comprises at most 108 data tones and 6 pilot tones, and wherein the 20 MHz band comprises at most one of 234 or 228 data tones, 8 pilot tones, and at most one of 3 or 7 direct current tones.

In some aspects, a method of wireless communication is described, including selecting from a number of 40 MHz tone allocations, wherein a first tone allocation comprising one 40 MHz band, a second tone allocation comprising two 20 MHz sub-bands, a third tone allocation comprising two 10 MHz sub-bands and one 20 MHz sub-band, a fourth tone allocation comprising four 10 MHz sub-bands, a fifth tone allocation comprising two 5 MHz sub-bands, one 10 MHz sub-band and one 20 MHz sub-band, a sixth tone allocation comprising four 5 MHz sub-bands and one 20 MHz sub-band, a seventh tone allocation comprising two 5 MHz sub-bands and three 10 MHz sub-bands, an eighth tone allocation comprising four 5 MHz sub-bands and two 10 MHz sub-bands, a ninth tone allocation comprising six 5 MHz sub-bands and one 10 MHz sub-band, a tenth tone allocation comprising eight 5 MHz sub-bands, upon selecting a tone allocation, providing the message for transmission over a 40 MHz bandwidth, wherein each 5 MHz sub-band comprises 52 data tones and 4 pilot tones, each 10 MHz sub-band comprises 108 data tones and 6 pilot tones, each 20 MHz sub-band comprises one of 234 or 228 data tones, 8 pilot tones, and wherein the 40 MHz band comprises 468 data tones, 16 pilot tones, and 11 direct current tones.

In some aspects, a method of wireless communication is disclosed, including selecting from a number of 80 MHz tone allocations, wherein a first tone allocation comprising one 80 MHz band, a second tone allocation comprising two 40 MHz sub-bands, a third tone allocation comprising two 20 MHz sub-bands and one 40 MHz sub-band, a fourth tone allocation comprising four 20 MHz sub-bands, a fifth tone allocation comprising two 10 MHz sub-bands, one 20 MHz sub-band and one 40 MHz sub-band, a sixth tone allocation comprising four 10 MHz sub-bands and one 40 MHz sub-band, a seventh tone allocation comprising two 5 MHz sub-bands, one 10 MHz sub-band, one 20 MHz sub-band, and one 40 MHz sub-band, an eighth tone allocation comprising two 10 MHz sub-bands and three 20 MHz sub-bands, a ninth tone allocation comprising two 5 MHz sub-bands, three 10 MHz sub-bands, and one 40 MHz sub-bands, a tenth tone allocation comprising four 5 MHz sub-bands, one 20 MHz sub-band, and one 40 MHz sub-band, an eleventh tone allocation comprising four 10 MHz sub-bands and two 20 MHz sub-bands, a twelfth tone allocation comprising four 5 MHz sub-bands, two 10 MHz sub-bands, and one 40 MHz sub-band, a thirteenth tone allocation comprising six 10 MHz sub-bands and one 20 MHz sub-band, a fourteenth tone allocation comprising two 5 MHz sub-bands, three 10 MHz sub-bands and two 20 MHz sub-bands, a fifteenth tone allocation comprising four 5 MHz sub-bands and three 20 MHz sub-bands, a sixteenth tone allocation comprising eight 10 MHz sub-bands, a seventeenth tone allocation comprising six 5 MHz sub-bands, one 10 MHz sub-band, and one 40 MHz sub-band, an eighteenth tone allocation comprising four 5 MHz sub-bands, two 10 MHz sub-bands and two 20 MHz sub-bands, a nineteenth tone allocation comprising two 5 MHz sub-bands, five 10 MHz sub-bands, and one 20 MHz sub-band, a twentieth tone allocation comprising eight 5 MHz sub-bands and one 40 MHz sub-band, a twenty-first tone allocation comprising four 5 MHz sub-bands, four 10 MHz sub-bands, and one 20 MHz sub-band, a twenty-second tone allocation comprising six 5 MHz sub-bands, one 10 MHz sub-band, and two 20 MHz sub-bands, a twenty-third tone allocation comprising two 5 MHz sub-bands and seven 10 MHz sub-bands, a twenty-fourth tone allocation comprising eight 5 MHz sub-bands and two 20 MHz sub-bands, a twenty-fifth tone allocation comprising six 5 MHz sub-bands, three 10 MHz sub-bands, and one 20 MHz sub-band, a twenty-sixth tone allocation comprising four 5 MHz sub-bands and six 10 MHz sub-bands, a twenty-seventh tone allocation comprising eight 5 MHz sub-bands, two 10 MHz sub-bands, and one 20 MHz sub-band, a twenty-eighth tone allocation comprising six 5 MHz sub-bands and five 10 MHz sub-bands, a twenty-ninth tone allocation comprising ten 5 MHz sub-bands, one 10 MHz sub-band, and one 20 MHz sub-bands, a thirtieth tone allocation comprising eight 5 MHz sub-bands and four 10 MHz sub-bands, a thirty-first tone allocation comprising ten 5 MHz sub-bands and three 10 MHz sub-bands, a thirty-second tone allocation comprising twelve 5 MHz sub-bands and one 20 MHz sub-band, a thirty-third tone allocation comprising twelve 5 MHz sub-bands and two 10 MHz sub-bands, a thirty-fourth tone allocation comprising fourteen 5 MHz sub-bands and one 10 MHz sub-band, a thirty-fifth tone allocation comprising sixteen 5 MHz sub-bands, upon selecting a tone allocation, providing the message for transmission over a 80 MHz bandwidth, wherein each 5 MHz sub-band comprises 52 data tones and 4 pilot tones, each 10 MHz sub-band comprises 108 data tones and 6 pilot tones, each 20 MHz sub-band comprises one of 234 or 228 data tones, 8 pilot tones, each 40 MHz sub-band comprises 468 data tones, 16 pilot tones, and wherein the 80 MHz band comprises 990 data tones, 16 pilot tones, and 7 direct current tones.

In some aspects, an apparatus for wireless communication is provided, including means for selecting from a number of 20 MHz tone allocations, wherein a first tone allocation comprising one 20 MHz band, a second tone allocation comprising two 10 MHz sub-bands, a third tone allocation comprising two 5 MHz sub-bands and one 10 MHz sub-band, and a fourth tone allocation comprising four 5 MHz sub-bands, and means for providing the message for transmission over a 20 MHz bandwidth upon selecting a tone allocation, wherein each 5 MHz sub-band comprises at most 52 data tones and 4 pilot tones, each 10 MHz sub-band comprises at most 108 data tones and 6 pilot tones, and wherein the 20 MHz band comprises at most one of 234 or 228 data tones, 8 pilot tones, and at most one of 3 or 7 direct current tones.

In some aspects, an apparatus for wireless communication is disclosed, including means for selecting from a number of 40 MHz tone allocations, wherein a first tone allocation comprising one 40 MHz band, a second tone allocation comprising two 20 MHz sub-bands, a third tone allocation comprising two 10 MHz sub-bands and one 20 MHz sub-band, a fourth tone allocation comprising four 10 MHz sub-bands, a fifth tone allocation comprising two 5 MHz sub-bands, one 10 MHz sub-band and one 20 MHz sub-band, a sixth tone allocation comprising four 5 MHz sub-bands and one 20 MHz sub-band, a seventh tone allocation comprising two 5 MHz sub-bands and three 10 MHz sub-bands, an eighth tone allocation comprising four 5 MHz sub-bands and two 10 MHz sub-bands, a ninth tone allocation comprising six 5 MHz sub-bands and one 10 MHz sub-band, a tenth tone allocation comprising eight 5 MHz sub-bands, means for providing the message for transmission over a 40 MHz bandwidth upon selecting a tone allocation, wherein each 5 MHz sub-band comprises 52 data tones and 4 pilot tones, each 10 MHz sub-band comprises 108 data tones and 6 pilot tones, each 20 MHz sub-band comprises one of 234 or 228 data tones, 8 pilot tones, and wherein the 40 MHz band comprises 468 data tones, 16 pilot tones, and 11 direct current tones.

In some aspects, an apparatus for wireless communication is disclosed, including means for selecting from a number of 80 MHz tone allocations, wherein a first tone allocation comprising one 80 MHz band, a second tone allocation comprising two 40 MHz sub-bands, a third tone allocation comprising two 20 MHz sub-bands and one 40 MHz sub-band, a fourth tone allocation comprising four 20 MHz sub-bands, a fifth tone allocation comprising two 10 MHz sub-bands, one 20 MHz sub-band and one 40 MHz sub-band, a sixth tone allocation comprising four 10 MHz sub-bands and one 40 MHz sub-band, a seventh tone allocation comprising two 5 MHz sub-bands, one 10 MHz sub-band, one 20 MHz sub-band, and one 40 MHz sub-band, an eighth tone allocation comprising two 10 MHz sub-bands and three 20 MHz sub-bands, a ninth tone allocation comprising two 5 MHz sub-bands, three 10 MHz sub-bands, and one 40 MHz sub-bands, a tenth tone allocation comprising four 5 MHz sub-bands, one 20 MHz sub-band, and one 40 MHz sub-band, an eleventh tone allocation comprising four 10 MHz sub-bands and two 20 MHz sub-bands, a twelfth tone allocation comprising four 5 MHz sub-bands, two 10 MHz sub-bands, and one 40 MHz sub-band, a thirteenth tone allocation comprising six 10 MHz sub-bands and one 20 MHz sub-band, a fourteenth tone allocation comprising two 5 MHz sub-bands, three 10 MHz sub-bands and two 20 MHz sub-bands, a fifteenth tone allocation comprising four 5 MHz sub-bands and three 20 MHz sub-bands, a sixteenth tone allocation comprising eight 10 MHz sub-bands, a seventeenth tone allocation comprising six 5 MHz sub-bands, one 10 MHz sub-band, and one 40 MHz sub-band, an eighteenth tone allocation comprising four 5 MHz sub-bands, two 10 MHz sub-bands and two 20 MHz sub-bands, a nineteenth tone allocation comprising two 5 MHz sub-bands, five 10 MHz sub-bands, and one 20 MHz sub-band, a twentieth tone allocation comprising eight 5 MHz sub-bands and one 40 MHz sub-band, a twenty-first tone allocation comprising four 5 MHz sub-bands, four 10 MHz sub-bands, and one 20 MHz sub-band, a twenty-second tone allocation comprising six 5 MHz sub-bands, one 10 MHz sub-band, and two 20 MHz sub-bands, a twenty-third tone allocation comprising two 5 MHz sub-bands and seven 10 MHz sub-bands, a twenty-fourth tone allocation comprising eight 5 MHz sub-bands and two 20 MHz sub-bands, a twenty-fifth tone allocation comprising six 5 MHz sub-bands, three 10 MHz sub-bands, and one 20 MHz sub-band, a twenty-sixth tone allocation comprising four 5 MHz sub-bands and six 10 MHz sub-bands, a twenty-seventh tone allocation comprising eight 5 MHz sub-bands, two 10 MHz sub-bands, and one 20 MHz sub-band, a twenty-eighth tone allocation comprising six 5 MHz sub-bands and five 10 MHz sub-bands, a twenty-ninth tone allocation comprising ten 5 MHz sub-bands, one 10 MHz sub-band, and one 20 MHz sub-bands, a thirtieth tone allocation comprising eight 5 MHz sub-bands and four 10 MHz sub-bands, a thirty-first tone allocation comprising ten 5 MHz sub-bands and three 10 MHz sub-bands, a thirty-second tone allocation comprising twelve 5 MHz sub-bands and one 20 MHz sub-band, a thirty-third tone allocation comprising twelve 5 MHz sub-bands and two 10 MHz sub-bands, a thirty-fourth tone allocation comprising fourteen 5 MHz sub-bands and one 10 MHz sub-band, a thirty-fifth tone allocation comprising sixteen 5 MHz sub-bands, means for providing the message for transmission over a 80 MHz bandwidth upon selecting a tone allocation, wherein each 5 MHz sub-band comprises 52 data tones and 4 pilot tones, each 10 MHz sub-band comprises 108 data tones and 6 pilot tones, each 20 MHz sub-band comprises one of 234 or 228 data tones, 8 pilot tones, each 40 MHz sub-band comprises 468 data tones, 16 pilot tones, and wherein the 80 MHz band comprises 990 data tones, 16 pilot tones, and 7 direct current tones.

One aspect of the present disclosure provides a non-transitory computer-readable medium comprising code that, when executed, causes an apparatus to select from a number of 20 MHz tone allocations, wherein a first tone allocation comprising one 20 MHz band, a second tone allocation comprising two 10 MHz sub-bands, a third tone allocation comprising two 5 MHz sub-bands and one 10 MHz sub-band, and a fourth tone allocation comprising four 5 MHz sub-bands, and provide the message for transmission over a 20 MHz bandwidth upon selecting a tone allocation, wherein each 5 MHz sub-band comprises at most 52 data tones and 4 pilot tones, each 10 MHz sub-band comprises at most 108 data tones and 6 pilot tones, and wherein the 20 MHz band comprises at most one of 234 or 228 data tones, 8 pilot tones, and at most one of 3 or 7 direct current tones.

One aspect of the present disclosure provides a non-transitory computer-readable medium comprising code that, when executed, causes an apparatus to select from a number of 40 MHz tone allocations, wherein a first tone allocation comprising one 40 MHz band, a second tone allocation comprising two 20 MHz sub-bands, a third tone allocation comprising two 10 MHz sub-bands and one 20 MHz sub-band, a fourth tone allocation comprising four 10 MHz sub-bands, a fifth tone allocation comprising two 5 MHz sub-bands, one 10 MHz sub-band and one 20 MHz sub-band, a sixth tone allocation comprising four 5 MHz sub-bands and one 20 MHz sub-band, a seventh tone allocation comprising two 5 MHz sub-bands and three 10 MHz sub-bands, an eighth tone allocation comprising four 5 MHz sub-bands and two 10 MHz sub-bands, a ninth tone allocation comprising six 5 MHz sub-bands and one 10 MHz sub-band, a tenth tone allocation comprising eight 5 MHz sub-bands, provide the message for transmission over a 40 MHz bandwidth upon selecting a tone allocation, wherein each 5 MHz sub-band comprises 52 data tones and 4 pilot tones, each 10 MHz sub-band comprises 108 data tones and 6 pilot tones, each 20 MHz sub-band comprises one of 234 or 228 data tones, 8 pilot tones, and wherein the 40 MHz band comprises 468 data tones, 16 pilot tones, and 11 direct current tones.

One aspect of the present disclosure provides a non-transitory computer-readable medium comprising code that, when executed, causes an apparatus to select from a number of 80 MHz tone allocations, wherein a first tone allocation comprising one 80 MHz band, a second tone allocation comprising two 40 MHz sub-bands, a third tone allocation comprising two 20 MHz sub-bands and one 40 MHz sub-band, a fourth tone allocation comprising four 20 MHz sub-bands, a fifth tone allocation comprising two 10 MHz sub-bands, one 20 MHz sub-band and one 40 MHz sub-band, a sixth tone allocation comprising four 10 MHz sub-bands and one 40 MHz sub-band, a seventh tone allocation comprising two 5 MHz sub-bands, one 10 MHz sub-band, one 20 MHz sub-band, and one 40 MHz sub-band, an eighth tone allocation comprising two 10 MHz sub-bands and three 20 MHz sub-bands, a ninth tone allocation comprising two 5 MHz sub-bands, three 10 MHz sub-bands, and one 40 MHz sub-bands, a tenth tone allocation comprising four 5 MHz sub-bands, one 20 MHz sub-band, and one 40 MHz sub-band, an eleventh tone allocation comprising four 10 MHz sub-bands and two 20 MHz sub-bands, a twelfth tone allocation comprising four 5 MHz sub-bands, two 10 MHz sub-bands, and one 40 MHz sub-band, a thirteenth tone allocation comprising six 10 MHz sub-bands and one 20 MHz sub-band, a fourteenth tone allocation comprising two 5 MHz sub-bands, three 10 MHz sub-bands and two 20 MHz sub-bands, a fifteenth tone allocation comprising four 5 MHz sub-bands and three 20 MHz sub-bands, a sixteenth tone allocation comprising eight 10 MHz sub-bands, a seventeenth tone allocation comprising six 5 MHz sub-bands, one 10 MHz sub-band, and one 40 MHz sub-band, an eighteenth tone allocation comprising four 5 MHz sub-bands, two 10 MHz sub-bands and two 20 MHz sub-bands, a nineteenth tone allocation comprising two 5 MHz sub-bands, five 10 MHz sub-bands, and one 20 MHz sub-band, a twentieth tone allocation comprising eight 5 MHz sub-bands and one 40 MHz sub-band, a twenty-first tone allocation comprising four 5 MHz sub-bands, four 10 MHz sub-bands, and one 20 MHz sub-band, a twenty-second tone allocation comprising six 5 MHz sub-bands, one 10 MHz sub-band, and two 20 MHz sub-bands, a twenty-third tone allocation comprising two 5 MHz sub-bands and seven 10 MHz sub-bands, a twenty-fourth tone allocation comprising eight 5 MHz sub-bands and two 20 MHz sub-bands, a twenty-fifth tone allocation comprising six 5 MHz sub-bands, three 10 MHz sub-bands, and one 20 MHz sub-band, a twenty-sixth tone allocation comprising four 5 MHz sub-bands and six 10 MHz sub-bands, a twenty-seventh tone allocation comprising eight 5 MHz sub-bands, two 10 MHz sub-bands, and one 20 MHz sub-band, a twenty-eighth tone allocation comprising six 5 MHz sub-bands and five 10 MHz sub-bands, a twenty-ninth tone allocation comprising ten 5 MHz sub-bands, one 10 MHz sub-band, and one 20 MHz sub-bands, a thirtieth tone allocation comprising eight 5 MHz sub-bands and four 10 MHz sub-bands, a thirty-first tone allocation comprising ten 5 MHz sub-bands and three 10 MHz sub-bands, a thirty-second tone allocation comprising twelve 5 MHz sub-bands and one 20 MHz sub-band, a thirty-third tone allocation comprising twelve 5 MHz sub-bands and two 10 MHz sub-bands, a thirty-fourth tone allocation comprising fourteen 5 MHz sub-bands and one 10 MHz sub-band, a thirty-fifth tone allocation comprising sixteen 5 MHz sub-bands, provide the message for transmission over a 80 MHz bandwidth upon selecting a tone allocation, wherein each 5 MHz sub-band comprises 52 data tones and 4 pilot tones, each 10 MHz sub-band comprises 108 data tones and 6 pilot tones, each 20 MHz sub-band comprises one of 234 or 228 data tones, 8 pilot tones, each 40 MHz sub-band comprises 468 data tones, 16 pilot tones, and wherein the 80 MHz band comprises 990 data tones, 16 pilot tones, and 7 direct current tones.

Another aspect provides another apparatus configured to perform wireless communication. The apparatus includes a memory that stores instructions. The apparatus further includes a processor coupled with the memory and configured to execute the instructions to generate a message for wireless communication according to a 484-tone allocation unit. The 484-tone allocation unit includes 468 data tones. The processor is further configured to map tones of the message using a tone mapping distance (DTM) of 12 for low density parity check (LDPC). The processor is further configured to provide the message for transmission.

Another aspect provides another apparatus configured to perform wireless communication. The apparatus includes a memory that stores instructions. The apparatus further includes a processor coupled with the memory and configured to execute the instructions to generate a message for wireless communication according to a 484-tone allocation unit. The 484-tone allocation unit includes 468 data tones. The processor is further configured to map tones of the message using a tone mapping distance (DTM) of 9 for low density parity check (LDPC). The processor is further configured to provide the message for transmission. The apparatus further includes an interleaver configured to interleave encoded data, and generate a series of interleaved bits for transmission based on the interleaved encoded data. The interleaver includes one or more stream interleavers corresponding to one or more spatial streams. The one or more stream interleavers include an interleaver depth of 26 and an interleaved rotation index of 58 for up to four spatial streams.

Another aspect provides another apparatus configured to perform wireless communication. The apparatus includes a memory that stores instructions. The apparatus includes a processor coupled with the memory and configured to execute the instructions to generate a message for wireless communication according to a 484-tone allocation unit. The 484-tone allocation unit includes 468 data tones. The processor is further configured to map tones of the message using a tone mapping distance (DTM) of 12 for low density parity check (LDPC). The processor is further configured to provide the message for transmission. The apparatus further includes an interleaver configured to interleave encoded data and generate a series of interleaved bits for transmission based on the interleaved encoded data. The interleaver includes one or more stream interleavers corresponding to one or more spatial streams. The one or more stream interleavers include an interleaver depth of 39, an interleaved rotation index of 116 for up to four spatial streams, and an interleaved rotation index of 56 for more than four spatial streams.

Another aspect provides another apparatus configured to perform wireless communication. The apparatus includes a memory that stores instructions. The apparatus further includes a processing system coupled with the memory and configured to execute the instructions to select at least one of a 242-tone resource unit (RU), associated with a 256-tone plan including 234 data tones, 8 pilot tones, 3 direct current tones, and 11 edge tones, for transmission over a 20 MHz bandwidth, or a 484-tone RU, associated with a 512-tone plan including 468 data tones, 16 pilot tones, 5 direct current tones, and 23 edge tones, for transmission over a 40 MHz bandwidth. The processing system is further configured to provide a message for transmission according to the 256-tone plan or 512-tone plan.

In various embodiments, the processing system can be configured to select the 242-tone RU and provide the message for transmission according to the 256-tone plan. The processing system can be configured to either interleave encoded data using an interleaver depth of 26, an interleaved rotation index of 58 for up to four spatial streams, for binary convolutional code (BCC) interleaving, or map tones of the message using a tone mapping distance (DTM) of 9 for low density parity check (LDPC). In various embodiments, the processing system can be configured to select the 484-tone RU, provide the message for transmission according to the 512-tone plan, map tones of the message using a tone mapping distance (DTM) of 12 for low density parity check (LDPC), and refrain from performing binary convolutional code interleaving map tones of the message.

In various embodiments, the processing system can be further configured, for the 484-tone RU, to either interleave encoded data using an interleaver depth of 26 and an interleaved rotation index of 58 for up to four spatial streams, or map tones of the message using a tone mapping distance (DTM) of 9 for low density parity check (LDPC). In various embodiments, the processing system can be further configured, for the 484-tone RU, to either interleave encoded data using an interleaver depth of 39, an interleaved rotation index of 116 for up to four spatial streams, and an interleaved rotation index of 56 for more than four spatial streams, or map tones of the message using a tone mapping distance (DTM) of 12 for low density parity check (LDPC).

In various embodiments, the processing system can be further configured to perform binary convolutional code (BCC) interleaving for RU sizes less than or equal to 242 tones, wherein BCC interleaving can be limited to transmissions over less than or equal to four spatial streams for all RU sizes. In various embodiments, the processing system can be further configured to map tones of the message using a low density parity check (LDPC) for transmission to stations declaring support for at least one of 40, 80, 160, or 80 plus 80 MHz single-user bandwidths, or to stations declaring support for more than 4 spatial streams.

In various embodiments, the apparatus can be a mobile station, and wherein the processing system can be configured to provide the message for transmission by being configured to transmit the message through a transmitter and an antenna of the mobile station to an access point serving the mobile station. In various embodiments, the apparatus can be an access point, and wherein the processing system can be configured to provide the message for transmission by being configured to transmit the message through a transmitter and an antenna of the access point to a mobile station served by the access point.

Another aspect provides another method for wireless communication. The method includes selecting at least one of a 242-tone resource unit (RU), associated with a 256-tone plan including 234 data tones, 8 pilot tones, 3 direct current tones, and 11 edge tones, for transmission over a 20 MHz bandwidth, or a 484-tone RU, associated with a 512-tone plan including 468 data tones, 16 pilot tones, 5 direct current tones, and 23 edge tones, for transmission over a 40 MHz bandwidth. The method further includes providing a message for transmission according to the 256-tone plan or 512-tone plan.

In various embodiments, the step of selecting can include selecting the 242-tone RU. The step of providing can include providing the message for transmission according to the 256-tone plan. The method can further include either interleaving encoded data using an interleaver depth of 26, an interleaved rotation index of 58 for up to four spatial streams, for binary convolutional code (BCC) interleaving, or mapping tones of the message using a tone mapping distance (DTM) of 9 for low density parity check (LDPC). In various embodiments, the step of selecting can include selecting the 484-tone RU. The step of providing can include providing the message for transmission according to the 512-tone plan. The method can further include mapping tones of the message using a tone mapping distance (DTM) of 12 for low density parity check (LDPC), and refraining from performing binary convolutional code interleaving map tones of the message.

In various embodiments, the method can further include selecting the 242-tone RU and providing the message for transmission according to the 256-tone plan. The method can further include either interleaving encoded data using an interleaver depth of 26, an interleaved rotation index of 58 for up to four spatial streams, for binary convolutional code (BCC) interleaving, or mapping tones of the message using a tone mapping distance (DTM) of 9 for low density parity check (LDPC). In various embodiments, the method can further include selecting the 484-tone RU. In various embodiments, the method can further include providing the message for transmission according to the 512-tone plan. In various embodiments, the method can further include mapping tones of the message using a tone mapping distance (DTM) of 12 for low density parity check (LDPC). In various embodiments, the method can further include refraining from performing binary convolutional code interleaving map tones of the message.

In various embodiments, the method can further include, for the 484-tone RU, either interleaving encoded data using an interleaver depth of 26 and an interleaved rotation index of 58 for up to four spatial streams, or mapping tones of the message using a tone mapping distance (DTM) of 9 for low density parity check (LDPC). In various embodiments, the method can further include, for the 484-tone RU, either interleaving encoded data using an interleaver depth of 39, an interleaved rotation index of 116 for up to four spatial streams, and an interleaved rotation index of 56 for more than four spatial streams, or mapping tones of the message using a tone mapping distance (DTM) of 12 for low density parity check (LDPC).

In various embodiments, the method can further include performing binary convolutional code (BCC) interleaving for RU sizes less than or equal to 242 tones, and limiting BCC interleaving to transmissions over less than or equal to four spatial streams. In various embodiments, the method can further include mapping tones of the message using a low density parity check (LDPC) for transmission to stations declaring support for at least one of 40, 80, 160, or 80 plus 80 MHz single-user bandwidths, or to stations declaring support for more than 4 spatial streams.

In various embodiments, the method can be performed on a mobile station, and wherein providing the message for transmission includes transmitting the message through a transmitter and an antenna of the mobile station to an access point serving the mobile station. In various embodiments, the method can be performed on an access point, and wherein providing the message for transmission includes transmitting the message through a transmitter and an antenna of the access point to a mobile station served by the access point.

Another aspect provides another apparatus for wireless communication. The apparatus includes means for selecting at least one of a 242-tone resource unit (RU), associated with a 256-tone plan including 234 data tones, 8 pilot tones, 3 direct current tones, and 11 edge tones, for transmission over a 20 MHz bandwidth, or a 484-tone RU, associated with a 512-tone plan including 468 data tones, 16 pilot tones, 5 direct current tones, and 23 edge tones, for transmission over a 40 MHz bandwidth. The apparatus further includes means for providing the message for transmission according to the 256-tone plan or 512-tone plan.

In various embodiments, the means for selecting can include means for selecting the 242-tone RU. The means for providing can include means for providing the message for transmission according to the 256-tone plan. The apparatus can further include means for either interleaving encoded data using an interleaver depth of 26, an interleaved rotation index of 58 for up to four spatial streams, for binary convolutional code (BCC) interleaving, or mapping tones of the message using a tone mapping distance (DTM) of 9 for low density parity check (LDPC). In various embodiments, the means for selecting can include means for selecting the 484-tone RU. The means for providing can include means for providing the message for transmission according to the 512-tone plan. The apparatus can further include means for mapping tones of the message using a tone mapping distance (DTM) of 12 for low density parity check (LDPC), and refraining from performing binary convolutional code interleaving map tones of the message.

In various embodiments, the apparatus can further include, for the 484-tone RU, means for either interleaving encoded data using an interleaver depth of 26 and an interleaved rotation index of 58 for up to four spatial streams, or mapping tones of the message using a tone mapping distance (DTM) of 9 for low density parity check (LDPC). In various embodiments, the apparatus can further include, for the 484-tone RU, means for either interleaving encoded data using an interleaver depth of 39, an interleaved rotation index of 116 for up to four spatial streams, and an interleaved rotation index of 56 for more than four spatial streams, or mapping tones of the message using a tone mapping distance (DTM) of 12 for low density parity check (LDPC).

In various embodiments, the apparatus can further include means for performing binary convolutional code (BCC) interleaving for RU sizes less than or equal to 242 tones, wherein BCC interleaving can be limited to transmissions over less than or equal to four spatial streams for all RU sizes. In various embodiments, the apparatus can further include means for mapping tones of the message using a low density parity check (LDPC) for transmission to stations declaring support for at least one of 40, 80, 160, or 80 plus 80 MHz single-user bandwidths, or to stations declaring support for more than 4 spatial streams.

In various embodiments, the apparatus can be a mobile station, and wherein means for providing the message for transmission includes means for transmitting the message through a transmitter and an antenna of the mobile station to an access point serving the mobile station. In various embodiments, the apparatus can be an access point, and wherein means for providing the message for transmission includes means for transmitting the message through a transmitter and an antenna of the access point to a mobile station served by the access point.

Another aspect provides another non-transitory computer-readable medium. The medium includes code that, when executed, causes the apparatus to select at least one of a 242-tone resource unit (RU), associated with a 256-tone plan including 234 data tones, 8 pilot tones, 3 direct current tones, and 11 edge tones, for transmission over a 20 MHz bandwidth, or a 484-tone RU, associated with a 512-tone plan including 468 data tones, 16 pilot tones, 5 direct current tones, and 23 edge tones, for transmission over a 40 MHz bandwidth. The medium further includes code that, when executed, causes the apparatus to provide the message for transmission according to the 256-tone plan or 512-tone plan.

In various embodiments, the medium can further include code that, when executed, causes the apparatus, for the 242-tone RU, to either interleave encoded data using an interleaver depth of 26, an interleaved rotation index of 58 for up to four spatial streams, for binary convolutional code (BCC) interleaving, or map tones of the message using a tone mapping distance (DTM) of 9 for low density parity check (LDPC). In various embodiments, the medium can further include code that, when executed, causes the apparatus, for the 484-tone RU, to map tones of the message using a tone mapping distance (DTM) of 12 for low density parity check (LDPC), and refrain from performing binary convolutional code interleaving map tones of the message.

In various embodiments, the medium can further include code that, when executed, causes the apparatus to perform binary convolutional code (BCC) interleaving for RU sizes less than or equal to 242 tones, wherein BCC interleaving is limited to transmissions over less than or equal to four spatial streams for all RU sizes. In various embodiments, the medium can further include code that, when executed, causes the apparatus to map tones of the message using a low density parity check (LDPC) for transmission to stations declaring support for at least one of 40, 80, 160, or 80 plus 80 MHz single-user bandwidths, or to stations declaring support for more than 4 spatial streams.

In various embodiments, the apparatus can be a mobile station, and providing the message for transmission an include transmitting the message through a transmitter and an antenna of the mobile station to an access point serving the mobile station. In various embodiments, the apparatus can be an access point, and providing the message for transmission can include transmitting the message through a transmitter and an antenna of the access point to a mobile station served by the access point.

BRIEF DESCRIPTION OF THE DRAWINGS

FIG. 4 is an illustration of a general tone plan which may be used for a number of different bandwidths in accordance with aspects of this disclosure.

FIG. 5 is an exemplary illustration of tone allocations which may be used in a 20 MHz transmission.

FIG. 6 is an exemplary illustration of tone allocations which may be used in a 40 MHz transmission.

FIG. 7 is an exemplary illustration of additional tone allocations which may be used in a 40 MHz transmission.

FIG. 8 is an exemplary illustration of tone allocations which may be used in an 80 MHz transmission.

FIG. 9 is an exemplary illustration of additional tone allocations which may be used in an 80 MHz transmission.

FIG. 10 is an exemplary illustration of additional tone allocations which may be used in an 80 MHz transmission.

FIG. 11 is an exemplary illustration of additional tone allocations which may be used in an 80 MHz transmission.

FIG. 12 is an exemplary illustration of additional tone allocations which may be used in an 80 MHz transmission.

FIG. 13 is an exemplary illustration of additional tone allocations which may be used in an 80 MHz transmission.

FIG. 14 is an illustration of the fast Fourier transform (FFT) size for 1× transmissions and 4× transmissions at various bandwidths, in MHz.

FIG. 18 shows a flowchart for another exemplary method of wireless communication that can be employed within the wireless communication system of FIG. 1.

FIG. 19 shows a flowchart for yet another exemplary method of wireless communication that can be employed within the wireless communication system of FIG. 1.

FIG. 20 is an illustration of binary convolutional code (BCC) interleaving and low-density parity check (LDPC) tone mapping distances ($D_{TM}$) for a plurality of allocation (RU) sizes and corresponding numbers of data tones ($N_{SD}$), according to various embodiments.

DETAILED DESCRIPTION

Figure 1:
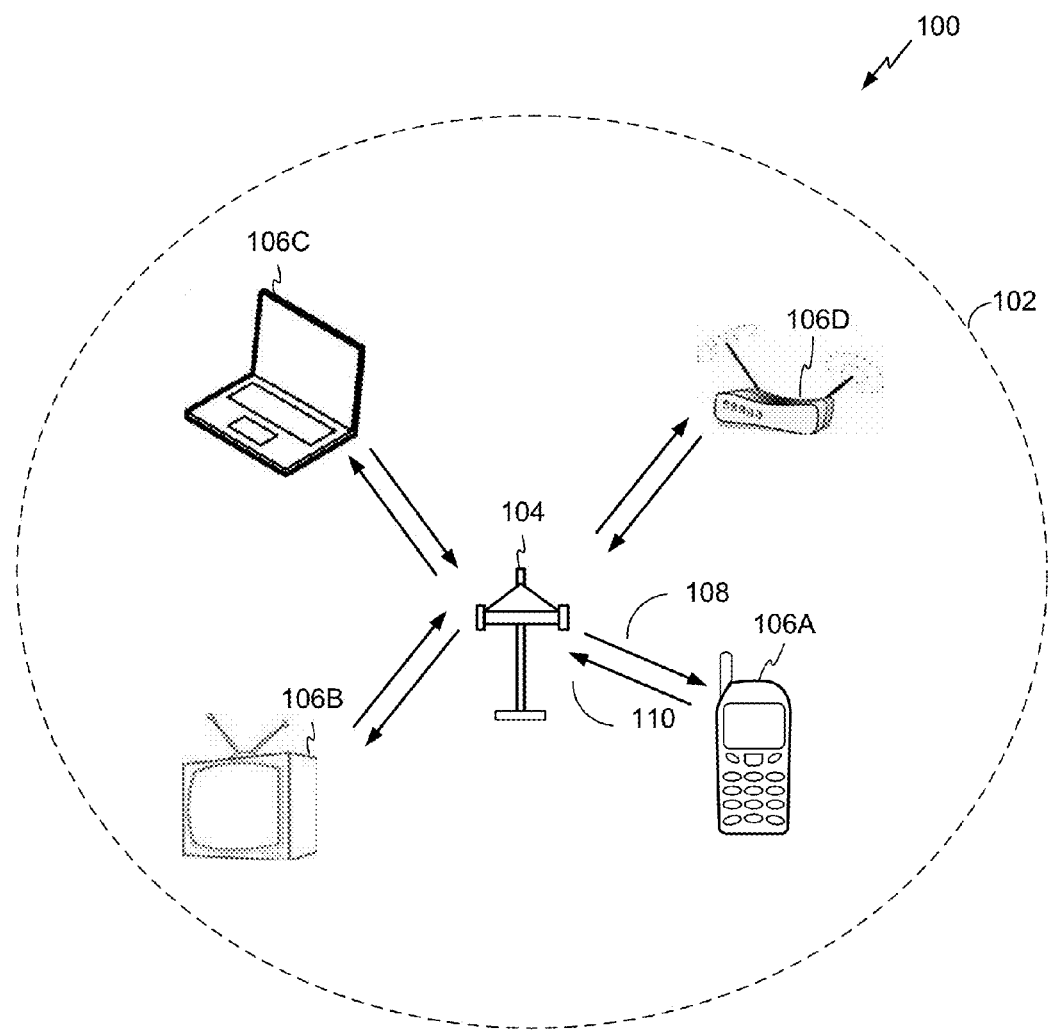
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Implementing Devices

Wireless network technologies can include various types of wireless local area networks (WLANs). A WLAN can be used to interconnect nearby devices together, employing widely used networking protocols. The various aspects described herein can apply to any communication standard, such as Wi-Fi or, more generally, any member of the Institute of Electrical and Electronics Engineers (IEEE) 802.11 family of wireless protocols.

In some aspects, wireless signals can be transmitted according to a high-efficiency 802.11 protocol using orthogonal frequency-division multiplexing (OFDM), direct-sequence spread spectrum (DSSS) communications, a combination of OFDM and DSSS communications, or other schemes.

In some implementations, a WLAN includes various devices which are the components that access the wireless network. For example, there can be two types of devices: access points ("APs") and clients (also referred to as stations, or "STAs"). In general, an AP serves as a hub or base station for the WLAN and an STA serves as a user of the WLAN. For example, a STA can be a laptop computer, a personal digital assistant (PDA), a mobile phone, etc. In an example, an STA connects to an AP via a Wi-Fi (e.g., IEEE 802.11 protocol such as 802.11ax) compliant wireless link to obtain general connectivity to the Internet or to other wide area networks. In some implementations an STA can also be used as an AP.

The techniques described herein can be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system can utilize sufficiently different directions to concurrently transmit data belonging to multiple user terminals. A TDMA system can allow multiple user terminals to share the same frequency channel by dividing the transmission signal into different time slots, each time slot being assigned to different user terminal. A TDMA system can implement global system for mobile communications (GSM) or some other standards known in the art. An OFDMA system utilizes orthogonal frequency division multiplexing (OFDM), which is a modulation technique that partitions the overall system bandwidth into multiple orthogonal sub-carriers. These sub-carriers can also be called tones, bins, etc. With OFDM, each sub-carrier can be independently modulated with data. An OFDM system can implement IEEE 802.11 or some other standards known in the art. An SC-FDMA system can utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system can implement 3GPP-LTE (3rd Generation Partnership Project Long Term Evolution) or other standards.

The teachings herein can be incorporated into (e.g., implemented within or performed by) a variety of wired or wireless apparatuses (e.g., nodes). In some aspects, a wireless node implemented in accordance with the teachings herein can comprise an access point or an access terminal.

An access point ("AP") can comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A station ("STA") can also comprise, be implemented as, or known as a user terminal, an access terminal ("AT"), a subscriber station, a subscriber unit, a mobile station, a remote station, a remote terminal, a user agent, a user device, user equipment, or some other terminology. In some implementations an access terminal can comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein can be incorporated into a phone (e.g., a cellular phone or smart phone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed. The wireless communication system 100 can operate pursuant to a wireless standard, for example the 802.11ax standard. The wireless communication system 100 can include an AP 104, which communicates with STAs 106A-106D.

A variety of processes and methods can be used for transmissions in the wireless communication system 100 between the AP 104 and the STAs 106A-106D. For example, signals can be transmitted and received between the AP 104 and the STAs 106A-106D in accordance with OFDM/OFDMA techniques. If this is the case, the wireless communication system 100 can be referred to as an OFDM/OFDMA system.

Alternatively, signals can be transmitted and received between the AP 104 and the STAs 106A-106D in accordance with code division multiple access (CDMA) techniques. If this is the case, the wireless communication system 100 can be referred to as a CDMA system.

A communication link that facilitates transmission from the AP 104 to one or more of the STAs 106A-106D can be referred to as a downlink (DL) 108, and a communication link that facilitates transmission from one or more of the STAs 106A-106D to the AP 104 can be referred to as an uplink (UL) 110. Alternatively, a downlink 108 can be referred to as a forward link or a forward channel, and an uplink 110 can be referred to as a reverse link or a reverse channel.

The AP 104 can provide wireless communication coverage in a basic service area (BSA) 102. The AP 104 along with the STAs 106A-106D associated with the AP 104 and that use the AP 104 for communication can be referred to as a basic service set (BSS). It should be noted that the wireless communication system 100 may not have a central AP 104, but rather can function as a peer-to-peer network between the STAs 106A-106D. Accordingly, the functions of the AP 104 described herein can alternatively be performed by one or more of the STAs 106A-106D.

Figure 2:
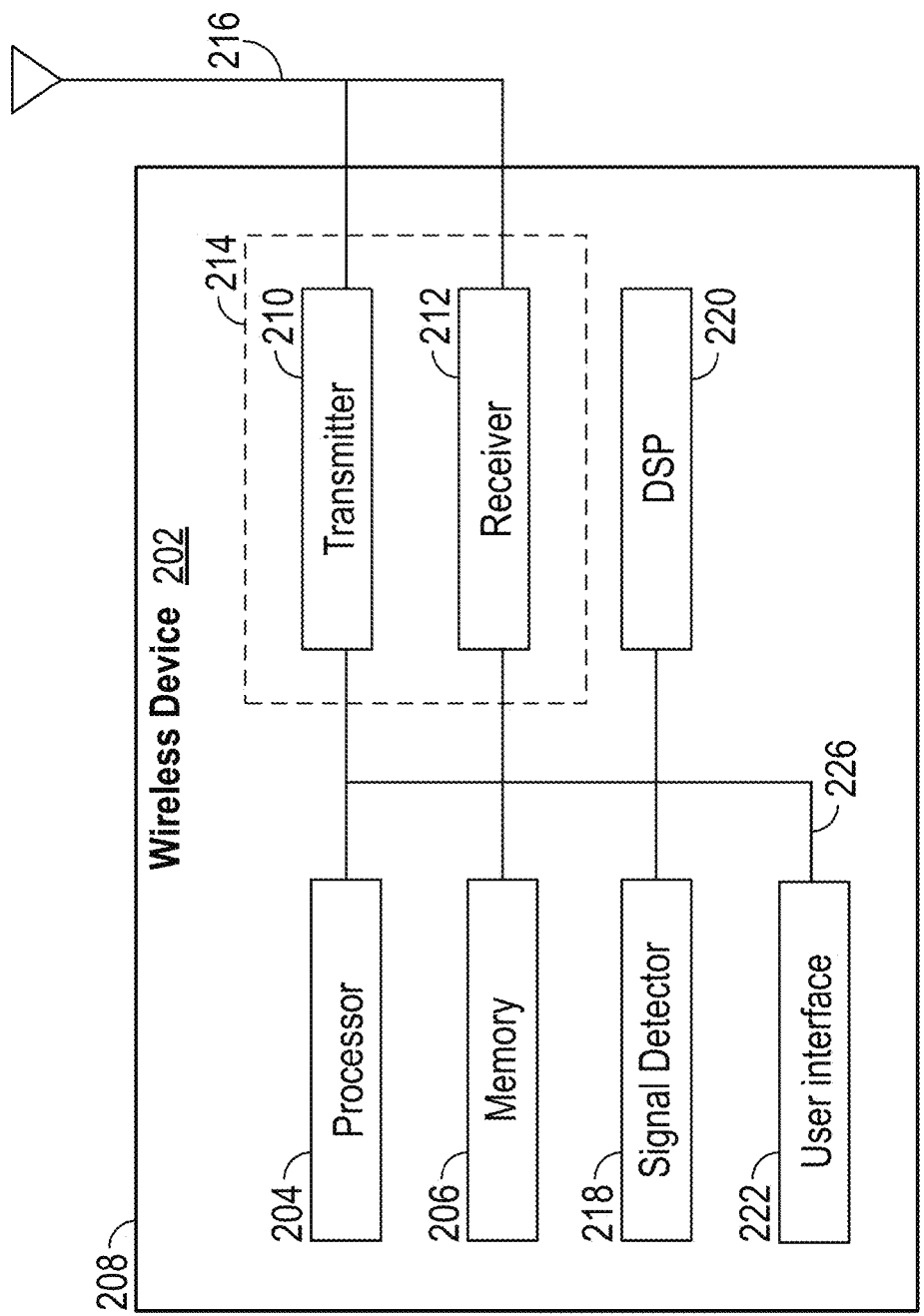
FIG. 2 illustrates various components that can be utilized in a wireless device that can be employed within the wireless communication system of FIG. 1.

FIG. 2 illustrates various components that can be utilized in a wireless device 202 that can be employed within the wireless communication system 100. The wireless device 202 is an example of a device that can be configured to implement the various methods described herein. For example, the wireless device 202 can comprise the AP 104 or one of the STAs 106A-106D.

The wireless device 202 can include a processor 204 which controls operation of the wireless device 202. The processor 204 can also be referred to as a central processing unit (CPU). Memory 206, which can include both read-only memory (ROM) and random access memory (RAM), provides instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas, which can be utilized during MIMO communications, for example.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a data unit for transmission. In some aspects, the data unit can comprise a physical layer data unit (PPDU). In some aspects, the PPDU is referred to as a packet.

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. Those of skill in the art will appreciate the components of the wireless device 202 can be coupled together or accept or provide inputs to each other using some other mechanism.

Although a number of separate components are illustrated in FIG. 2, those of skill in the art will recognize that one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

As discussed above, the wireless device 202 can comprise an AP 104 or an STA 106, and can be used to transmit and/or receive communications. The communications exchanged between devices in a wireless network can include data units which can comprise packets or frames. In some aspects, the data units can include data frames, control frames, and/or management frames. Data frames can be used for transmitting data from an AP and/or a STA to other APs and/or STAs. Control frames can be used together with data frames for performing various operations and for reliably delivering data (e.g., acknowledging receipt of data, polling of APs, area-clearing operations, channel acquisition, carrier-sensing maintenance functions, etc.). Management frames can be used for various supervisory functions (e.g., for joining and departing from wireless networks, etc.).

Certain aspects of the present disclosure support allowing APs 104 to allocate STAs 106A-106D transmissions in optimized ways to improve efficiency. Both high efficiency wireless (HEW) stations, stations utilizing an 802.11 high efficiency protocol (such as 802.11ax), and stations using older or legacy 802.11 protocols (such as 802.11b), can compete or coordinate with each other in accessing a wireless medium. In some embodiments, the high-efficiency 802.11 protocol described herein can allow for HEW and legacy stations to interoperate according to various OFDMA tone plans (which can also be referred to as tone maps). In some embodiments, HEW stations can access the wireless medium in a more efficient manner, such as by using multiple access techniques in OFDMA. Accordingly, in the case of apartment buildings or densely-populated public spaces, APs and/or STAs that use the high-efficiency 802.11 protocol can experience reduced latency and increased network throughput even as the number of active wireless devices increases, thereby improving user experience.

In some embodiments, APs 104 can transmit on a wireless medium according to various DL tone plans for HEW STAs. For example, with respect to FIG. 1, the STAs 106A-106D can be HEW STAs. In some embodiments, the HEW STAs can communicate using a symbol duration four times that of a legacy STA. Accordingly, each symbol which is transmitted may be four times as long in duration. When using a longer symbol duration, each of the individual tones may only require one-quarter as much bandwidth to be transmitted. For example, in various embodiments, a 1× symbol duration can be 4 ms and a 4× symbol duration can be 16 ms. The AP 104 can transmit messages to the HEW STAs 106A-106D according to one or more tone plans, based on a communication bandwidth. In some aspects, the AP 104 may be configured to transmit to multiple HEW STAs simultaneously, using OFDMA.

Harmonized Tone Allocations in UL and DL OFDMA

Figure 3:
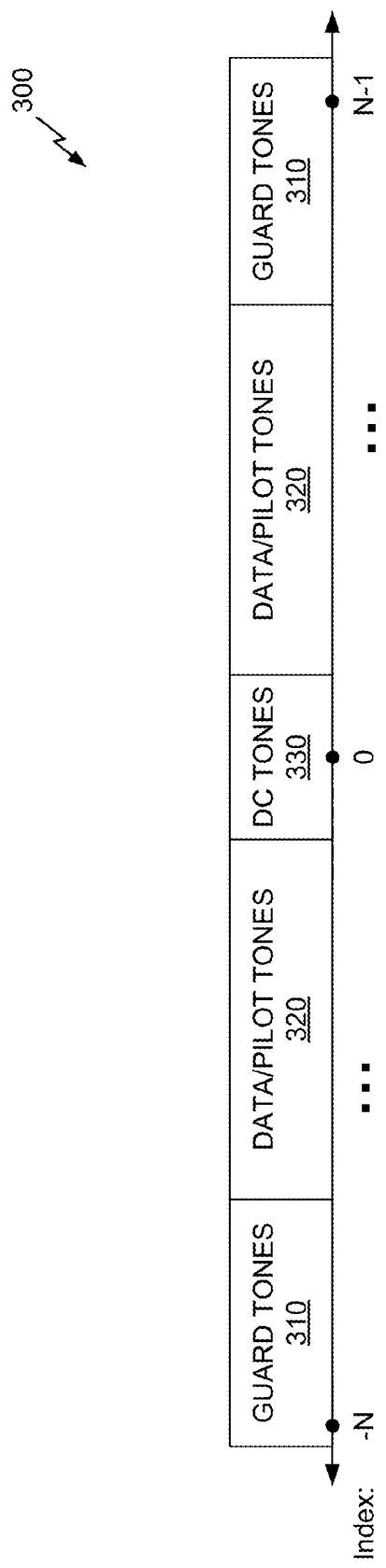
FIG. 3 shows an exemplary 2N-tone plan, according to one embodiment.

FIG. 3 shows an exemplary 2N-tone plan 300, according to one embodiment. In an embodiment, the tone plan 300 corresponds to OFDM tones, in the frequency domain, generated using a 2N-point FFT. The tone plan 300 includes 2N OFDM tones indexed −N to N−1. The tone plan 300 includes two sets of guard tones 310, two sets of data/pilot tones 320, and a set of direct current (DC) tones 330. In various embodiments, the guard tones 310 and DC tones 330 can be null. In various embodiments, the tone plan 300 includes another suitable number of pilot tones and/or includes pilot tones at other suitable tone locations.

In some aspects, OFDMA tone plans may be provided for transmission which use 4× symbol duration, as compared to various IEEE 802.11 protocols. For example, 4× symbol duration may use a number of symbols which are each 16 ms in duration.

In some aspects, OFDMA sub-bands may come in a number of different sizes. For example, an OFDMA sub-band may have a bandwidth of 5, 10, 20, 40 or 80 MHz. In some aspects, OFDMA tone plans may use a minimum sub-band size of 5 MHz, which may include 64 tones. In some aspects, using the above sub-band sizes may allow a device to receive over a bandwidth of 5-160 MHz (in 5 MHz increments), by allowing the device to be allocated multiple sub-bands. Generally, a 20 MHz FFT size may be 256 tones, a 40 MHz FFT size may be 512 tones, and an 80 MHz FFT size may be 1024 tones. A 160 MHz FFT may include two 80 MHz segments, and thus, include two 1024 tone FFTs.

In some aspects, tone plans may be chosen to harmonize uplink and downlink tone plans as much as possible. In some aspects, tone plans may be chosen also to harmonize single-user and OFDMA transmissions as much as possible. Generally, for example, we may assume that a MU-MIMO transmission uses the same tone plans as a single user, or one user in OFDMA, except that the sub-band bandwidth may not be lower than 20 MHz.

In some aspects, a number of different design constraints may be used when implementing a tone plan (resource allocation plan). For example, using existing tone plans as much as possible may be beneficial in order to limit the change in implementation needed. Further, budgeting some guard tones to reduce PA non-linearity impact from each uplink STA may be useful. For example, in some aspects, UL OFDMA packets transmitted by two or more devices may use 2 guard tones between users. In some aspects, it may be beneficial to use other numbers of guard tones between users as well.

In some aspects, the number of pilot tones used in an 802.11ax packet may be similar to those found in 802.11ac packets, wherein the number of pilot tones increases by two for every doubling of FFT size, when using fixed pilot tones. However, when using traveling pilot tones, a higher density of pilot tones may be requires, such that the pilot tones should not be less dense that 8 pilot tones per 256 tone FFT.

In some aspects, it may be desirable to specify tone plans which are suitable based on a certain level of error in transmitting. For example, certain implementations of WiFi may use a transmit center frequency error of +/−20 parts per million (ppm), or 40 ppm total (adding together the tolerable range). For this frequency offset, 7 DC tones may be needed. If finer transmitter carrier frequency offset (CFO) requirements are met (e.g. 10 ppm or 20 ppm), fewer DC tones, such as 3 or 5 DC tones may be used. In some aspects, the number of DC tones needed may also increase with increasing bandwidth and FFT size.

In some aspects, a number of guard tones may be reserved at the edge of a bandwidth. For example, 11 guard tones may be reserves (with 6 on one side, and 5 on the other). This assumes that the same filtering may be used in 802.11ax (with 4× tone duration) as in 802.11ac (which has 1× tone duration). This may be the case, for example, due to thinner tones when using 4× tone duration and faster roll off.

In some aspects, it is preferable to harmonize downlink and uplink resource units, which can also be referred to herein as allocations, allocation units, and/or tone allocation units (TAUs). Generally, this may minimize implementation when a non-AP STA can act as a soft AP. This harmonization may occur even though there are differences in UL and DL OFDMA tone planning. For example, DL can use common pilots for per user phase tracking, while each device in an UL transmission may have its own pilots. UL transmissions may also prefer to have guard tones between the transmissions of different users, while this may not be an issue in DL. Further, DL transmission may follow a wideband mask, while UL transmission may obey sub-band mask for each STA. Accordingly, the needed number of guard tones may vary.

In some aspects, in order to reduce modes of operation and new tone plans needed, a 20 MHz STA may use 5, 10, or 20 MHz of allocation, with no explicit 15 MHz allocation. However, because a STA may be allowed multiple allocations, it should be noted that a STA could have 15 MHz of bandwidth by being allocated one 5 MHz allocation and one 10 MHz allocation. Such multiple allocations may maximize throughput to a STA while minimizing the needed number of tone plans. Similarly, a 40 MHz STA may use 5, 10, 20, or 40 MHz of allocation, with no explicit 15, 25, 30, or 35 MHz allocation. Further, an 80 MHz STA may use 5, 10, 20, 40, or 80 MHz allocation, without an explicit allocation of other amounts. In some aspects, 2.5 MHz or 1.25 MHz allocations may also be possible, using 24 data tones (32 FFT) and 12 data tones (16 FFT), respectively. For 160 MHz bandwidth, this may be treated as two 80 MHz bandwidths. Accordingly, these allocations may not need to be separately listed from an 80 MHz allocation in the tables herein. Further, in some aspects, OFDMA users may be configured not to ride across physical 20 MHz bandwidths, such that each 20 MHz bandwidth portion may be process individually. That is, for example, if 40 MHz is split into a 20 MHz allocation and two 10 MHz allocations, it may be desirable to order the three allocations as 10/10/20 or 20/10/10, rather than 10/20/10, so that both the first 20 MHz and the second 20 MHz may be processed independently (whereas in a 10/20/10 split, this may not be possible as the 20 MHz allocation is transmitted across both of the physical 20 MHz bandwidth portions).

In some aspects, a number of tones may be leftover after an OFDMA tone allocation. These leftover tones may be used for extra DC tones, extra pilot tones (improving tracking), extra guard tones at the edge of a bandwidth, and extra guard tones between uplink users. Further, these extra tones may be used for sub-band DC tones when needed, as well. These tones may be used for refining tracking and channel estimation as well. Leftover tones may also be used for carrying information, such as acknowledgement (ACK) or group ACK messages, sub-band sounding, power control command, modulation and coding scheme (MCS) up/down control commands, or other information. In some aspects, in order to allow such transmissions to co-exist better with legacy devices, multi-carrier-based approaches may work seamlessly, which may require more guard tones between different users.

In some aspects, packing efficiencies may be different in different cases for OFDMA transmissions. For example, an OFDMA allocation bandwidth (in number of FFT tones) may vary based on different total bandwidths (in FFT size). For example, a 5 MHz portion of bandwidth may be able to carry a different number of data tones if that 5 MHz portion is being transmitted by a single user, or if it is being transmitted in a part of an OFDMA transmission with different total bandwidths. However, in order to harmonize various types of transmissions, it may be beneficial for each of these to include similar number of data and other tones. Due to packing efficiencies, this may results in leftover tones, as discussed above.

In order to be useful, tone plans may also need to satisfy certain BCC (binary convolutional code) interleaving, LDPC (low-density parity check) tone mapping distance designs as well as be valid for a number of different possible MCSs. Generally, in choosing a tone plan, it may be beneficial to first obtain the upper bound of the number of data tones (Ndata) with the minimum number of DC, guard, and pilot tones for each of the desired bandwidths. Next, it may be beneficial to obtain the upper bound of the number of data tones, Ndata, for each sub-band bandwidth when is it an OFDMA allocation, or when it is the entire bandwidth for a single user (SU).

Generally, the divisors of Ndata may be used for BCC interleaving depth $N_{COL}$. Next, divisors of Ndata may also be used as LDPC tone mapping distance $D_{TM}$ that are in between the ones for existing tone plans. Finally, it may be beneficial is the number of excluded combinations of MCS and number of data streams is kept relatively small. Generally, if there are left-over tones after this tone mapping, they may be used as extra DC, guard, or pilot tones. Accordingly, interleaver parameters and LDPC tone mapping distances may be chosen with these factors in mind.

FIG. 4 is an illustration of a general tone plan which may be used for a number of different bandwidths in accordance with aspects of this disclosure. In this illustration, bandwidth mode may be the total bandwidth of a transmission (when >=20 MHz), or a sub-bandwidth. In some aspects, rows with an asterisk (*) are those used in the following examples for tone allocation in OFDMA. For example, if we assume that there may be up to 4 users per 20 MHz, and 16 users per 80 MHz, these bandwidths may allow each uplink user to have at least 1 pilot tone. Generally, a single-user tone plan would not be too much different than a multi-user tone plan. Further, the rows with an asterisk may allow a downlink STA to filter and decode only ¼ of the bandwidth and still have sufficient numbers of pilot tones for tracking purposes. For example, a DL STA may only decode the 20 MHz portion of the bandwidth that is directed to that device, in order to reduce unnecessary processing.

Certain rows in this illustration include multiple embodiments for interleaver parameters or LDPC tone mapping distances. In some aspects, it may be beneficial to perform simulations when choosing between multiple different embodiments for parameters values. In certain aspects, it may be beneficial to choose parameter values which are as close to hardware-compatible values as possible, in order to get similar performance and to ease implementation of these techniques. Generally, it may be observed that Ncol multiplied by LDPC tone mapping distance is often equal to the number of data tones.

In this illustration, a 5 MHz bandwidth mode, 64 FFT tones may be used, including 52 data tones and 4 pilot tones. Because a 5 MHz mode is not included as a single transmission (all transmissions will be 20 MHz or larger), such a mode need not explicitly be assigned a particular number of DC tones or guard tones. This may result in no leftover tones, an LDPC tone mapping distance of 4, with interleaver parameters of Ncol of 13, Nrot of 11 when there are four or fewer spatial streams, and Nrot of 6 when there are more than four spatial streams.

In a 10 MHz bandwidth mode, 128 FFT tones may be used, including 108 data tones and 6 pilot tones. Because a 10 MHz mode is not included as a single transmission (all transmissions will be 20 MHz or larger), such a mode need not explicitly be assigned a particular number of DC tones or guard tones. This may result in no leftover tones, an LDPC tone mapping distance of 6, with interleaver parameters of Ncol of 18, Nrot of 29 when there are four or fewer spatial streams, and Nrot of 13 when there are more than four spatial streams.

In a first 20 MHz bandwidth mode, 256 FFT tones may be used, including 234 data tones and 8 pilot tones. This 20 MHz mode may include 3 DC tones and 11 guard tones at an edge (6 on one side, 5 on the other). This may result in no leftover tones, an LDPC tone mapping distance of 9, with interleaver parameters of Ncol of 26, Nrot of 58 when there are four or fewer spatial streams, and Nrot of 28 when there are more than four spatial streams.

In a second 20 MHz bandwidth mode, 256 FFT tones may be used, including 228 data tones and 8 pilot tones. This 20 MHz mode may include 7 DC tones and 11 guard tones at an edge (6 on one side, 5 on the other). As before, using more DC tones may be needed based on the carrier frequency offset which is permitted in transmitting devices. This may result in 2 leftover tones, an LDPC tone mapping distance of 12 or 19, with interleaver parameters of Ncol of 19 or 38, Nrot of 58 when there are four or fewer spatial streams, and Nrot of 28 when there are more than four spatial streams.

In a 40 MHz bandwidth mode, 512 FFT tones may be used, including 468 data tones and 16 pilot tones. This 40 MHz mode may include 11 DC tones and 11 guard tones at an edge (6 on one side, 5 on the other). This may result in 6 leftover tones, an LDPC tone mapping distance of 9, with interleaver parameters of Ncol of 26, Nrot of 58 when there are four or fewer spatial streams, and Nrot of 28 when there are more than four spatial streams.

In a first 80 MHz bandwidth mode, 1024 FFT tones may be used, including 996 data tones and 12 pilot tones. This 80 MHz mode may include 5 DC tones and 11 guard tones at an edge (6 on one side, 5 on the other). This may result in no leftover tones, an LDPC tone mapping distance of 12, with interleaver parameters of Ncol of 83, Nrot of 248 when there are four or fewer spatial streams, and Nrot of 120 when there are more than four spatial streams.

In a second 80 MHz bandwidth mode, 1024 FFT tones may be used, including 972 data tones and 32 pilot tones. This 80 MHz mode may include 5 DC tones and 11 guard tones at an edge (6 on one side, 5 on the other). This may result in 4 leftover tones, an LDPC tone mapping distance of 18 or 36, with interleaver parameters of Ncol of 54, Nrot of 243 when there are four or fewer spatial streams, and Nrot of 120 when there are more than four spatial streams.

In a third 80 MHz bandwidth mode, 1024 FFT tones may be used, including 990 data tones and 16 pilot tones. This 80 MHz mode may include 7 DC tones and 11 guard tones at an edge (6 on one side, 5 on the other). As before, using more DC tones may be needed based on the carrier frequency offset which is permitted in transmitting devices. This may result in no leftover tones, an LDPC tone mapping distance of 18, 30, or 33, with interleaver parameters of Ncol of 55, Nrot of 248 when there are four or fewer spatial streams, and Nrot of 120 when there are more than four spatial streams.

In a fourth 80 MHz bandwidth mode, 1024 FFT tones may be used, including 972 data tones and 32 pilot tones. This 80 MHz mode may include 7 DC tones and 13 guard tones at an edge. As before, using more DC tones may be needed based on the carrier frequency offset which is permitted in transmitting devices. This may result in no leftover tones, an LDPC tone mapping distance of 18 or 36, with interleaver parameters of Ncol of 54, Nrot of 243 when there are four or fewer spatial streams, and Nrot of 120 when there are more than four spatial streams.

FIG. 5 is an exemplary illustration of tone allocations which may be used in a 20 MHz transmission. Generally, the tone allocation examples listed here and after mostly focus on UL OFDMA. For downlink, one could use the same allocation plan as UL for simplicity, or with traveling pilots the DL users may be allocated by splitting the data tones only while using common pilots. Such a DL allocation scheme would leave more leftover tones, which could be used in a number of ways, as discussed above. Note that for each allocation type, other permutations are also possible. The examples listed here and below are ordered (e.g. 5/5/10 instead of 5/10/5) in order to have each half-bandwidth be self-contained, such that there is no user sitting on the wide band DC tones.

A 20 MHz tone plan with a single allocation includes one 20 MHz allocation. This allocation may include 234 data tones, 8 pilot tones, and 3 DC tones. As noted before, this is merely exemplary—other allocations may also be used. For example, to accommodate large carrier frequency offset, 7 DC tones may be used, in which case, this allocation may include 228 data tones, 8 pilot tones, and 7 DC tones. Because there is only a single user, no guard tones between users are needed. This allocation may have 11 guard tones at the edge (6 on one side, 5 on the other), and may not have any leftover tones.

A 20 MHz tone plan with 2 allocations may include two 10 MHz allocations. Each of these 10 MHz allocations may include 108 data tones and 6 pilot tones. In some aspects, there may be 7 or 11 guard tones between the two allocations. These guard tones, because of the allocation size (10/10—split in half) will be the DC tones in the transmission. In some aspects, when 11 DC tones are used, this transmission may be the equivalent of two physical 10 MHz bands, each having 11 guard tones at the edge. This tone plan includes 11 guard tones at the edge, and 10 or 6 leftover tones, depending on how many guard tones between UL users are used.

A 20 MHz tone plan with 3 allocations may include one 10 MHz allocation and two 5 MHz allocations. The 10 MHz allocation may include 108 data tones and 6 pilot tones, while each 5 MHz allocation may include 52 data tones and 4 pilot tones. In some aspects, there may be 3/3 or 7/9 guard tones between the allocations. That is, there may be 3 or 7 guard tones between the two 5 MHz allocations, and 3 or 9 guard tones between the second 5 MHz allocation and the 10 MHz allocation. There may be 11 or 9 guard tones at the edge of the transmission, and 13 or 5 leftover tones.

A 20 MHz tone plan with 4 allocations may include four 5 MHz allocations. Each 5 MHz allocation may include 52 data tones and 4 pilot tones. In some aspects, there may be 3/3/3 or 7/7/7 guard tones between the allocations, that is, either 3 or 7 guard tones between each of the allocations. There may be 11 or 7 guard tones at the edge of the transmission, and 12 or 4 leftover tones.

FIG. 6 is an exemplary illustration of tone allocations which may be used in a 40 MHz transmission. Generally, the tone allocation examples listed here focus on UL OFDMA. For downlink, one could use the same allocation plan as UL for simplicity, or with traveling pilots the DL users may be allocated by splitting the data tones only while using common pilots. Such a DL allocation scheme would leave more leftover tones, which could be used in a number of ways, as discussed above. Note that for each allocation type, other permutations are also possible. The examples listed here and below are ordered (e.g. 5/5/10 instead of 5/10/5) in order to have each half-bandwidth be self-contained, such that there is no user sitting on the wide band DC tones.

Two options are listed for the number of guard tones between uplink users. The first option follows the natural number of DC tones of the whole band, while the second set gets transmission on each physical sub-band with sub-DC tones. The order in each set assumed that the sub-band allocation is in ascending order in BW size. Other orders could also be used, such as, for example, descending order.

A 40 MHz tone plan for a single allocation includes a 40 MHz allocation. This allocation may include 468 data tones, 16 pilot tones, and 11 data tones. This tone plan includes 11 guard tones at the edge, and has 6 leftover tones.

A 40 MHz tone plan for two allocations includes two 20 MHz allocations. Each of these allocations may include 234 data tones and 8 pilot tones. This tone plan may include 7 or 11 guard tones between the UL users, 11 guard tones at the edge, and 10 or 6 leftover tones. In some aspects, other numbers of data tones may also be used, as discussed above with regards to the 228 data tone plan.

A 40 MHz tone plan for three allocations includes two 10 MHz sub-bands and one 20 MHz sub-band. Each of the 10 MHz sub-bands includes 108 data tones and 6 pilot tones, and the 20 MHz sub-band includes 234 data tones and 8 pilot tones. This tone plan may include 3/11 or 11/11 guard tones between users, 11 guard tones at the edge, and 14 or 6 leftover tones.

A first 40 MHz tone plan for four allocations includes four 10 MHz sub-bands. Each of the 10 MHz sub-bands includes 108 data tones and 6 pilot tones. This tone plan may include 3/11/3 or 11/11/11 guard tones between users, 11 guard tones at the edge, and 28 or 12 leftover tones.

A second 40 MHz tone plan for four allocations includes two 5 MHz sub-bands, one 10 MHz sub-band, and one 20 MHz sub-band. Each of the 5 MHz sub-bands includes 52 data tones and 4 pilot tones, the 10 MHz sub-band includes 108 data tones and 6 pilot tones, and the 20 MHz sub-band includes 234 data tones and 8 pilot tones. This tone plan may include 3/3/11 or 7/9/11 guard tones between users, 11 or 9 guard tones at the edge, and 16 or 8 leftover tones.

A first 40 MHz tone plan for five allocations includes four 5 MHz sub-bands and one 20 MHz sub-band. Each of the 5 MHz sub-bands includes 52 data tones and 4 pilot tones and the 20 MHz sub-band includes 234 data tones and 8 pilot tones. This tone plan may include 3/3/3/11 or 7/7/7/9 guard tones between users, 11 or 9 guard tones at the edge, and 15 or 7 leftover tones.

FIG. 7 is an exemplary illustration of additional tone allocations which may be used in a 40 MHz transmission. Generally, the tone allocation examples listed here focus on UL OFDMA. For downlink, one could use the same allocation plan as UL for simplicity, or with traveling pilots the DL users may be allocated by splitting the data tones only while using common pilots. Such a DL allocation scheme would leave more leftover tones, which could be used in a number of ways, as discussed above. Note that for each allocation type, other permutations are also possible. The examples listed here and below are ordered (e.g. 5/5/10 instead of 5/10/5) in order to have each half-bandwidth be self-contained, such that there is no user sitting on the wide band DC tones.

Two options are listed for the number of guard tones between uplink users. The first option follows the natural number of DC tones of the whole band, while the second set gets transmission on each physical sub-band with sub-DC tones. The order in each set assumed that the sub-band allocation is in ascending order in BW size. Other orders could also be used, such as, for example, descending order.

A second 40 MHz tone plan for five allocations (the first is in FIG. 6) includes two 5 MHz sub-bands and three 10 MHz sub-bands. Each of the 5 MHz sub-bands includes 52 data tones and 4 pilot tones and each of the 10 MHz sub-bands includes 108 data tones and 6 pilot tones. This tone plan may include 3/3/11/3 or 7/9/11/11 guard tones between users, 11 or 9 guard tones at the edge, and 27 or 11 leftover tones.

A 40 MHz tone plan for six allocations includes four 5 MHz sub-bands and two 10 MHz sub-bands. Each of the 5 MHz sub-bands includes 52 data tones and 4 pilot tones and each of the 10 MHz sub-bands includes 108 data tones and 6 pilot tones. This tone plan may include 3/3/3/11/3 or 7/7/7/9/11 guard tones between users, 11 or 9 guard tones at the edge, and 26 or 10 leftover tones.

A 40 MHz tone plan for seven allocations includes six 5 MHz sub-bands and one 10 MHz sub-band. Each of the 5 MHz sub-bands includes 52 data tones and 4 pilot tones and the 10 MHz sub-band includes 108 data tones and 6 pilot tones. This tone plan may include 3/3/3/11/3/3 or 7/7/7/7/7/9 guard tones between users, 11 or 9 guard tones at the edge, and 25 or 9 leftover tones.

A 40 MHz tone plan for eight allocations includes eight 5 MHz sub-bands. Each of the 5 MHz sub-bands includes 52 data tones and 4 pilot tones. This tone plan may include 3/3/3/11/3/3/3 or 7/7/7/7/7/7/7 guard tones between users, 11 or 7 guard tones at the edge, and 24 or 8 leftover tones.

In some aspects, for each allocation type, other permutations are also possible. For example, the examples shown here have been arranged to have each half bandwidth be self-contained, such that there is no user sitting on the wide band DC, and half bandwidth DC, if more than one user is in that half bandwidth. Additionally, when possible, one can ensure that there are 11 guard tones are the edges by not allocating 5 MHz users to the edge of the bandwidth, when possible.

As shown above, at times, there may be sufficient leftover tones to accommodate an extra small packet of 1.25 MHz (with 12 data tones) or 2.5 MHz (with 24 data tones). There may be both advantages and disadvantages to allowing such a small packet. For example, such packets certainly improve packing efficiency, allowing more data to be transmitted over the same bandwidth. This may be especially important for DL OFDMA packets, as this may be the only gain possible for DL OFDMA, in certain aspects. However, small packets may make OFDMA schedule much more complicated. For example, scheduling would need to determine when such a small packet is needed, and where to place the small packet within the total bandwidth. Further, such small packets may disable multicarrier-based per sub-band transmission, where each 20 MHz (or other size) portion of the bandwidth may be decoded independently from the other portions.

FIG. 8 is an exemplary illustration of tone allocations which may be used in an 80 MHz transmission. Generally, the tone allocation examples listed here focus on UL OFDMA. For downlink, one could use the same allocation plan as UL for simplicity, or with traveling pilots the DL users may be allocated by splitting the data tones only while using common pilots. Such a DL allocation scheme would leave more leftover tones, which could be used in a number of ways, as discussed above. Note that for each allocation type, other permutations are also possible. The examples listed here and below are ordered (e.g. 5/5/10 instead of 5/10/5) in order to have each half-bandwidth be self-contained, such that there is no user sitting on the wide band DC tones.

Two options are listed for the number of guard tones between uplink users. The first option follows the natural number of DC tones of the whole band, while the second set gets transmission on each physical sub-band with sub-DC tones. The order in each set assumed that the sub-band allocation is in ascending order in BW size. Other orders could also be used, such as, for example, descending order.

An 80 MHz tone plan for one allocation includes one 80 MHz sub-band. The 80 MHz sub-band may include 990 data tones, 16 pilot tones, and 7 data tones. This tone plan may include 11 guard tones at the edge, and no leftover tones. In some aspects, as illustrated in FIG. 4, other tone plans may also be used.

An 80 MHz tone plan for two allocations includes two 40 MHz sub-bands. Each of the 40 MHz sub-bands includes 468 data tones and 16 pilot tones. This tone plan may include 7 or 11 guard tones between users, 11 guard tones at the edge, and 38 or 34 leftover tones.

An 80 MHz tone plan for three allocations includes two 20 MHz sub-bands and one 40 MHz sub-band. Each of the 20 MHz sub-bands includes 234 data tones and 8 pilot tones, while the 40 MHz sub-band includes 468 data tones and 16 pilot tones. This tone plan may include 11/7 or 11/11 guard tones between users, 11 guard tones at the edge, and 27 or 23 leftover tones.

A first 80 MHz tone plan for four allocations includes four 20 MHz sub-bands. Each of the 20 MHz sub-bands includes 234 data tones and 8 pilot tones. This tone plan may include 11/7/11 or 11/11/11 guard tones between users, 11 guard tones at the edge, and 16 or 12 leftover tones.

A second 80 MHz tone plan for four allocations includes two 10 MHz sub-bands, one 20 MHz sub-band, and one 40 MHz sub-band. Each of the 10 MHz sub-bands includes 108 data tones and 6 pilot tones, the 20 MHz sub-band includes 234 data tones and 8 pilot tones, and the 40 MHz sub-band includes 468 data tones and 16 pilot tones. This tone plan may include 3/11/7 or 11/11/11 guard tones between users, 11 guard tones at the edge, and 38 or 26 leftover tones.

A first 80 MHz tone plan for five allocations includes four 10 MHz sub-bands and one 40 MHz sub-band. Each of the 10 MHz sub-bands includes 108 data tones and 6 pilot tones and the 40 MHz sub-band includes 468 data tones and 16 pilot tones. This tone plan may include 3/11/3/7 or 11/11/11/11 guard tones between users, 11 guard tones at the edge, and 49 or 29 leftover tones.

A second 80 MHz tone plan for five allocations includes two 5 MHz sub-bands, one 10 MHz sub-band, one 20 MHz sub-band and one 40 MHz sub-band. Each of the 5 MHz sub-bands includes 52 data tones and 4 pilot tones, the 10 MHz sub-band includes 108 data tones and 6 pilot tones, the 20 MHz sub-band includes 234 data tones and 8 pilot tones, and the 40 MHz sub-band includes 468 data tones and 16 pilot tones. This tone plan may include 3/3/11/7 or 7/9/11/11 guard tones between users, 11 or 9 guard tones at the edge, and 37 or 25 leftover tones.

FIG. 9 is an exemplary illustration of additional tone allocations which may be used in an 80 MHz transmission. Generally, the tone allocation examples listed here focus on UL OFDMA. For downlink, one could use the same allocation plan as UL for simplicity, or with traveling pilots the DL users may be allocated by splitting the data tones only while using common pilots. Such a DL allocation scheme would leave more leftover tones, which could be used in a number of ways, as discussed above. Note that for each allocation type, other permutations are also possible. The examples listed here and below are ordered (e.g. 5/5/10 instead of 5/10/5) in order to have each half-bandwidth be self-contained, such that there is no user sitting on the wide band DC tones.

Two options are listed for the number of guard tones between uplink users. The first option follows the natural number of DC tones of the whole band, while the second set gets transmission on each physical sub-band with sub-DC tones. The order in each set assumed that the sub-band allocation is in ascending order in BW size. Other orders could also be used, such as, for example, descending order.

A third 80 MHz tone plan for five allocations includes two 10 MHz sub-bands and three 20 MHz sub-bands. Each of the 10 MHz sub-bands include 108 data tones and 6 pilot tones and each of the 20 MHz sub-bands include 234 data tones and 8 pilot tones. This tone plan may include 3/11/7/11 or 11/11/11/11 guard tones between users, 11 guard tones at the edge, and 27 or 15 leftover tones.

A first 80 MHz tone plan for six allocations includes two 5 MHz sub-bands, three 10 MHz sub-bands and one 40 MHz sub-band. Each of the 5 MHz sub-bands includes 52 data tones and 4 pilot tones, each of the 10 MHz sub-bands includes 108 data tones and 6 pilot tones and the 40 MHz sub-band includes 468 data tones and 16 pilot tones. This tone plan may include 3/3/11/3/7 or 7/9/11/11/11 guard tones between users, 11 or 9 guard tones at the edge, and 48 or 28 leftover tones.

A second 80 MHz tone plan for six allocations includes four 5 MHz sub-bands, one 20 MHz sub-band and one 40 MHz sub-band. Each of the 5 MHz sub-bands includes 52 data tones and 4 pilot tones, the 20 MHz sub-band includes 234 data tones and 8 pilot tones and the 40 MHz sub-band includes 468 data tones and 16 pilot tones. This tone plan may include 3/3/3/11/7 or 7/7/7/9/11 guard tones between users, 11 or 9 guard tones at the edge, and 36 or 24 leftover tones.

A third 80 MHz tone plan for six allocations includes four 10 MHz sub-bands and two 20 MHz sub-bands. Each of the 10 MHz sub-bands includes 108 data tones and 6 pilot tones and each of the 20 MHz sub-band includes 234 data tones and 8 pilot tones. This tone plan may include 3/11/3/7/11 or 11/11/11/11/11 guard tones between users, 11 guard tones at the edge, and 38 or 18 leftover tones.

A first 80 MHz tone plan for seven allocations includes four 5 MHz sub-bands, two 10 MHz sub-bands, and one 40 MHz sub-band. Each of the 5 MHz sub-bands includes 52 data tones and 4 pilot tones, each of the 10 MHz sub-bands includes 108 data tones and 6 pilot tones and the 40 MHz sub-band includes 468 data tones and 16 pilot tones. This tone plan may include 3/3/3/11/3/7 or 7/7/7/9/11/11 guard tones between users, 11 or 9 guard tones at the edge, and 47 or 27 leftover tones.

A second 80 MHz tone plan for seven allocations includes six 10 MHz sub-bands and one 20 MHz sub-band. Each of the 10 MHz sub-bands includes 108 data tones and 6 pilot tones and the 20 MHz sub-band includes 234 data tones and 8 pilot tones. This tone plan may include 3/11/3/7/3/11 or 11/11/11/11/11/11 guard tones between users, 11 guard tones at the edge, and 49 or 21 leftover tones.

FIG. 10 is an exemplary illustration of additional tone allocations which may be used in an 80 MHz transmission. Generally, the tone allocation examples listed here focus on UL OFDMA. For downlink, one could use the same allocation plan as UL for simplicity, or with traveling pilots the DL users may be allocated by splitting the data tones only while using common pilots. Such a DL allocation scheme would leave more leftover tones, which could be used in a number of ways, as discussed above. Note that for each allocation type, other permutations are also possible. The examples listed here and below are ordered (e.g. 5/5/10 instead of 5/10/5) in order to have each half-bandwidth be self-contained, such that there is no user sitting on the wide band DC tones.

Two options are listed for the number of guard tones between uplink users. The first option follows the natural number of DC tones of the whole band, while the second set gets transmission on each physical sub-band with sub-DC tones. The order in each set assumed that the sub-band allocation is in ascending order in BW size. Other orders could also be used, such as, for example, descending order.

A third 80 MHz tone plan for seven allocations includes two 5 MHz sub-bands, three 10 MHz sub-bands, and two 20 MHz sub-bands. Each of the 5 MHz sub-bands includes 52 data tones and 4 pilot tones, each of the 10 MHz sub-bands includes 108 data tones and 6 pilot tones, and each of the 20 MHz sub-band includes 234 data tones and 8 pilot tones. This tone plan may include 3/3/11/3/7/11 or 7/9/11/11/11/11 guard tones between users, 11 or 9 guard tones at the edge, and 37 or 17 leftover tones.

A fourth 80 MHz tone plan for seven allocations includes four 5 MHz sub-bands and three 20 MHz sub-bands. Each of the 5 MHz sub-bands includes 52 data tones and 4 pilot tones and each of the 20 MHz sub-band includes 234 data tones and 8 pilot tones. This tone plan may include 3/3/3/11/7/11 or 7/7/7/9/11/11 guard tones between users, 11 or 9 guard tones at the edge, and 25 or 13 leftover tones.

A first 80 MHz tone plan for eight allocations includes eight 10 MHz sub-bands. Each of the 10 MHz sub-bands includes 108 data tones and 6 pilot tones. This tone plan may include 3/11/3/7/7/11/3 or 11/11/11/11/11/11/11 guard tones between users, 11 guard tones at the edge, and 60 or 24 leftover tones.

A second 80 MHz tone plan for eight allocations includes six 5 MHz sub-bands, one 10 MHz sub-band, and one 40 MHz sub-band. Each of the 5 MHz sub-bands include 52 data tones and 4 pilot tones, the 10 MHz sub-band includes 108 data tones and 6 pilot tones, and the 40 MHz sub-band includes 468 data tones and 16 pilot tones. This tone plan may include 3/3/3/11/3/3/7 or 7/7/7/7/7/9/11 guard tones between users, 11 or 9 guard tones at the edge, and 46 or 26 leftover tones.

A third 80 MHz tone plan for eight allocations includes four 5 MHz sub-bands, two 10 MHz sub-band, and two 20 MHz sub-bands. Each of the 5 MHz sub-bands include 52 data tones and 4 pilot tones, each of the 10 MHz sub-bands includes 108 data tones and 6 pilot tones, and each of the 20 MHz sub-bands includes 234 data tones and 8 pilot tones. This tone plan may include 3/3/3/11/3/7/11 or 7/7/7/9/11/11/11 guard tones between users, 11 or 9 guard tones at the edge, and 36 or 16 leftover tones.

FIG. 11 is an exemplary illustration of additional tone allocations which may be used in an 80 MHz transmission. Generally, the tone allocation examples listed here focus on UL OFDMA. For downlink, one could use the same allocation plan as UL for simplicity, or with traveling pilots the DL users may be allocated by splitting the data tones only while using common pilots. Such a DL allocation scheme would leave more leftover tones, which could be used in a number of ways, as discussed above. Note that for each allocation type, other permutations are also possible. The examples listed here and below are ordered (e.g. 5/5/10 instead of 5/10/5) in order to have each half-bandwidth be self-contained, such that there is no user sitting on the wide band DC tones.

Two options are listed for the number of guard tones between uplink users. The first option follows the natural number of DC tones of the whole band, while the second set gets transmission on each physical sub-band with sub-DC tones. The order in each set assumed that the sub-band allocation is in ascending order in BW size. Other orders could also be used, such as, for example, descending order.

A fourth 80 MHz tone plan for eight allocations includes two 5 MHz sub-bands, five 10 MHz sub-bands, and one 20 MHz sub-band. Each of the 5 MHz sub-bands include 52 data tones and 4 pilot tones, each of the 10 MHz sub-bands includes 108 data tones and 6 pilot tones, and the 20 MHz sub-band includes 234 data tones and 8 pilot tones. This tone plan may include 3/3/11/3/7/3/11 or 7/9/11/11/11/11/11 guard tones between users, 11 or 9 guard tones at the edge, and 48 or 16 leftover tones.

A first 80 MHz tone plan for nine allocations includes eight 5 MHz sub-bands and one 40 MHz sub-band. Each of the 5 MHz sub-bands include 52 data tones and 4 pilot tones and the 40 MHz sub-band includes 468 data tones and 16 pilot tones. This tone plan may include 3/3/3/11/3/3/3/7 or 7/7/7/7/7/7/7/9 guard tones between users, 11 or 9 guard tones at the edge, and 45 or 25 leftover tones.

A second 80 MHz tone plan for nine allocations includes four 5 MHz sub-bands, four 10 MHz sub-bands, and one 20 MHz sub-band. Each of the 5 MHz sub-bands include 52 data tones and 4 pilot tones, each of the 10 MHz sub-bands include 108 data tones and 6 pilot tones, and the 20 MHz sub-band includes 234 data tones and 8 pilot tones. This tone plan may include 3/3/3/11/3/7/3/11 or 7/7/7/9/11/11/11/11 guard tones between users, 11 or 9 guard tones at the edge, and 47 or 19 leftover tones.

A third 80 MHz tone plan for nine allocations includes six 5 MHz sub-bands, one 10 MHz sub-band, and two 20 MHz sub-band. Each of the 5 MHz sub-bands include 52 data tones and 4 pilot tones, the 10 MHz sub-band includes 108 data tones and 6 pilot tones, and each of the 20 MHz sub-bands include 234 data tones and 8 pilot tones. This tone plan may include 3/3/3/11/3/3/7/11 or 7/7/7/7/7/9/11/11 guard tones between users, 11 or 9 guard tones at the edge, and 35 or 15 leftover tones.

A fourth 80 MHz tone plan for nine allocations includes two 5 MHz sub-bands and seven 10 MHz sub-bands. Each of the 5 MHz sub-bands include 52 data tones and 4 pilot tones and each of the 10 MHz sub-bands include 108 data tones and 6 pilot tones. This tone plan may include 3/3/11/3/7/3/11/3 or 7/9/11/11/11/11/11/11 guard tones between users, 11 or 9 guard tones at the edge, and 59 or 23 leftover tones.

A first 80 MHz tone plan for ten allocations includes eight 5 MHz sub-bands and two 20 MHz sub-bands. Each of the 5 MHz sub-bands include 52 data tones and 4 pilot tones and each of the 20 MHz sub-bands include 234 data tones and 8 pilot tones. This tone plan may include 3/3/3/11/3/3/3/7/11 or 7/7/7/7/7/7/7/9/11 guard tones between users, 11 or 9 guard tones at the edge, and 34 or 14 leftover tones.

FIG. 12 is an exemplary illustration of additional tone allocations which may be used in an 80 MHz transmission. Generally, the tone allocation examples listed here focus on UL OFDMA. For downlink, one could use the same allocation plan as UL for simplicity, or with traveling pilots the DL users may be allocated by splitting the data tones only while using common pilots. Such a DL allocation scheme would leave more leftover tones, which could be used in a number of ways, as discussed above. Note that for each allocation type, other permutations are also possible. The examples listed here and below are ordered (e.g. 5/5/10 instead of 5/10/5) in order to have each half-bandwidth be self-contained, such that there is no user sitting on the wide band DC tones.

Two options are listed for the number of guard tones between uplink users. The first option follows the natural number of DC tones of the whole band, while the second set gets transmission on each physical sub-band with sub-DC tones. The order in each set assumed that the sub-band allocation is in ascending order in BW size. Other orders could also be used, such as, for example, descending order.

A second 80 MHz tone plan for ten allocations includes six 5 MHz sub-bands, three 10 MHz sub-bands, and one 20 MHz sub-band. Each of the 5 MHz sub-bands include 52 data tones and 4 pilot tones, each of the 10 MHz sub-bands include 108 data tones and 6 pilot tones, and the 20 MHz sub-band includes 234 data tones and 8 pilot tones. This tone plan may include 3/3/3/11/3/3/7/3/11 or 7/7/7/7/7/9/11/11/11 guard tones between users, 11 or 9 guard tones at the edge, and 46 or 18 leftover tones.

A third 80 MHz tone plan for ten allocations includes four 5 MHz sub-bands and six 10 MHz sub-bands. Each of the 5 MHz sub-bands include 52 data tones and 4 pilot tones and each of the 10 MHz sub-bands include 108 data tones and 6 pilot tones. This tone plan may include 3/3/3/11/3/7/3/11/3 or 7/7/7/9/11/11/11/11/11 guard tones between users, 11 or 9 guard tones at the edge, and 58 or 22 leftover tones.

A first 80 MHz tone plan for eleven allocations includes eight 5 MHz sub-bands, two 10 MHz sub-bands, and one 20 MHz sub-band. Each of the 5 MHz sub-bands include 52 data tones and 4 pilot tones, each of the 10 MHz sub-bands include 108 data tones and 6 pilot tones, and the 20 MHz sub-band includes 234 data tones and 8 pilot tones. This tone plan may include 3/3/3/11/3/3/3/7/3/11 or 7/7/7/7/7/7/7/9/11/11 guard tones between users, 11 or 9 guard tones at the edge, and 45 or 17 leftover tones.

A second 80 MHz tone plan for eleven allocations includes six 5 MHz sub-bands and five 10 MHz sub-bands. Each of the 5 MHz sub-bands include 52 data tones and 4 pilot tones and each of the 10 MHz sub-bands include 108 data tones and 6 pilot tones. This tone plan may include 3/3/3/11/3/3/7/3/11/3 or 7/7/7/7/7/9/11/11/11/11 guard tones between users, 11 or 9 guard tones at the edge, and 57 or 21 leftover tones.

A first 80 MHz tone plan for twelve allocations includes ten 5 MHz sub-bands, one 10 MHz sub-band, and one 20 MHz sub-band. Each of the 5 MHz sub-bands include 52 data tones and 4 pilot tones, the 10 MHz sub-band includes 108 data tones and 6 pilot tones, and the 20 MHz sub-band includes 234 data tones and 8 pilot tones. This tone plan may include 3/3/3/11/3/3/3/7/3/3/11 or 7/7/7/7/7/7/7/7/7/9/11 guard tones between users, 11 or 9 guard tones at the edge, and 44 or 16 leftover tones.

A second 80 MHz tone plan for twelve allocations includes eight 5 MHz sub-bands and four 10 MHz sub-bands. Each of the 5 MHz sub-bands include 52 data tones and 4 pilot tones and each of the 10 MHz sub-bands include 108 data tones and 6 pilot tones. This tone plan may include 3/3/3/11/3/3/3/7/3/11/3 or 7/7/7/7/7/7/7/9/11/11/11 guard tones between users, 11 or 9 guard tones at the edge, and 56 or 20 leftover tones.

FIG. 13 is an exemplary illustration of additional tone allocations which may be used in an 80 MHz transmission. Generally, the tone allocation examples listed here focus on UL OFDMA. For downlink, one could use the same allocation plan as UL for simplicity, or with traveling pilots the DL users may be allocated by splitting the data tones only while using common pilots. Such a DL allocation scheme would leave more leftover tones, which could be used in a number of ways, as discussed above. Note that for each allocation type, other permutations are also possible. The examples listed here and below are ordered (e.g. 5/5/10 instead of 5/10/5) in order to have each half-bandwidth be self-contained, such that there is no user sitting on the wide band DC tones.

Two options are listed for the number of guard tones between uplink users. The first option follows the natural number of DC tones of the whole band, while the second set gets transmission on each physical sub-band with sub-DC tones. The order in each set assumed that the sub-band allocation is in ascending order in BW size. Other orders could also be used, such as, for example, descending order.

A first 80 MHz tone plan for thirteen allocations includes ten 5 MHz sub-bands and three 10 MHz sub-bands. Each of the 5 MHz sub-bands include 52 data tones and 4 pilot tones and each of the 10 MHz sub-bands include 108 data tones and 6 pilot tones. This tone plan may include 3/3/3/11/3/3/3/7/3/3/11/3 or 7/7/7/7/7/7/7/7/7/9/11/11 guard tones between users, 11 or 9 guard tones at the edge, and 55 or 19 leftover tones.

A second 80 MHz tone plan for thirteen allocations includes twelve 5 MHz sub-bands and one 20 MHz sub-band. Each of the 5 MHz sub-bands include 52 data tones and 4 pilot tones and the 20 MHz sub-band includes 234 data tones and 8 pilot tones. This tone plan may include 3/3/3/11/3/3/3/7/3/3/3/11 or 7/7/7/7/7/7/7/7/7/7/7/9 guard tones between users, 11 or 9 guard tones at the edge, and 43 or 15 leftover tones.

An 80 MHz tone plan for fourteen allocations includes twelve 5 MHz sub-bands and two 10 MHz sub-bands. Each of the 5 MHz sub-bands include 52 data tones and 4 pilot tones and each of the 10 MHz sub-bands include 108 data tones and 6 pilot tones. This tone plan may include 3/3/3/11/3/3/3/7/3/3/3/11/3 or 7/7/7/7/7/7/7/7/7/7/9/11 guard tones between users, 11 or 9 guard tones at the edge, and 54 or 18 leftover tones.

An 80 MHz tone plan for fifteen allocations includes fourteen 5 MHz sub-bands and one 10 MHz sub-bands. Each of the 5 MHz sub-bands include 52 data tones and 4 pilot tones and the 10 MHz sub-band includes 108 data tones and 6 pilot tones. This tone plan may include 3/3/3/11/3/3/3/7/3/3/3/11/3/3 or 7/7/7/7/7/7/7/7/7/7/7/9 guard tones between users, 11 or 9 guard tones at the edge, and 53 or 17 leftover tones.

An 80 MHz tone plan for sixteen allocations includes sixteen 5 MHz sub-bands. Each of the 5 MHz sub-bands include 52 data tones and 4 pilot. This tone plan may include 3/3/3/11/3/3/3/7/3/3/3/11/3/3/3 or 7/7/7/7/7/7/7/7/7/7/7/7/7/7 7/7 guard tones between users, 11 or 9 guard tones at the edge, and 52 or 14 leftover tones.

For each of these 80 MHz tone plans, two options are listed for the number of guard tones between uplink users. The first option follows the natural number of DC tones of the whole band, while the second set gets transmission on each physical sub-band with sub-DC tones. The order in each set assumed that the sub-band allocation is in ascending order in BW size. Other orders could also be used, such as, for example, descending order.

Generally, two options are available for downlink and uplink tone planning: multicarrier tone allocation and single carrier tone allocation. In multicarrier tone allocation, each user's sub-band is the physical sub-band on the total bandwidth. In other words, users split the total bandwidth, rather than its tone plan. For example, 4 users with 20 MHz each may transmit over a total of 80 MHz. Each user may occupy a physical 20 MHz sub-band with 52 data tones (in 1× symbol duration) and 4 data tones, so in total, 208 data tones plus 16 pilot tones are used on the total 80 MHz, which is less than the 234 data tones and 8 pilot tones used for a 1×80 MHz transmission. In single carrier tone allocation, the tone plan (number of data tones for DL and number of data plus pilot tones for UL) for the total bandwidth of the transmission is split by the users. For example, with the same 4 users above, the users may split the 234 data tones between themselves. Similarly, for a 20 MHz transmission in 1× with 3 users with a 5/10/5 split, the 52 data tones may be split to produce 13/26/13 data tones.

A multicarrier tone allocation may have the advantages of being easy to mix with legacy transmission with changes in tone definitions. Further, DL and UL may share the same tone plan, and DL may still use wideband common pilots for their pilot tracking. Further, this system may allow less complexity in tone planning. However, one disadvantage of such an approach is that it may waste some mid-tones, consisting of tones between users (which are sub-band guard tones), sub-band DC tones, and sub-band pilot tones. In addition to existing tone plans, this may also necessitate the design of new tone allocations, such as those listed above. FIG. 14 is an illustration of the FFT size for 1× transmissions and 4× transmissions at various bandwidths, in MHz. Generally, the above tone plans may use multicarrier tone allocation.

Single carrier tone allocation, meanwhile, may save mid-tones such as the tones between users describe above as usable tones, which are split by users. However, such a tone allocation may require redefinition of tone indices when mixed with legacy transmissions, in order to allow the compatible OFDMA users groups to use extra tones used by those devices, compared to legacy devices. Further, DL and UL may require different tone plans, due to common/per user pilot and guard tones between users. Generally, DL may use common pilots for per user phase tracking, so the wideband pilot structure may be kept as it is when useful tones are split among multiple users. Further, guard tones between users are not needed for DL OFDMA, as packets to different users are in sync at the AP, and thus orthogonality between users' sub-band is kept by OFDM operation. DL transmission follows wideband mask, well, UL transmission should obey sub-band mask for each STA. For a non-intended receiver, they would see wideband signal rather than sub-band signals due to simultaneous UL transmissions. The combined signal may follow the wideband mask as sub-band mask is tighter than wideband mask. Note that no sub-band DC is needed for both DL and UL due to wideband IFFT/FFT.

Figure 15:
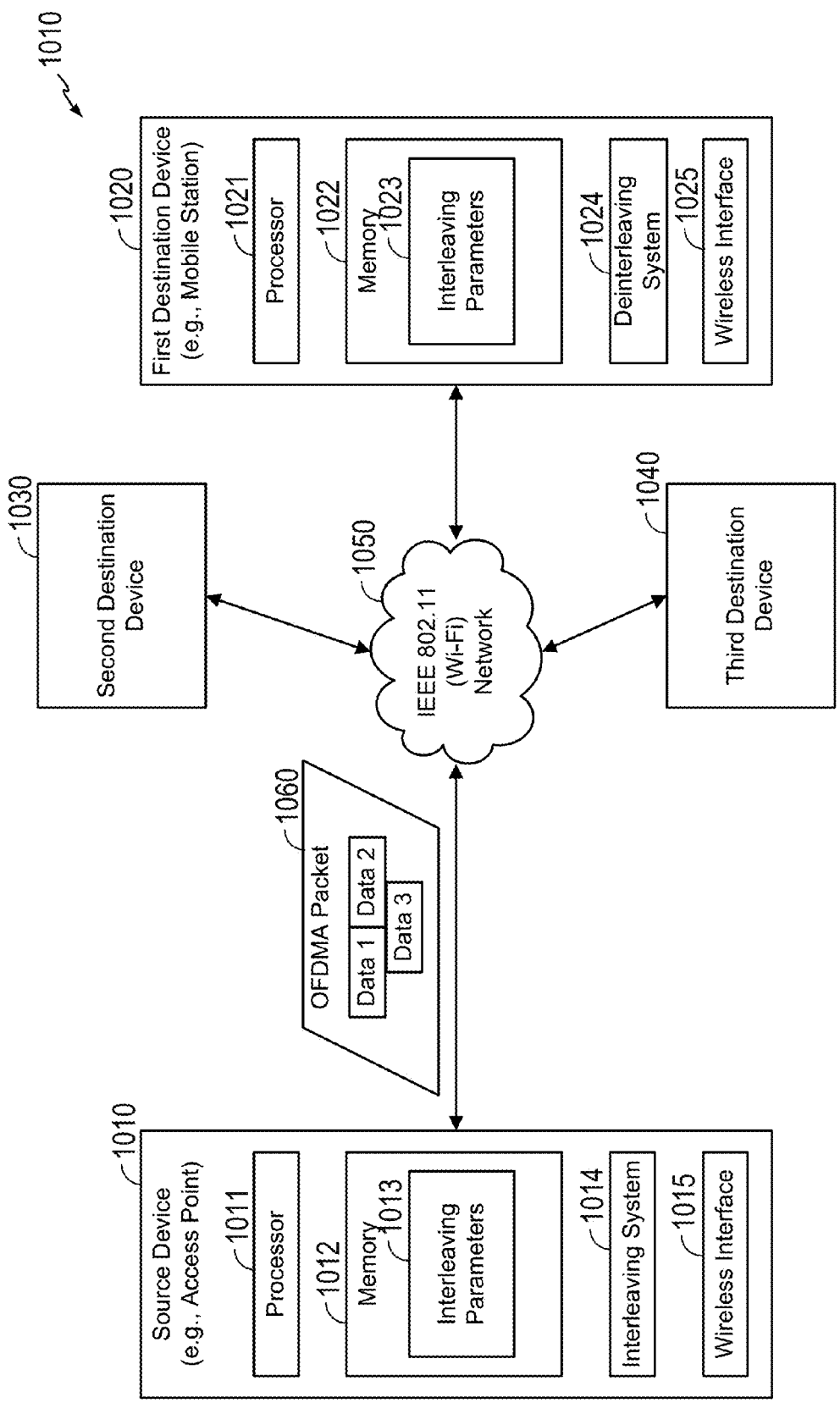
FIG. 15 shows a system that is operable to generate interleaving parameters for orthogonal frequency-division multiple access (OFDMA) tone plans, according to an embodiment.

FIG. 15 shows a system 1000 that is operable to generate interleaving parameters for orthogonal frequency-division multiple access (OFDMA) tone plans, according to an embodiment. The system 1000 includes a first device (e.g., a source device) 1010 configured to wirelessly communicate with a plurality of other devices (e.g., destination devices) 1020, 1030, and 1040 via a wireless network 1050. In alternate embodiments, a different number of source devices destination devices can be present in the system 1000. In various embodiments, the source device 1010 can include the AP 104 (FIG. 1) and the other devices 1020, 1030, and 1040 can include STAs 106A-106D (FIG. 1). The system 1000 can include the system 100 (FIG. 1). In various embodiments, any of the devices 1010, 1020, 1030, and 1040 can include the wireless device 202 (FIG. 2).

In a particular embodiment, the wireless network 1050 is an IEEE 802.11 wireless network (e.g., a Wi-Fi network).

For example, the wireless network 61050 can operate in accordance with an IEEE 802.11 standard. In a particular embodiment, the wireless network 1050 supports multiple access communication. For example, the wireless network 1050 can support communication of a single packet 1060 to each of the destination devices 1020, 1030, and 1040, where the single packet 1060 includes individual data portions directed to each of the destination devices. In one example, the packet 1060 can be an OFDMA packet, as further described herein.

The source device 1010 can be an access point (AP) or other device configured to generate and transmit multiple access packet(s) to multiple destination devices. In a particular embodiment, the source device 1010 includes a processor 1011 (e.g., a central processing unit (CPU), a digital signal processor (DSP), a network processing unit (NPU), etc.), a memory 1012 (e.g., a random access memory (RAM), a read-only memory (ROM), etc.), and a wireless interface 1015 configured to send and receive data via the wireless network 1050. The memory 1012 can store binary convolutional code (BCC) interleaving parameters 1013 used by an interleaving system 1014 to interleave data according to the techniques described with respect to an interleaving system 1114 of FIG. 15.

As used herein, a "tone" can represent a frequency or set of frequencies (e.g., a frequency range) within which data can be communicated. A tone can alternately be referred to as a subcarrier. A "tone" can thus be a frequency domain unit, and a packet can span multiple tones. In contrast to tones, a "symbol" can be a time domain unit, and a packet can span (e.g., include) multiple symbols, each symbol having a particular duration. A wireless packet can thus be visualized as a two-dimensional structure that spans a frequency range (e.g., tones) and a time period (e.g., symbols).

As an example, a wireless device can receive a packet via an 80 megahertz (MHz) wireless channel (e.g., a channel having 80 MHz bandwidth). The wireless device can perform a 512-point FFT to determine 512 tones in the packet. A subset of the tones can be considered "useable" and the remaining tones can be considered "unusable" (e.g., can be guard tones, direct current (DC) tones, etc.). To illustrate, 496 of the 512 tones can be useable, including 474 data tones and 22 pilot tones. As another example, there can be 476 data tones and 20 pilot tones. It should be noted that the aforementioned channel bandwidths, transforms, and tone plans are just examples. In alternate embodiments, different channel bandwidths (e.g., 5 MHz, 6 MHz, 6.5 MHz, 40 MHz, 80 MHz, etc.), different transforms (e.g., 256-point FFT, 1024-point FFT, etc.), and/or different tone plans can be used.

In a particular embodiment, a packet can include different block sizes (e.g., a different number of data tones per sub-band) that are transmitted over one or more spatial streams. For example, the packet can include 12 data tones per sub-band, 36 data tones per sub-band, 72 data tones per sub-band, 120 data tones per sub-band, 156 data tones per sub-band, or 312 data tones per sub-band. Interleave depths, interleave rotation indices, and base subcarrier rotations combinations can be provided for each block size.

In a particular embodiment, the interleaving parameters 1013 can be used by the interleaving system 1014 during generation of the multiple access packet 1060 to determine which data tones of the packet 1060 are assigned to individual destination devices. For example, the packet 1060 can include distinct sets of tones allocated to each individual destination device 1020, 1030, and 1040. To illustrate, the packet 1060 can utilize interleaved tone allocation.

The destination devices 1020, 1030, and 1040 can each include a processor (e.g., a processor 1021), a memory (e.g., a memory 1022), and a wireless interface (e.g., a wireless interface 1025). The destination devices 1020, 1030, and 1040 can also each include a deinterleaving system 1024 configured to deinterleave packets (e.g., single access packets or multiple access packets), as described with reference to a MIMO detector 1118 of FIG. 15. In one example, the memory 1022 can store interleaving parameters 1023 identical to the interleaving parameters 1013.

During operation, the source device 1010 can generate and transmit the packet 1060 to each of the destination devices 1020, 1030, and 1040 via the wireless network 1050. The packet 1060 can include distinct sets of data tones that are allocated to each individual destination device according to an interleaved pattern.

The system 1000 can thus provide OFDMA data tone interleaving parameters for use by source devices and destination devices to communicate over an IEEE 802.11 wireless network. For example, the interleaving parameters 1013, 1023 (or portions thereof) can be stored in a memory of the source and destination devices, as shown, can be standardized by a wireless standard (e.g., an IEEE 802.11 standard), etc. It should be noted that various data tone plans described herein can be applicable for both downlink (DL) as well as uplink (UL) OFDMA communication.

For example, the source device 1010 (e.g., an access point) can receive signal(s) via the wireless network 1050. The signal(s) can correspond to an uplink packet. In the packet, distinct sets of tones can be allocated to, and carry uplink data transmitted by, each of the destination devices (e.g., mobile stations) 1020, 1030, and 1040.

Figure 16:
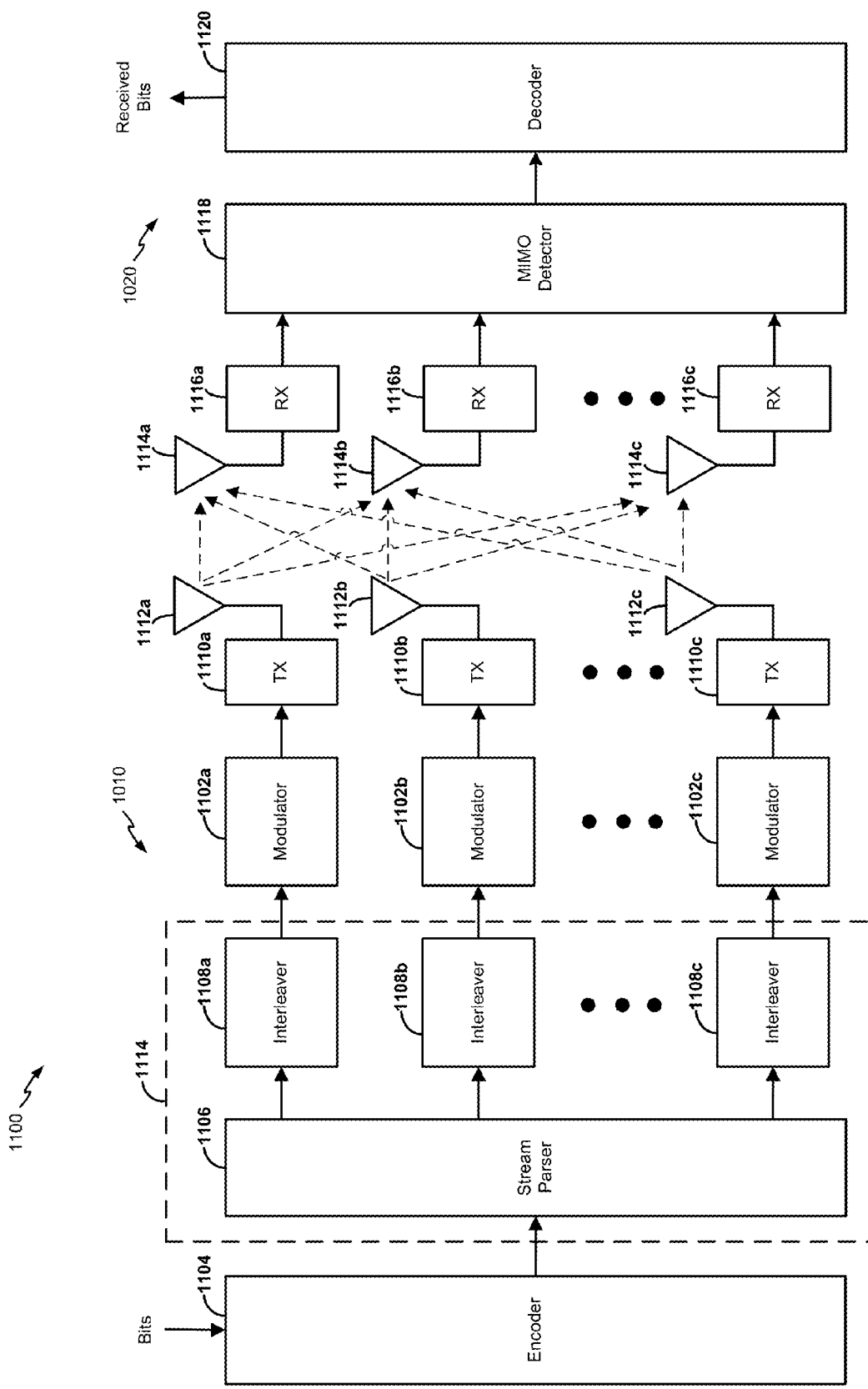
FIG. 16 shows an exemplary multiple-input-multiple-output (MIMO) system that can be implemented in wireless devices, such as the wireless device of FIG. 15, to transmit and receive wireless communications.

FIG. 16 shows an exemplary multiple-input-multiple-output (MIMO) system 1100 that can be implemented in wireless devices, such as the wireless device of FIG. 15, to transmit and receive wireless communications. The system 1100 includes the first device 1010 of FIG. 15 and the destination device 1020 of FIG. 15.

The first device 1010 includes an encoder 1104, the interleaving system 1014, a plurality of modulators 1102a-1102c, a plurality of transmission (TX) circuits 1110a-1110c, and a plurality of antennas 1112a-1112c. The destination device 1020 includes a plurality of antennas 1114a-1114c, a plurality of receive (RX) circuits 1116a-1116c, a MIMO detector 1118, and a decoder 1120.

A bit sequence can be provided to the encoder 1104. The encoder 1104 can be configured to encode the bit sequence. For example, the encoder 1104 can be configured to apply a forward error correcting (FEC) code to the bit sequence. The FEC code can be a block code, a convolutional code (e.g., a binary convolutional code), etc. The encoded bit sequence can be provided to the interleaving system 1014.

The interleaving system 1014 can include a stream parser 1106 and a plurality of spatial stream interleavers 1108a-1108c. The stream parser 1106 can be configured to parse the encoded bit stream from the encoder 1104 to the plurality of spatial stream interleavers 1108a-1108c.

Each interleaver 1108a-1108c can be configured to perform frequency interleaving. For example, the stream parser 1106 can output blocks of coded bits per symbol for each spatial stream. Each block can be interleaved by a corresponding interleaver 1108a-1108c that writes to rows and reads out columns. The number of columns (Ncol), or the interleaver depth, can be based on the number of data tones (Ndata). The number of rows (Nrow) can be a function of the number of columns (Ncol) and the number of data tones (Ndata). For example, the number of rows (Nrow) can be equal to the number of data tones (Ndata) divided by the number of columns (Ncol) (e.g., Nrow=Ndata/Ncol).

Figure 17:
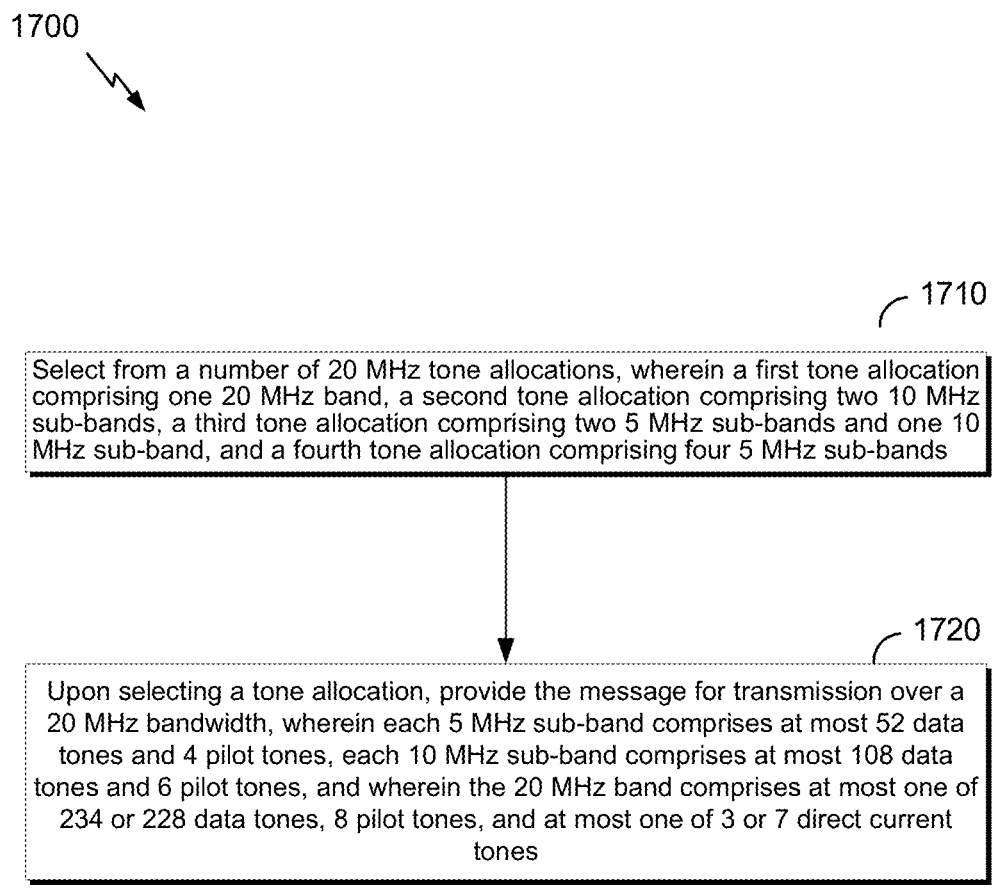
FIG. 17 shows a flowchart for an exemplary method of wireless communication that can be employed within the wireless communication system of FIG. 1.

FIG. 17 shows a flowchart 1700 for an exemplary method of wireless communication that can be employed within the wireless communication system 100 of FIG. 1. The method can be implemented in whole or in part by the devices described herein, such as the AP 104 (FIG. 1), any of the STAs 106A-106D (FIG. 1), the wireless device 202 shown in FIG. 2, the devices 1010, 1020, 1030, or 1040 (FIG. 15). Although the illustrated method is described herein with reference to the wireless communication system 100 discussed above with respect to FIG. 1, the wireless device 202 discussed above with respect to FIG. 2, the system 1000 of FIG. 15, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1710, a wireless device selects from a number of 20 MHz tone allocations, wherein a first tone allocation comprising one 20 MHz band, a second tone allocation comprising two 10 MHz sub-bands, a third tone allocation comprising two 5 MHz sub-bands and one 10 MHz sub-band, and a fourth tone allocation comprising four 5 MHz sub-bands. In some aspects, each sub-band may be directed to different devices, while in some aspects, a single device may receive two or more sub-bands. In some aspects, the means for selecting from the allocations may include a processor.

At block 1720, the wireless device, upon selecting a tone allocation, provides the message for transmission over a 20 MHz bandwidth, wherein each 5 MHz sub-band comprises at most 52 data tones and 4 pilot tones, each 10 MHz sub-band comprises at most 108 data tones and 6 pilot tones, and wherein the 20 MHz band comprises at most one of 234 or 228 data tones, 8 pilot tones, and at most one of 3 or 7 direct current tones. In some aspects, there may also be a number of leftover tones, which may be used as described above. In some aspects, the means for providing may include a processor and/or a transmitter. In some aspects, different numbers of data or pilot tones may be used for the various sub-bands, as described above.

FIG. 18 shows a flowchart 1800 for an exemplary method of wireless communication that can be employed within the wireless communication system 100 of FIG. 1. The method can be implemented in whole or in part by the devices described herein, such as the AP 104 (FIG. 1), any of the STAs 106A-106D (FIG. 1), the wireless device 202 shown in FIG. 2, the devices 1010, 1020, 1030, or 1040 (FIG. 15). Although the illustrated method is described herein with reference to the wireless communication system 100 discussed above with respect to FIG. 1, the wireless device 202 discussed above with respect to FIG. 2, the system 1000 of FIG. 15, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1810, a wireless device selects from a number of 40 MHz tone allocations, wherein a first tone allocation comprising one 40 MHz band, a second tone allocation comprising two 20 MHz sub-bands, a third tone allocation comprising two 10 MHz sub-bands and one 20 MHz sub-band, a fourth tone allocation comprising four 10 MHz sub-bands, a fifth tone allocation comprising two 5 MHz sub-bands, one 10 MHz sub-band and one 20 MHz sub-band, a sixth tone allocation comprising four 5 MHz sub-bands and one 20 MHz sub-band, a seventh tone allocation comprising two 5 MHz sub-bands and three 10 MHz sub-bands, an eighth tone allocation comprising four 5 MHz sub-bands and two 10 MHz sub-bands, a ninth tone allocation comprising six 5 MHz sub-bands and one 10 MHz sub-band and a tenth tone allocation comprising eight 5 MHz sub-bands. In some aspects, each sub-band may be directed to different devices, while in some aspects, a single device may receive two or more sub-bands. In some aspects, the means for selecting from the allocations may include a processor.

At block 1820, the wireless device, upon selecting a tone allocation, provides the message for transmission over a 40 MHz bandwidth, wherein each 5 MHz sub-band comprises 52 data tones and 4 pilot tones, each 10 MHz sub-band comprises 108 data tones and 6 pilot tones, each 20 MHz sub-band comprises one of 234 or 228 data tones, 8 pilot tones, and wherein the 40 MHz band comprises 468 data tones, 16 pilot tones, and 11 direct current tones. In some aspects, there may also be a number of leftover tones, which may be used as described above. In some aspects, the means for providing may include a processor and/or a transmitter. In some aspects, different numbers of data or pilot tones may be used for the various sub-bands, as described above.

FIG. 19 shows a flowchart 1900 for an exemplary method of wireless communication that can be employed within the wireless communication system 100 of FIG. 1. The method can be implemented in whole or in part by the devices described herein, such as the AP 104 (FIG. 1), any of the STAs 106A-106D (FIG. 1), the wireless device 202 shown in FIG. 2, the devices 1010, 1020, 1030, or 1040 (FIG. 15). Although the illustrated method is described herein with reference to the wireless communication system 100 discussed above with respect to FIG. 1, the wireless device 202 discussed above with respect to FIG. 2, the system 1000 of FIG. 15, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1910, a wireless device selects from a number of 80 MHz tone allocations, wherein a first tone allocation comprising one 80 MHz band, a second tone allocation comprising two 40 MHz sub-bands, a third tone allocation comprising two 20 MHz sub-bands and one 40 MHz sub-band, a fourth tone allocation comprising four 20 MHz sub-bands, a fifth tone allocation comprising two 10 MHz sub-bands, one 20 MHz sub-band and one 40 MHz sub-band, a sixth tone allocation comprising four 10 MHz sub-bands and one 40 MHz sub-band, a seventh tone allocation comprising two 5 MHz sub-bands, one 10 MHz sub-band, one 20 MHz sub-band, and one 40 MHz sub-band, an eighth tone allocation comprising two 10 MHz sub-bands and three 20 MHz sub-bands, a ninth tone allocation comprising two 5 MHz sub-bands, three 10 MHz sub-bands, and one 40 MHz sub-bands, a tenth tone allocation comprising four 5 MHz sub-bands, one 20 MHz sub-band, and one 40 MHz sub-band, an eleventh tone allocation comprising four 10 MHz sub-bands and two 20 MHz sub-bands, a twelfth tone allocation comprising four 5 MHz sub-bands, two 10 MHz sub-bands, and one 40 MHz sub-band, a thirteenth tone allocation comprising six 10 MHz sub-bands and one 20 MHz sub-band, a fourteenth tone allocation comprising two 5 MHz sub-bands, three 10 MHz sub-bands and two 20 MHz sub-bands, a fifteenth tone allocation comprising four 5 MHz sub-bands and three 20 MHz sub-bands, a sixteenth tone allocation comprising eight 10 MHz sub-bands, a seventeenth tone allocation comprising six 5 MHz sub-bands, one 10 MHz sub-band, and one 40 MHz sub-band, an eighteenth tone allocation comprising four 5 MHz sub-bands, two 10 MHz sub-bands and two 20 MHz sub-bands, a nineteenth tone allocation comprising two 5 MHz sub-bands, five 10 MHz sub-bands, and one 20 MHz sub-band, a twentieth tone allocation comprising eight 5 MHz sub-bands and one 40 MHz sub-band, a twenty-first tone allocation comprising four 5 MHz sub-bands, four 10 MHz sub-bands, and one 20 MHz sub-band, a twenty-second tone allocation comprising six 5 MHz sub-bands, one 10 MHz sub-band, and two 20 MHz sub-bands, a twenty-third tone allocation comprising two 5 MHz sub-bands and seven 10 MHz sub-bands, a twenty-fourth tone allocation comprising eight 5 MHz sub-bands and two 20 MHz sub-bands, a twenty-fifth tone allocation comprising six 5 MHz sub-bands, three 10 MHz sub-bands, and one 20 MHz sub-band, a twenty-sixth tone allocation comprising four 5 MHz sub-bands and six 10 MHz sub-bands, a twenty-seventh tone allocation comprising eight 5 MHz sub-bands, two 10 MHz sub-bands, and one 20 MHz sub-band, a twenty-eighth tone allocation comprising six 5 MHz sub-bands and five 10 MHz sub-bands, a twenty-ninth tone allocation comprising ten 5 MHz sub-bands, one 10 MHz sub-band, and one 20 MHz sub-bands, a thirtieth tone allocation comprising eight 5 MHz sub-bands and four 10 MHz sub-bands, a thirty-first tone allocation comprising ten 5 MHz sub-bands and three 10 MHz sub-bands, a thirty-second tone allocation comprising twelve 5 MHz sub-bands and one 20 MHz sub-band, a thirty-third tone allocation comprising twelve 5 MHz sub-bands and two 10 MHz sub-bands, a thirty-fourth tone allocation comprising fourteen 5 MHz sub-bands and one 10 MHz sub-band, a thirty-fifth tone allocation comprising sixteen 5 MHz sub-bands. In some aspects, each sub-band may be directed to different devices, while in some aspects, a single device may receive two or more sub-bands. In some aspects, the means for selecting from the allocations may include a processor.

At block 1920, the wireless device, upon selecting a tone allocation, provides the message for transmission over a 80 MHz bandwidth, wherein each 5 MHz sub-band comprises 52 data tones and 4 pilot tones, each 10 MHz sub-band comprises 108 data tones and 6 pilot tones, each 20 MHz sub-band comprises one of 234 or 228 data tones, 8 pilot tones, each 40 MHz sub-band comprises 468 data tones, 16 pilot tones, and wherein the 80 MHz band comprises 990 data tones, 16 pilot tones, and 7 direct current tones. In some aspects, there may also be a number of leftover tones, which may be used as described above. In some aspects, the means for providing may include a processor and/or a transmitter. In some aspects, different numbers of data or pilot tones may be used for the various sub-bands, as described above.

In an embodiment, the method shown in FIG. 19 can be implemented in a wireless device that can include a selecting circuit, a providing circuit, and a interleaving circuit. Those skilled in the art will appreciate that a wireless device can have more components than the simplified wireless device described herein. The wireless device described herein includes only those components useful for describing some prominent features of implementations within the scope of the claims.

The selecting circuit can be configured to selecting the tone plan for wireless communication of the message. In an embodiment, the selecting circuit can be configured to implement block 1110 of the flowchart 1100 (FIG. 15). The selecting circuit can include one or more of the DSP 220 (FIG. 2), the processor 204 (FIG. 2), and the memory 206 (FIG. 2). In some implementations, means for selecting can include the selecting circuit.

The providing circuit can be configured to provide the message for transmission according to the selected tone plan. In an embodiment, the providing circuit can be configured to implement any of blocks 1120-1130 of the flowchart 1100 (FIG. 15). The providing circuit can include one or more of the transmitter 210 (FIG. 2), the transceiver 214 (FIG. 2), the processor 204 (FIG. 2), the DSP 220 (FIG. 2), and the memory 206 (FIG. 2). In some implementations, means for providing can include the providing circuit.

The interleaving circuit can be configured to interleave data for transmission. The interleaving circuit can include one or more of the interleaving system 1014 (FIG. 15), the stream parser 1106 (FIG. 16), any of the interleavers 1108A-1108C (FIG. 16), the processor 204 (FIG. 2), the DSP 220 (FIG. 2), and the memory 206 (FIG. 2). In some implementations, means for interleaving can include the interleaving circuit.

FIG. 20 is an illustration of binary convolutional code (BCC) interleaving and low-density parity check (LDPC) tone mapping distances ($D_{TMs}$) for a plurality of allocation (RU) sizes and corresponding numbers of data tones ($N_{SD}$), according to various embodiments. In various embodiments, aspects shown in FIG. 20 can be applied in accordance with other aspects of this disclosure, for example in conjunction with the bandwidths and/or FFT tones discussed with respect to FIG. 4 (or any other figures discussed herein). In this illustration, RU size can be the number of tones that can be allocated as a group to any station. The tones in each allocation can be divided into data tones ($N_{SD}$), pilot tones, DC tones, guard tones, and leftover tones, for example as shown in FIG. 4.

Certain rows in this illustration include multiple embodiments for interleaver parameters or LDPC tone mapping distances. In some aspects, it may be beneficial to perform simulations when choosing between multiple different embodiments for parameters values. In certain aspects, it may be beneficial to choose parameter values which are as close to hardware-compatible values as possible, in order to get similar performance and to ease implementation of these techniques. Generally, it may be observed that Ncol multiplied by LDPC tone mapping distance is often equal to the number of data tones.

In the illustrated embodiment, for an RU size of 26, 24 data tones can be used. The BCC interleaver, for example the interleaving system 1014 (FIG. 15) or 1108a-1108c (FIG. 16) can include Ncol of 8, an Nrot of 2 when there are four or fewer spatial streams, and Nrot of 1 when there are more than four spatial streams. The LDPC $D_{TM}$ can be 1.

In the illustrated embodiment, for an RU size of 52, 48 data tones can be used. The BCC interleaver, for example the interleaving system 1014 (FIG. 15) or 1108a-1108c (FIG. 16) can include Ncol of 16, an Nrot of 11 when there are four or fewer spatial streams, and Nrot of 6 when there are more than four spatial streams. The LDPC $D_{TM}$ can be 3. In the illustrated embodiment, $D_{TM}=N_{SD}/N_{COL}$.

In the illustrated embodiment, for an RU size of 106, 102 data tones can be used. The BCC interleaver, for example the interleaving system 1014 (FIG. 15) or 1108a-1108c (FIG. 16) can include Ncol of 17, an Nrot of 29 when there are four or fewer spatial streams, and Nrot of 13 when there are more than four spatial streams. The LDPC $D_{TM}$ can be 6. In the illustrated embodiment, $D_{TM}=N_{SD}/N_{COL}$.

In the illustrated embodiment, for an RU size of 242, 234 data tones can be used. The BCC interleaver, for example the interleaving system 1014 (FIG. 15) or 1108a-1108c (FIG. 16) can include Ncol of 26, an Nrot of 58 when there are four or fewer spatial streams, and Nrot of 28 when there are more than four spatial streams. The LDPC $D_{TM}$ can be 9.

In a first embodiment, for an RU size of 484, 468 data tones can be used. In the first embodiment, the BCC interleaver can be omitted, and no segment parsing for LDPC can be performed. The LDPC $D_{TM}$ can be 12.

In a second embodiment, for the RU size of 484, 468 data tones can be used. The BCC interleaver, for example the interleaving system 1014 (FIG. 15) or 1108a-1108c (FIG. 16) can include Ncol of 26, an Nrot of 58 when there are four or fewer spatial streams, and the number of spatial streams can be limited to be less than or equal to four. The LDPC $D_{TM}$ can be 9.

In a third embodiment, for the RU size of 484, 468 data tones can be used. The BCC interleaver, for example the interleaving system 1014 (FIG. 15) or 1108a-1108c (FIG. 16) can include Ncol of 39, an Nrot of 116 when there are four or fewer spatial streams, and an Nrot of 56 when there are more than four spatial streams. In the third embodiment, a single interleaver can be used, and thus segment parsing can be omitted. The LDPC $D_{TM}$ can be 12. In the illustrated embodiment, $D_{TM}=N_{SD}/N_{COL}$.

For an RU size of 996, 980 data tones can be used. In the illustrated embodiment, the BCC interleaver can be omitted. The LDPC $D_{TM}$ can be 20.

For an RU size of 1992 (for example, two 996-tone allocations), 980 data tones can be used for each 996-tone allocation. In the illustrated embodiment, the BCC interleaver can be omitted, and segment parsing performed. The LDPC $D_{TM}$ can be 20.

In various embodiments, for devices supporting 80 MHz transmissions, BCC support for 40 MHz transmissions can be optional. In another embodiment, for devices not supporting 80 MHz transmissions, BCC support for 40 MHz transmissions can be mandated. In some embodiments, APs can support BCC for 40 MHz transmissions in order to accommodate a mixed environment where some STAs support BCC for 40 MHz transmissions and some STAs do not support BCC for 40 MHz transmissions. In some embodiments, for any given RU size, the number of spatial streams ($N_{SS}$) can be less than or equal to four. For example, in some cases, $N_{SS}>4$ is not supported in BCC for all RU sizes.

Figure 21:
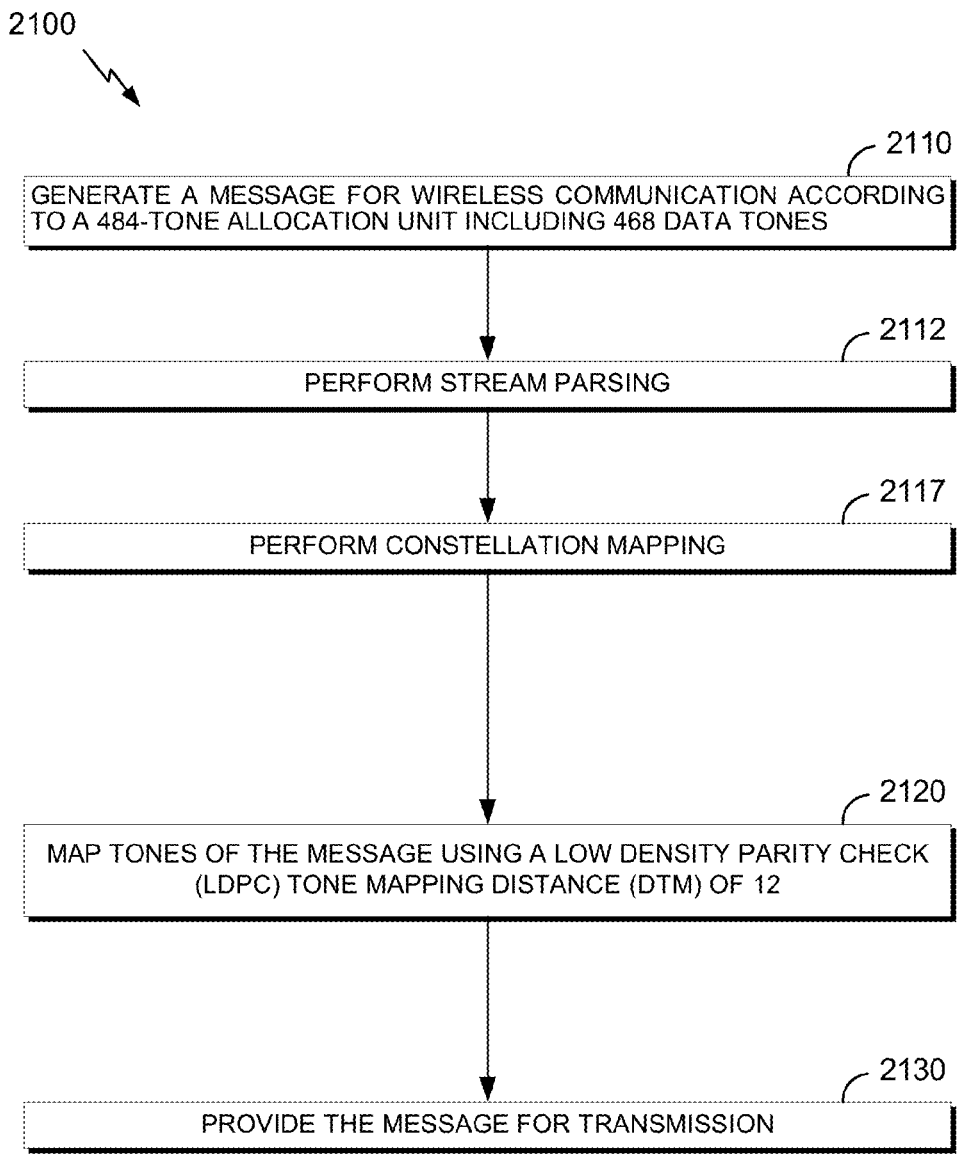
FIG. 21 shows a flowchart for another exemplary method of wireless communication that can be employed within the wireless communication system of FIG. 1.

FIG. 21 shows a flowchart 2100 for another exemplary method of wireless communication that can be employed within the wireless communication system 100 of FIG. 1. The method can be implemented in whole or in part by the devices described herein, such as the AP 104 (FIG. 1), any of the STAs 106A-106D (FIG. 1), the wireless device 202 shown in FIG. 2, and/or the devices 1010, 1020, 1030, or 1040 (FIG. 15). Although the illustrated method is described herein with reference to the wireless communication system 100 discussed above with respect to FIG. 1, the wireless device 202 discussed above with respect to FIG. 2, the system 1000 of FIG. 15, and the tone plans of FIG. 20, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 2110, a wireless device generates a message for wireless communication according to a 484-tone allocation unit. The 484-tone allocation unit includes 468 data tones. For example, the AP 104 can generate a message according to the 484-tone allocation unit, having 468 data tones, discussed above with respect to FIG. 20.

In various embodiments, generating the message according to the 484-tone allocation unit can include one or more of: encoding a plurality of data bits, parsing the stream of encoded bits, interleaving the encoded bits, mapping the encoded bits as quadrature amplitude modulation (QAM) symbols and then to OFDM data tones, mapping a pilot sequence of bits to a specified number of pilot OFDM tones, and mapping null data bits to a specified number of left guard tones, right guard tones, and DC tones. For example, the encoder 1104 (FIG. 16) can encode the data bits. The stream parser 1106 (FIG. 16) can parse the encoded data bits. The interleavers 1108a-1108c (FIG. 16) interleave the parsed data. The modulators 1102a-1108c (FIG. 16) can map the data bits to 468 OFDM data tones, map a pilot sequence of bits to pilot OFDM tones, and map null data bits to left guard tones, right guard tones, and DC tones. In the illustrated embodiment, the interleavers and stream parsers are omitted.

Then, at block 2112, the wireless device performs stream parsing. For example, the stream parser 1106 (FIG. 16) can parse the encoded data bits into one or more bit streams.

In the illustrated embodiment coded bits go through QAM mapping, and then LDPC tone mapping to map QAM symbols to tones. In various embodiments, LDPC has enough bit level randomness, so the tone mapping (which can be characterized as a kind of interleaving) is performed on QAM symbols to achieve frequency diversity. Thus, at block 2117, the wireless device performs constellation mapping. For example, a mapper of the system 1100 (FIG. 16) can map the data bits to 468 OFDM data tones, map a pilot sequence of bits to pilot OFDM tones, and map null data bits to left guard tones, right guard tones, and DC tones.

Thereafter, at block 2120, the wireless device maps tones of the message using a tone mapping distance (DTM) of 12 for low density parity check (LDPC). In some embodiments, the process of tone mapping can include associating constellation points of encoded data bits with OFDM subcarriers. The OFDM subcarriers to which each tone is mapped can be separated by the indicated number of subcarriers. For example, such mapping can include encoding a plurality of data bits, and mapping those encoded bits to QAM symbols. Mapping can further include mapping the 1st QAM symbol to the 1st data tone, the 2nd QAM symbol to the (1+DTM)-th data tone, the 3rd QAM symbol to the (1+2*DTM)-th data tone, and so on. Mappings can wrap around such that, for example, the 49th QAM symbol is mapped to the 960-th data tone, and the 50th QAM symbol is mapped to the 2nd data tone, the 51-st QAM symbol is mapped to the (2+D_TM)-th data tone, and so on.

Then, at block 2130, the wireless device provides the message for transmission. For example, the AP 104 can provide the message to the transmitter 210 for transmission over the antenna 216 according to the 484-tone allocation unit. In various embodiments, any bandwidth discussed herein can be used.

In various embodiments, providing the message for transmission includes one or more of: encoding a plurality of data bits, parsing the stream of encoded bits, interleaving the encoded bits, mapping the encoded bits as QAM symbols and then to OFDM data tones, mapping a pilot sequence of bits to a specified number of pilot OFDM tones, and mapping null data bits to a specified number of left guard tones, right guard tones, and DC tones. For example, the processor 204 (FIG. 2) can organize a plurality of data bits according to the 484-tone allocation unit. The encoder 1104 (FIG. 16) can encode the data bits. The stream parser 1106 (FIG. 16) can parse the encoded data bits. The interleavers 1108a-1108c (FIG. 16) interleave the parsed data. The modulators 1102a-1108c (FIG. 16) can modulate the interleaved data for transmission via the transmitters 1110a-1110c (FIG. 16). In the illustrated embodiment, the interleavers and stream parsers are omitted.

In various embodiments, the method can be performed on a mobile station such as, for example, a STA 106A-106D of FIG. 1. Providing the message for transmission can include transmitting the message through a transmitter (for example, the transmitter 210 of FIG. 2) and an antenna (for example, the antenna 216 of FIG. 2) of the mobile station to an access point (for example, the AP 104 of FIG. 1) serving the mobile station. In various embodiments, the method can be performed on an access point such as, for example, the AP 104 of FIG. 1. Providing the message for transmission can include transmitting the message through a transmitter (for example, the transmitter 210 of FIG. 2) and an antenna (for example, the antenna 216 of FIG. 2) of the access point to a mobile station (for example, the STA 106A of FIG. 1) served by the access point.

In various embodiments, the method of FIG. 21 can include one or more blocks or features shown in the method of FIG. 17-19. The 484-tone allocation unit can have any of the characteristics discussed above with respect to FIGS. 4-14.

In an embodiment, the method shown in FIG. 21 can be implemented in a wireless device that can include a generating circuit, a mapping circuit, and a providing circuit. Those skilled in the art will appreciate that a wireless device can have more components than the simplified wireless device described herein. The wireless device described herein includes only those components useful for describing some prominent features of implementations within the scope of the claims.

The generating circuit can be configured to generate the message according to the 1024-tone plan. In an embodiment, the generating circuit can be configured to implement block 2110 of the flowchart 2100 (FIG. 21). The generating circuit can include one or more of the DSP 220 (FIG. 2), the processor 204 (FIG. 2), and the memory 206 (FIG. 2). In some implementations, means for generating can include the generating circuit.

The mapping circuit can be configured to map tones of the message using a low density parity check (LDPC) tone mapping distance (DTM). In various embodiments, the DTM can be one of 10, 14, or 20. The mapping circuit can include one or more of the DSP 220 (FIG. 2), the processor 204 (FIG. 2), the memory 206 (FIG. 2), the interleaving system 1014 (FIG. 15), the interleavers 1108a-1108c (FIG. 16), and the modulators 1102a-702c (FIG. 16). In some implementations, means for mapping can include the generating circuit.

The providing circuit can be configured to provide the message for transmission. In an embodiment, the providing circuit can be configured to implement block 2120 of the flowchart 2100 (FIG. 21). The providing circuit can include one or more of the transmitter 210 (FIG. 2), the transceiver 214 (FIG. 2), the processor 204 (FIG. 2), the DSP 220 (FIG. 2), the antenna 216 (FIG. 2), and the memory 206 (FIG. 2). In some implementations, means for providing can include the providing circuit.

In various embodiments, the wireless device can further include a transmitting circuit. The transmitting circuit can be configured to transmit the message, for example through a transmitter and an antenna of a mobile station or access point. The transmitting circuit can include one or more of the transmitter 210 (FIG. 2), the transceiver 214 (FIG. 2), the processor 204 (FIG. 2), the DSP 220 (FIG. 2), the antenna 216 (FIG. 2), and the memory 206 (FIG. 2). In some implementations, means for transmitting can include the transmitting circuit.

Figure 22:
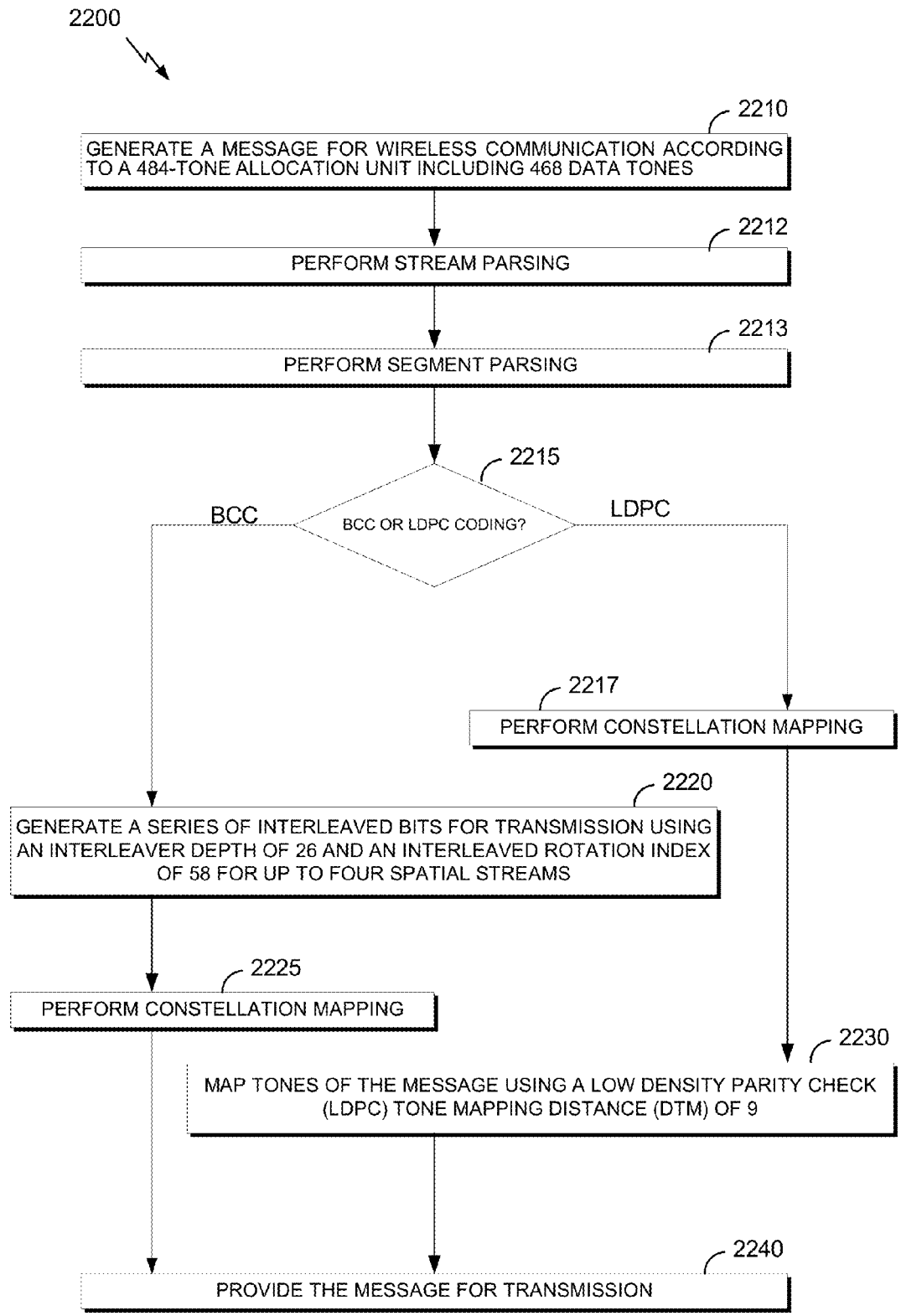
FIG. 22 shows a flowchart for another exemplary method of wireless communication that can be employed within the wireless communication system of FIG. 1.

FIG. 22 shows a flowchart 2200 for another exemplary method of wireless communication that can be employed within the wireless communication system 100 of FIG. 1. The method can be implemented in whole or in part by the devices described herein, such as the AP 104 (FIG. 1), any of the STAs 106A-106D (FIG. 1), the wireless device 202 shown in FIG. 2, and/or the devices 1010, 1020, 1030, or 1040 (FIG. 15). Although the illustrated method is described herein with reference to the wireless communication system 100 discussed above with respect to FIG. 1, the wireless device 202 discussed above with respect to FIG. 2, the system 1000 of FIG. 15, and the tone plans of FIG. 20, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 2210, a wireless device generates a message for wireless communication according to a 484-tone allocation unit. The 484-tone allocation unit includes 468 data tones. For example, the AP 104 can generate a message according to the 484-tone allocation unit, having 468 data tones, discussed above with respect to FIG. 20.

In various embodiments, generating the message according to the 484-tone allocation unit can include one or more of: encoding a plurality of data bits, parsing the stream of encoded bits, interleaving the encoded bits, mapping the encoded bits as QAM symbols and then to OFDM data tones, mapping a pilot sequence of bits to a specified number of pilot OFDM tones, and mapping null data bits to a specified number of left guard tones, right guard tones, and DC tones. For example, the encoder 1104 (FIG. 16) can encode the data bits.

Then, at block 2212, the wireless device performs stream parsing. For example, the stream parser 1106 (FIG. 16) can parse the encoded data bits into one or more bit streams.

Next, at block 2213, the wireless device performs segment parsing. For example, a segment parser of the system 1100 (FIG. 16) can parse the bit stream into one or more segments.

Subsequently, at block 2215, the wireless device selects between BCC and LDPC coding. If BCC is selected (block 2220), coded bits go through BCC interleaving (for example, according to Ncol, Nrot, and stream permutation shown in FIG. 20) and then QAM mapping before mapping QAM symbols to tones. In various embodiments, BCC utilizes bit level interleaving for randomness, so interleaving is performed on coded bits. Thus, at block 2220, the wireless device generates a series of interleaved bits for transmission using an interleaver depth of 26 and an interleaved rotation index of 58 for up to four spatial streams. For example, the interleavers 1108a-1108c (FIG. 16) can interleave the parsed data. Spatial streams above four can be omitted. Thereafter, at block 2225, the wireless device performs constellation mapping. For example, a mapper of the system 1100 (FIG. 16) can map the data bits to 468 OFDM data tones, map a pilot sequence of bits to pilot OFDM tones, and map null data bits to left guard tones, right guard tones, and DC tones.

Returning to block 2215, if LDPC is selected (block 2230), coded bits go through QAM mapping, and then LDPC tone mapping to map QAM symbols to tones. In various embodiments, LDPC has enough bit level randomness, so the tone mapping (which can be characterized as a kind of interleaving) is performed on QAM symbols to achieve frequency diversity. Thus, at block 2217, the wireless device performs constellation mapping. For example, a mapper of the system 1100 (FIG. 16) can map the data bits to 468 OFDM data tones, map a pilot sequence of bits to pilot OFDM tones, and map null data bits to left guard tones, right guard tones, and DC tones. Thereafter, at block 2230, the wireless device maps tones of the message using a tone mapping distance (DTM) of 9 for low density parity check (LDPC). In some embodiments, the process of tone mapping can include associating constellation points of encoded data bits with OFDM subcarriers. The OFDM subcarriers to which each tone is mapped can be separated by the indicated number of subcarriers. For example, such mapping can include encoding a plurality of data bits, and mapping those encoded bits to quadrature amplitude modulation (QAM) symbols. Mapping can further include mapping the 1st QAM symbol to the 1st data tone, the 2nd QAM symbol to the (1+DTM)-th data tone, the 3rd QAM symbol to the (1+2*DTM)-th data tone, and so on. Mappings can wrap around such that, for example, the 49th QAM symbol is mapped to the 960-th data tone, and the 50th QAM symbol is mapped to the 2nd data tone, the 51-st QAM symbol is mapped to the (2+D_TM)-th data tone, and so on.

Referring back to FIG. 20, in various embodiments, the BCC interleaving parameters and LDPC tone mapping designs are separate. In the illustrated embodiment, they are connected in two ways: (1) either both coding methods use segment parsing, or both coding method don't use segment parsing; and (2) through the relation $D_{TM}=N_{SD}/N_{COL}$ for example 9=234/26 or 12=468/39), both BCC interleaving and LDPC tone mapping share same interleaving depth.

Returning to FIG. 22, at block 2240, the wireless device provides the message for transmission. For example, the AP 104 can provide the message to the transmitter 220 for transmission over the antenna 226 according to the 484-tone allocation unit. In various embodiments, any bandwidth discussed herein can be used.

In various embodiments, providing the message for transmission includes one or more of: encoding a plurality of data bits, parsing the stream of encoded bits, interleaving the encoded bits, mapping the encoded bits as QAM symbols and then to OFDM data tones, mapping a pilot sequence of bits to a specified number of pilot OFDM tones, and mapping null data bits to a specified number of left guard tones, right guard tones, and DC tones. For example, the processor 204 (FIG. 2) can organize a plurality of data bits according to the 484-tone allocation unit. The encoder 1104 (FIG. 16) can encode the data bits. The stream parser 1106 (FIG. 16) can parse the encoded data bits. The interleavers 1108a-1108c (FIG. 16) interleave the parsed data. The modulators 1102a-1108c (FIG. 16) can modulate the interleaved data for transmission via the transmitters 1110a-1110c (FIG. 16).

In various embodiments, the method can be performed on a mobile station such as, for example, a STA 106A-106D of FIG. 1. Providing the message for transmission can include transmitting the message through a transmitter (for example, the transmitter 220 of FIG. 2) and an antenna (for example, the antenna 226 of FIG. 2) of the mobile station to an access point (for example, the AP 104 of FIG. 1) serving the mobile station. In various embodiments, the method can be performed on an access point such as, for example, the AP 104 of FIG. 1. Providing the message for transmission can include transmitting the message through a transmitter (for example, the transmitter 220 of FIG. 2) and an antenna (for example, the antenna 226 of FIG. 2) of the access point to a mobile station (for example, the STA 106A of FIG. 1) served by the access point.

In various embodiments, the method of FIG. 22 can include one or more blocks or features shown in the method of FIG. 17-19. The 484-tone allocation unit can have any of the characteristics discussed above with respect to FIGS. 4-14.

In an embodiment, the method shown in FIG. 22 can be implemented in a wireless device that can include a generating circuit, a mapping circuit, and a providing circuit. Those skilled in the art will appreciate that a wireless device can have more components than the simplified wireless device described herein. The wireless device described herein includes only those components useful for describing some prominent features of implementations within the scope of the claims.

The generating circuit can be configured to generate the message according to the 1024-tone plan. In an embodiment, the generating circuit can be configured to implement block 2210 of the flowchart 2200 (FIG. 22). The generating circuit can include one or more of the DSP 220 (FIG. 2), the processor 204 (FIG. 2), and the memory 206 (FIG. 2). In some implementations, means for generating can include the generating circuit.

The mapping circuit can be configured to map tones of the message using a low density parity check (LDPC) tone mapping distance (DTM). In various embodiments, the DTM can be one of 10, 14, or 20. The mapping circuit can include one or more of the DSP 220 (FIG. 2), the processor 204 (FIG. 2), the memory 206 (FIG. 2), the interleaving system 1014 (FIG. 15), the interleavers 1108a-1108c (FIG. 16), and the modulators 1102a-702c (FIG. 16). In some implementations, means for mapping can include the generating circuit.

The providing circuit can be configured to provide the message for transmission. In an embodiment, the providing circuit can be configured to implement block 2220 of the flowchart 2200 (FIG. 22). The providing circuit can include one or more of the transmitter 220 (FIG. 2), the transceiver 224 (FIG. 2), the processor 204 (FIG. 2), the DSP 220 (FIG. 2), the antenna 226 (FIG. 2), and the memory 206 (FIG. 2). In some implementations, means for providing can include the providing circuit.

In various embodiments, the wireless device can further include a transmitting circuit. The transmitting circuit can be configured to transmit the message, for example through a transmitter and an antenna of a mobile station or access point. The transmitting circuit can include one or more of the transmitter 220 (FIG. 2), the transceiver 224 (FIG. 2), the processor 204 (FIG. 2), the DSP 220 (FIG. 2), the antenna 226 (FIG. 2), and the memory 206 (FIG. 2). In some implementations, means for transmitting can include the transmitting circuit.

Figure 23:
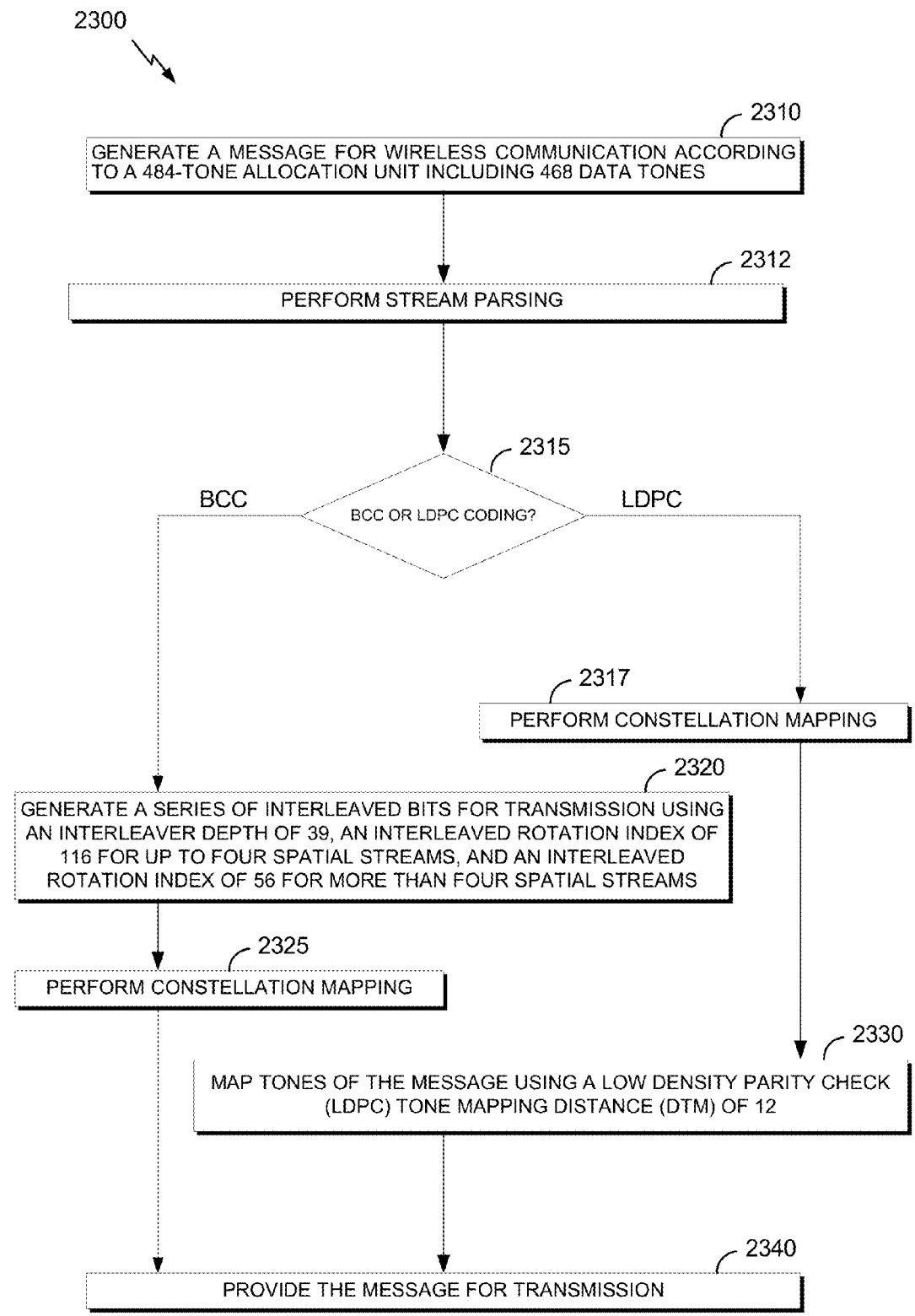
FIG. 23 shows a flowchart for another exemplary method of wireless communication that can be employed within the wireless communication system of FIG. 1.

FIG. 23 shows a flowchart 2300 for another exemplary method of wireless communication that can be employed within the wireless communication system 100 of FIG. 1.

The method can be implemented in whole or in part by the devices described herein, such as the AP 104 (FIG. 1), any of the STAs 106A-106D (FIG. 1), the wireless device 202 shown in FIG. 2, and/or the devices 1010, 1020, 1030, or 1040 (FIG. 15). Although the illustrated method is described herein with reference to the wireless communication system 100 discussed above with respect to FIG. 1, the wireless device 202 discussed above with respect to FIG. 2, the system 1000 of FIG. 15, and the tone plans of FIG. 20, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 2310, a wireless device generates a message for wireless communication according to a 484-tone allocation unit. The 484-tone allocation unit includes 468 data tones. For example, the AP 104 can generate a message according to the 484-tone allocation unit, having 468 data tones, discussed above with respect to FIG. 20.

In various embodiments, generating the message according to the 484-tone allocation unit can include one or more of: encoding a plurality of data bits, parsing the stream of encoded bits, interleaving the encoded bits, mapping the encoded bits as QAM symbols and then to OFDM data tones, mapping a pilot sequence of bits to a specified number of pilot OFDM tones, and mapping null data bits to a specified number of left guard tones, right guard tones, and DC tones. For example, the encoder 1104 (FIG. 16) can encode the data bits. In the illustrated embodiment, the segment parser can be omitted, and a single interleaver can be used.

Then, at block 2312, the wireless device performs stream parsing. For example, the stream parser 1106 (FIG. 16) can parse the encoded data bits into one or more bit streams.

Subsequently, at block 2315, the wireless device selects between BCC and LDPC coding. If BCC is selected (block 2320), coded bits go through BCC interleaving (for example, according to Ncol, Nrot, and stream permutation shown in FIG. 20) and then QAM mapping before mapping QAM symbols to tones. In various embodiments, BCC utilizes bit level interleaving for randomness, so interleaving is performed on coded bits. Thus, at block 2320, the wireless device generates a series of interleaved bits for transmission using an interleaver depth of 39, an interleaved rotation index of 116 for up to four spatial streams, and an interleaved rotation index of 56 for more than four spatial streams. For example, a single interleaver 1108a-1108c (FIG. 16) can interleave the parsed data. Thereafter, at block 2325, the wireless device performs constellation mapping. For example, a mapper of the system 1100 (FIG. 16) can map the data bits to 468 OFDM data tones, map a pilot sequence of bits to pilot OFDM tones, and map null data bits to left guard tones, right guard tones, and DC tones.

Returning to block 2315, if LDPC is selected (block 2330), coded bits go through QAM mapping, and then LDPC tone mapping to map QAM symbols to tones. In various embodiments, LDPC has enough bit level randomness, so the tone mapping (which can be characterized as a kind of interleaving) is performed on QAM symbols to achieve frequency diversity. Thus, at block 2317, the wireless device performs constellation mapping. For example, a mapper of the system 1100 (FIG. 16) can map the data bits to 468 OFDM data tones, map a pilot sequence of bits to pilot OFDM tones, and map null data bits to left guard tones, right guard tones, and DC tones. Thereafter, at block 2330, the wireless device maps tones of the message using a tone mapping distance (DTM) of 12 for low density parity check (LDPC). In some embodiments, the process of tone mapping can include associating constellation points of encoded data bits with OFDM subcarriers. The OFDM subcarriers to which each tone is mapped can be separated by the indicated number of subcarriers. For example, such mapping can include encoding a plurality of data bits, and mapping those encoded bits to quadrature amplitude modulation (QAM) symbols. Mapping can further include mapping the 1st QAM symbol to the 1st data tone, the 2nd QAM symbol to the (1+DTM)-th data tone, the 3rd QAM symbol to the (1+2*DTM)-th data tone, and so on. Mappings can wrap around such that, for example, the 49th QAM symbol is mapped to the 960-th data tone, and the 50th QAM symbol is mapped to the 2nd data tone, the 51-st QAM symbol is mapped to the (2+D_TM)-th data tone, and so on.

Referring back to FIG. 20, in various embodiments, the BCC interleaving parameters and LDPC tone mapping designs are separate. In the illustrated embodiment, they are connected in two ways: (1) either both coding methods use segment parsing, or both coding method don't use segment parsing; and (2) through the relation $D_{TM}=N_{SD}/N_{COL}$ for example 9=234/26 or 12=468/39), both BCC interleaving and LDPC tone mapping share same interleaving depth.

Returning to FIG. 23, at block 2340, the wireless device provides the message for transmission. For example, the AP 104 can provide the message to the transmitter 230 for transmission over the antenna 236 according to the 484-tone allocation unit. In various embodiments, any bandwidth discussed herein can be used.

In various embodiments, providing the message for transmission includes one or more of: encoding a plurality of data bits, parsing the stream of encoded bits, interleaving the encoded bits, mapping the encoded bits as QAM symbols and then to OFDM data tones, mapping a pilot sequence of bits to a specified number of pilot OFDM tones, and mapping null data bits to a specified number of left guard tones, right guard tones, and DC tones. For example, the processor 204 (FIG. 2) can organize a plurality of data bits according to the 484-tone allocation unit. The encoder 1104 (FIG. 16) can encode the data bits. The stream parser 1106 (FIG. 16) can parse the encoded data bits. The interleavers 1108a-1108c (FIG. 16) interleave the parsed data. The modulators 1102a-1108c (FIG. 16) can modulate the interleaved data for transmission via the transmitters 1110a-1110c (FIG. 16).

In various embodiments, the method can be performed on a mobile station such as, for example, a STA 106A-106D of FIG. 1. Providing the message for transmission can include transmitting the message through a transmitter (for example, the transmitter 230 of FIG. 2) and an antenna (for example, the antenna 236 of FIG. 2) of the mobile station to an access point (for example, the AP 104 of FIG. 1) serving the mobile station. In various embodiments, the method can be performed on an access point such as, for example, the AP 104 of FIG. 1. Providing the message for transmission can include transmitting the message through a transmitter (for example, the transmitter 230 of FIG. 2) and an antenna (for example, the antenna 236 of FIG. 2) of the access point to a mobile station (for example, the STA 106A of FIG. 1) served by the access point.

In various embodiments, the method of FIG. 23 can include one or more blocks or features shown in the method of FIG. 17-19. The 484-tone allocation unit can have any of the characteristics discussed above with respect to FIGS. 4-14.

In an embodiment, the method shown in FIG. 23 can be implemented in a wireless device that can include a generating circuit, a mapping circuit, and a providing circuit. Those skilled in the art will appreciate that a wireless device can have more components than the simplified wireless device described herein. The wireless device described herein includes only those components useful for describing some prominent features of implementations within the scope of the claims.

The generating circuit can be configured to generate the message according to the 1024-tone plan. In an embodiment, the generating circuit can be configured to implement block 2310 of the flowchart 2300 (FIG. 23). The generating circuit can include one or more of the DSP 230 (FIG. 2), the processor 204 (FIG. 2), and the memory 206 (FIG. 2). In some implementations, means for generating can include the generating circuit.

The mapping circuit can be configured to map tones of the message using a low density parity check (LDPC) tone mapping distance (DTM). In various embodiments, the DTM can be one of 10, 14, or 20. The mapping circuit can include one or more of the DSP 230 (FIG. 2), the processor 204 (FIG. 2), the memory 206 (FIG. 2), the interleaving system 1014 (FIG. 15), the interleavers 1108*a*-1108*c* (FIG. 16), and the modulators 1102*a*-702*c* (FIG. 16). In some implementations, means for mapping can include the generating circuit.

The providing circuit can be configured to provide the message for transmission. In an embodiment, the providing circuit can be configured to implement block 2320 of the flowchart 2300 (FIG. 23). The providing circuit can include one or more of the transmitter 230 (FIG. 2), the transceiver 234 (FIG. 2), the processor 204 (FIG. 2), the DSP 230 (FIG. 2), the antenna 236 (FIG. 2), and the memory 206 (FIG. 2). In some implementations, means for providing can include the providing circuit.

In various embodiments, the wireless device can further include a transmitting circuit. The transmitting circuit can be configured to transmit the message, for example through a transmitter and an antenna of a mobile station or access point. The transmitting circuit can include one or more of the transmitter 230 (FIG. 2), the transceiver 234 (FIG. 2), the processor 204 (FIG. 2), the DSP 230 (FIG. 2), the antenna 236 (FIG. 2), and the memory 206 (FIG. 2). In some implementations, means for transmitting can include the transmitting circuit.

Figure 24:
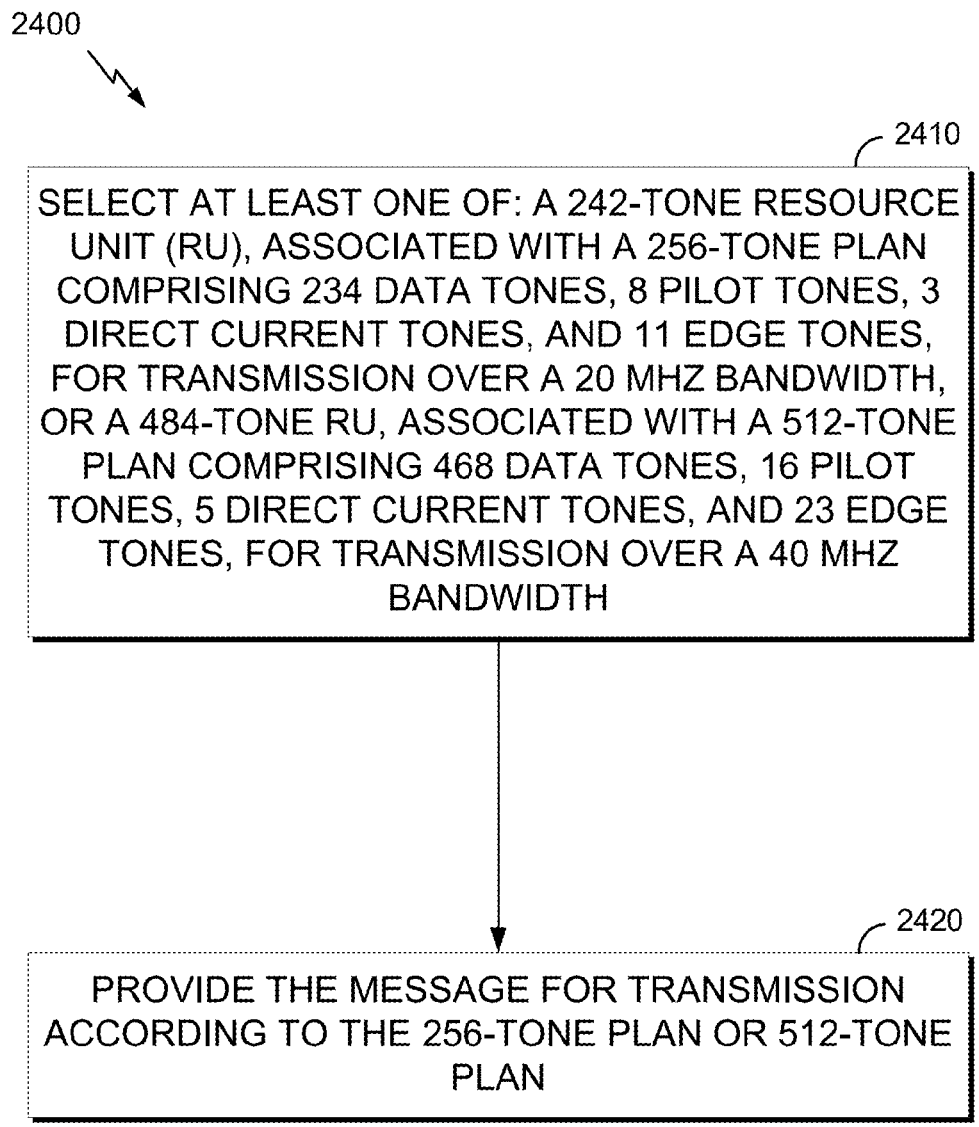
FIG. 24 shows a flowchart for another exemplary method of wireless communication that can be employed within the wireless communication system of FIG. 1.

FIG. 24 shows a flowchart 2400 for another exemplary method of wireless communication that can be employed within the wireless communication system 100 of FIG. 1. The method can be implemented in whole or in part by the devices described herein, such as the AP 104 (FIG. 1), any of the STAs 106A-106D (FIG. 1), the wireless device 202 shown in FIG. 2, the devices 1010, 1020, 1030, or 1040 (FIG. 15), and/or any of the devices of system 1100 (FIG. 16). Although the illustrated method is described herein with reference to the wireless communication system 100 discussed above with respect to FIG. 1, the wireless device 202 discussed above with respect to FIG. 2, the system 1000 of FIG. 15, the system 1100 of FIG. 16, and the tone plans of FIG. 20, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 2410, a wireless device selects at least one of a 242-tone resource unit (RU) and a 484-tone RU. The 242-tone RU is associated with a 256-tone plan comprising 234 data tones, 8 pilot tones, 3 direct current tones, and 11 edge tones, for transmission over a 20 MHz bandwidth. The 484-tone RU is associated with a 512-tone plan comprising 468 data tones, 16 pilot tones, 5 direct current tones, and 23 edge tones (e.g., 12 left guard tones and 11 right guard tones), for transmission over a 40 MHz bandwidth. For example, the AP 104 can select and allocate the 242-tone RU or 484-tone RU described with respect to FIG. 20. As another example, the STA 106A can receive an allocation for, and select, the 242-tone RU or 484-tone RU described with respect to FIG. 20.

In various embodiments, the step of selecting can include selecting the 242-tone RU. The step of providing can include providing the message for transmission according to the 256-tone plan. The method can further include either interleaving encoded data using an interleaver depth of 26, an interleaved rotation index of 58 for up to four spatial streams, for binary convolutional code (BCC) interleaving, or mapping tones of the message using a tone mapping distance (DTM) of 9 for low density parity check (LDPC). In various embodiments, the step of selecting can include selecting the 484-tone RU. The step of providing can include providing the message for transmission according to the 512-tone plan. The method can further include mapping tones of the message using a tone mapping distance (DTM) of 12 for low density parity check (LDPC), and refraining from performing binary convolutional code interleaving map tones of the message.

In various embodiments, the method can further include, for the 484-tone RU, either interleaving encoded data using an interleaver depth of 26 and an interleaved rotation index of 58 for up to four spatial streams, or mapping tones of the message using a tone mapping distance (DTM) of 9 for low density parity check (LDPC). In various embodiments, the method can further include, for the 484-tone RU, either interleaving encoded data using an interleaver depth of 39, an interleaved rotation index of 116 for up to four spatial streams, and an interleaved rotation index of 56 for more than four spatial streams, or mapping tones of the message using a tone mapping distance (DTM) of 12 for low density parity check (LDPC).

In various embodiments, generating the message according to the 484-tone allocation unit can include one or more of: encoding a plurality of data bits, parsing the stream of encoded bits, interleaving the encoded bits, mapping the encoded bits as QAM symbols and then to OFDM data tones, mapping a pilot sequence of bits to a specified number of pilot OFDM tones, and mapping null data bits to a specified number of left guard tones, right guard tones, and DC tones. For example, the encoder 1104 (FIG. 16) can encode the data bits. In the illustrated embodiment, the segment parser can be omitted, and a single interleaver can be used.

Then, at block 2420, the wireless device provides a message for transmission according to the 256-tone plan or 512-tone plan. For example, the AP 104 can transmit the message according to the selected tone plan via the transmitter 210 (FIG. 2). As another example, the STA 106A can transmit the message according to the selected tone plan via the transmitter 210 (FIG. 2). The AP 104 and/or the STA 106A can also receive the message according to the selected tone plan.

In various embodiments, providing the message for transmission includes one or more of: encoding a plurality of data bits, parsing the stream of encoded bits, interleaving the encoded bits, mapping the encoded bits as QAM symbols and then to OFDM data tones, mapping a pilot sequence of bits to a specified number of pilot OFDM tones, and mapping null data bits to a specified number of left guard tones, right guard tones, and DC tones. For example, the processor 204 (FIG. 2) can organize a plurality of data bits according to the 484-tone allocation unit. The encoder 1104 (FIG. 16) can encode the data bits. The stream parser 1106 (FIG. 16) can parse the encoded data bits. The interleavers 1108*a*-1108*c* (FIG. 16) interleave the parsed data. The modulators 1102*a*-1108*c* (FIG. 16) can modulate the interleaved data for transmission via the transmitters 1110*a*-1110*c* (FIG. 16).

In various embodiments, the method can be performed on a mobile station such as, for example, a STA 106A-106D of FIG. 1. Providing the message for transmission can include transmitting the message through a transmitter (for example, the transmitter 240 of FIG. 2) and an antenna (for example, the antenna 246 of FIG. 2) of the mobile station to an access point (for example, the AP 104 of FIG. 1) serving the mobile station. In various embodiments, the method can be performed on an access point such as, for example, the AP 104 of FIG. 1. Providing the message for transmission can include transmitting the message through a transmitter (for example, the transmitter 240 of FIG. 2) and an antenna (for example, the antenna 246 of FIG. 2) of the access point to a mobile station (for example, the STA 106A of FIG. 1) served by the access point.

In an embodiment, the method shown in FIG. 24 can be implemented in a wireless device that can include a selecting circuit and a providing circuit. Those skilled in the art will appreciate that a wireless device can have more components than the simplified wireless device described herein. The wireless device described herein includes only those components useful for describing some prominent features of implementations within the scope of the claims.

The selecting circuit can be configured to select the 242-tone RU or the 484-tone RU. In an embodiment, the selecting circuit can be configured to implement block 2410 of the flowchart 2400 (FIG. 24). The generating circuit can include one or more of the DSP 240 (FIG. 2), the processor 204 (FIG. 2), and the memory 206 (FIG. 2). In some implementations, means for selecting can include the selecting circuit.

The providing circuit can be configured to provide the message for transmission. In an embodiment, the providing circuit can be configured to implement block 2420 of the flowchart 2400 (FIG. 24). The providing circuit can include one or more of the transmitter 240 (FIG. 2), the transceiver 244 (FIG. 2), the processor 204 (FIG. 2), the DSP 240 (FIG. 2), the antenna 246 (FIG. 2), and the memory 206 (FIG. 2). In some implementations, means for providing can include the providing circuit.

In various embodiments, the wireless device can further include a transmitting circuit. The transmitting circuit can be configured to transmit the message, for example through a transmitter and an antenna of a mobile station or access point. The transmitting circuit can include one or more of the transmitter 240 (FIG. 2), the transceiver 244 (FIG. 2), the processor 204 (FIG. 2), the DSP 240 (FIG. 2), the antenna 246 (FIG. 2), and the memory 206 (FIG. 2). In some implementations, means for transmitting can include the transmitting circuit.

In various embodiments, the wireless device can further include a generating circuit. The generating circuit can be configured to generate the message according to the selected tone plan. The generating circuit can include one or more of the DSP 240 (FIG. 2), the processor 204 (FIG. 2), and the memory 206 (FIG. 2). In some implementations, means for generating can include the generating circuit.

In various embodiments, the wireless device can further include a mapping circuit. The mapping circuit can be configured to map tones of the message using a low density parity check (LDPC) tone mapping distance (DTM). In various embodiments, the DTM can be one of 10, 14, or 20. The mapping circuit can include one or more of the DSP 240 (FIG. 2), the processor 204 (FIG. 2), the memory 206 (FIG. 2), the interleaving system 1014 (FIG. 15), the interleavers 1108*a*-1108*c* (FIG. 16), and the modulators 1102*a*-702*c* (FIG. 16). In some implementations, means for mapping can include the generating circuit.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations.

The various illustrative logical blocks, modules and circuits described in connection with the present disclosure can be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor can be a microprocessor, but in the alternative, the processor can be any commercially available processor, controller, microcontroller or state machine. A processor can also be implemented as a combination of computing devices, e.g., a combination of a DSP and a microprocessor, a plurality of microprocessors, one or more microprocessors in conjunction with a DSP core, or any other such configuration.

In one or more aspects, the functions described can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium can comprise non-transitory computer readable medium (e.g., tangible media). In addition, in some aspects computer readable medium can comprise transitory computer readable medium (e.g., a signal). Combinations of the above should also be included within the scope of computer-readable media.

The methods disclosed herein comprise one or more steps or actions for achieving the described method. The method steps and/or actions can be interchanged with one another without departing from the scope of the claims. In other words, unless a specific order of steps or actions is specified, the order and/or use of specific steps and/or actions can be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure can be devised without departing from the basic scope thereof, and the scope thereof is determined by the claims that follow.

What is claimed is:

1. An apparatus configured to perform wireless communication, comprising:
    a memory that stores instructions;
    a processing system coupled with the memory and configured to execute the instructions to:
        generate a message for wireless communication according to a resource unit (RU) associated with a 256-tone plan comprising 234 data tones, 8 pilot tones, 3 direct current tones, and 11 edge tones, for transmission over a 20 MHz bandwidth;
        determine a number of spatial streams for transmitting the message;
        select between binary convolutional code (BCC) interleaving or low density parity check (LDPC) tone mapping depending on the number of spatial streams, wherein the processing system is configured to select BCC interleaving when the number of spatial streams is less than or equal to four, and LDPC tone mapping when the number of spatial streams is greater than four; and
        provide the message for transmission according to the 256-tone plan; and
    a transmitter configured to transmit the message.

2. The apparatus of claim 1, wherein the processing system is configured to either:
    interleave the encoded data using an interleaver depth of 26 and an interleaved rotation index of 58 when binary convolutional code (BCC) interleaving is selected; or
    map tones of the message using a tone mapping distance (DTM) of 9 when low density parity check (LDPC) is selected.

3. The apparatus of claim 1, wherein the apparatus is a mobile station, and wherein the transmitter transmits the message through an antenna of the mobile station to an access point serving the mobile station.

4. The apparatus of claim 1, wherein the apparatus is an access point, and wherein the transmitter transmits the message through an antenna of the access point to a mobile station served by the access point.

5. A method for wireless communication, comprising:
    generating a message for wireless communication according to a resource unit (RU) associated with a 256-tone plan comprising 234 data tones, 8 pilot tones, 3 direct current tones, and 11 edge tones, for transmission over a 20 MHz bandwidth;
    determining a number of spatial streams for transmitting the message;
    selecting between binary convolutional code (BCC) interleaving or low density parity check (LDPC) tone mapping depending on the number of spatial streams, wherein BCC interleaving is selected when the number of spatial streams is less than or equal to four, and LDPC tone mapping is selected when the number of spatial streams is greater than four;

providing the message for transmission according to the 256-tone plan; and transmitting the message.

6. The method of claim 5, further comprising either:

interleaving the encoded data using an interleaver depth of 26 and interleaved rotation index of 58 when binary convolutional code (BCC) interleaving is selected; or mapping tones of the message using a tone mapping distance (DTM) of 9 when low density parity check (LDPC) is selected.

7. The method of claim 5, wherein the method is performed on a mobile station, and wherein transmitting the message is through a transmitter and an antenna of the mobile station to an access point serving the mobile station.

8. The method of claim 5, wherein the method can be performed on an access point, and wherein transmitting the message is through a transmitter and an antenna of the access point to a mobile station served by the access point.

9. An apparatus for wireless communication, comprising:

means for generating a message for wireless communication according to a resource unit (RU) associated with a 256-tone plan comprising 234 data tones, 8 pilot tones, 3 direct current tones, and 11 edge tones, for transmission over a 20 MHz bandwidth;

means for determining a number of spatial streams for transmitting the message;

means for selecting between binary convolutional code (BCC) interleaving or low density parity check (LDPC) tone mapping depending on the number of spatial streams, wherein BCC interleaving is selected when the number of spatial streams is less than or equal to four, and LDPC tone mapping is selected when the number of spatial streams is greater than four;

means for providing the message for transmission according to the 256-tone plan; and means for transmitting the message.

10. The apparatus of claim 9, further comprising means for either:

interleaving the encoded data using an interleaver depth of 26 and an interleaved rotation index of 58 when binary convolutional code (BCC) interleaving is selected; or mapping tones of the message using a tone mapping distance (DTM) of 9 when low density parity check (LDPC) is selected.

11. A non-transitory computer-readable medium comprising code that, when executed, causes an apparatus to:

generate a message for wireless communication according to a resource unit (RU) associated with a 256-tone plan comprising 234 data tones, 8 pilot tones, 3 direct current tones, and 11 edge tones, for transmission over a 20 MHz bandwidth;

determine a number of spatial streams for transmitting the message;

selecting between binary convolutional code (BCC) interleaving or low density parity check (LDPC) tone mapping depending on the number of spatial streams, wherein BCC interleaving is selected when the number of spatial streams is less than or equal to four, and LDPC tone mapping is selected when the number of spatial streams is greater than four;

provide the message for transmission according to the 256-tone plan; and transmit the message.

* * * * *